US010905050B2

(12) United States Patent
Robertson

(10) Patent No.: US 10,905,050 B2
(45) Date of Patent: Feb. 2, 2021

(54) AUTOMATED, DYNAMIC CONCAVE COVER PLATE SYSTEM AND METHODS

(71) Applicant: Brian Robertson, Dallas, TX (US)

(72) Inventor: Brian Robertson, Dallas, TX (US)

( * ) Notice: Subject to any disclaimer, the term of this patent is extended or adjusted under 35 U.S.C. 154(b) by 0 days.

(21) Appl. No.: 16/860,845

(22) Filed: Apr. 28, 2020

(65) Prior Publication Data

US 2020/0253126 A1    Aug. 13, 2020

Related U.S. Application Data

(63) Continuation-in-part of application No. 16/129,432, filed on Sep. 12, 2018, and a continuation-in-part of application No. 16/129,454, filed on Sep. 12, 2018, said application No. 16/129,432 is a continuation-in-part of application No. 16/050,714, filed on Jul. 31, 2018, said application No. 16/129,454 is a continuation-in-part of application No. 16/050,714, filed on Jul. 31, 2018, which is a continuation of application No. 15/832,142, filed on Dec. 5, 2017, now Pat. No. 10,045,487.

(51) Int. Cl.
*A01F 12/24* (2006.01)
*A01F 12/26* (2006.01)
*A01F 12/28* (2006.01)
*A01F 12/18* (2006.01)

(52) U.S. Cl.
CPC ............ *A01F 12/28* (2013.01); *A01F 12/184* (2013.01); *A01F 12/185* (2013.01); *A01F 12/24* (2013.01); *A01F 12/26* (2013.01)

(58) Field of Classification Search
CPC ........ A01F 12/181; A01F 12/26; A01F 12/28; A01F 12/184; A01F 12/185; A01F 12/24
See application file for complete search history.

(56) References Cited

U.S. PATENT DOCUMENTS

| | | |
|---|---|---|
| 2,159,664 A | 5/1939 | Lindgren |
| 2,305,964 A | 12/1942 | Harrison et al. |
| 2,833,288 A | 12/1953 | Scranton |
| 2,686,523 A | 8/1954 | Young |
| 3,092,115 A | 6/1963 | Morgan |
| 3,191,607 A | 6/1965 | Baumeister et al. |
| 3,439,684 A | 4/1969 | Davidow et al. |

(Continued)

FOREIGN PATENT DOCUMENTS

| | | | | |
|---|---|---|---|---|
| FR | 2621216 B1 * | 8/1990 | ............ | A01F 12/24 |
| WO | WO0124609 A1 | 4/2001 | | |
| WO | WO-2018185035 A1 * | 10/2018 | ............ | A01F 12/28 |

*Primary Examiner* — Alicia Torres
(74) *Attorney, Agent, or Firm* — Jeffrey G. Degenfelder; Carstens & Cahoon, LLP

(57) ABSTRACT

The present invention comprises multiple embodiments of an automated, dynamic cover plate system, which may be quickly attached, detached and adjusted to the exterior of a concave grate of a combine harvester in order to adjust the flow characteristics of the concave or separator grate assemblies. The automated, dynamic cover plate system improves the threshing capability of the rasp bar threshing cylinder while simultaneously capturing additional threshed grain. The automated, dynamic cover plate system of the present invention is designed to be controlled, either manually or automatically, by the operator of the combine harvester or by a computerized or automated intelligence system.

24 Claims, 39 Drawing Sheets

(56) References Cited

U.S. PATENT DOCUMENTS

| | | | |
|---|---|---|---|
| 3,537,459 A * | 11/1970 | Thomas | A01F 12/20 460/110 |
| 3,568,682 A | 3/1971 | Knapp et al. | |
| 3,696,815 A | 10/1972 | Rowland-Hill et al. | |
| 4,495,954 A | 1/1985 | Yarbrough | |
| 4,499,908 A | 2/1985 | Niehaus | |
| 4,875,891 A * | 10/1989 | Turner | A01F 12/24 460/110 |
| 5,489,239 A | 2/1996 | Matousek et al. | |
| 5,569,080 A | 10/1996 | Estes | |
| 5,613,907 A | 3/1997 | Harden | |
| 6,074,297 A | 6/2000 | Kuchar | |
| 6,193,604 B1 | 2/2001 | Ramp et al. | |
| 6,802,771 B2 * | 10/2004 | Schwersmann | A01F 12/442 460/109 |
| 6,932,697 B2 * | 8/2005 | Baumgarten | A01D 41/1276 460/1 |
| 8,636,568 B1 | 1/2014 | Farley | |
| 8,690,652 B1 | 4/2014 | Estes | |
| 9,155,249 B2 * | 10/2015 | Baumgarten | A01D 75/282 |
| 9,215,845 B2 | 12/2015 | Regier | |
| 2006/0128452 A1 | 6/2006 | Esken | |
| 2014/0087793 A1 | 3/2014 | Regier | |
| 2016/0345499 A1 | 12/2016 | Van Hullebusch | |
| 2017/0105351 A1 | 4/2017 | Matway et al. | |
| 2018/0103588 A1 | 4/2018 | Ritter | |

* cited by examiner

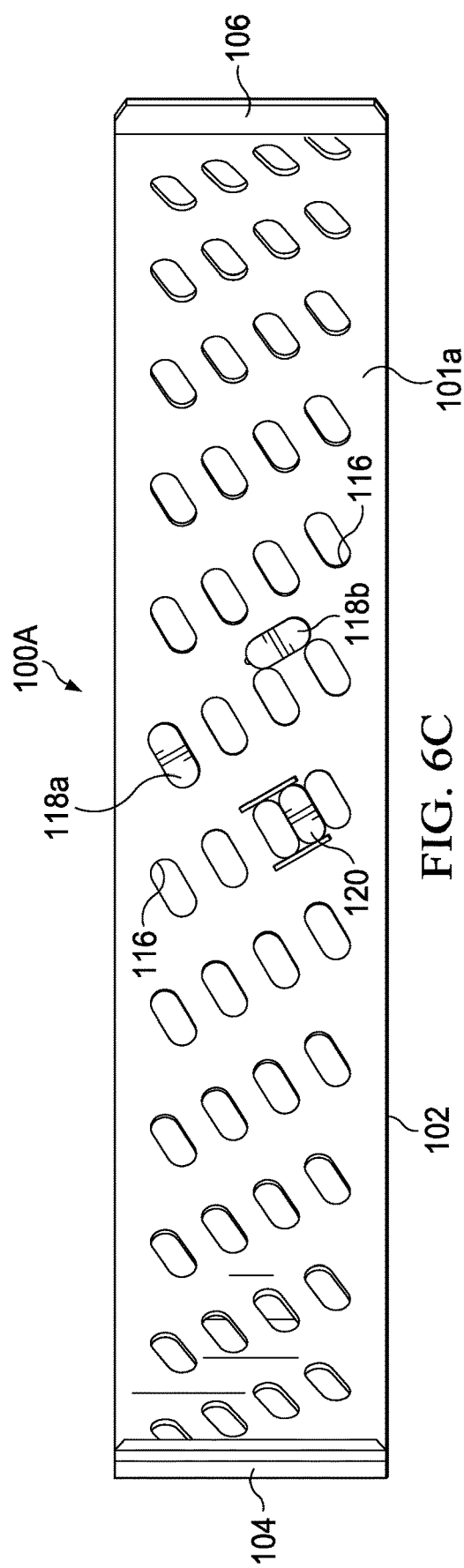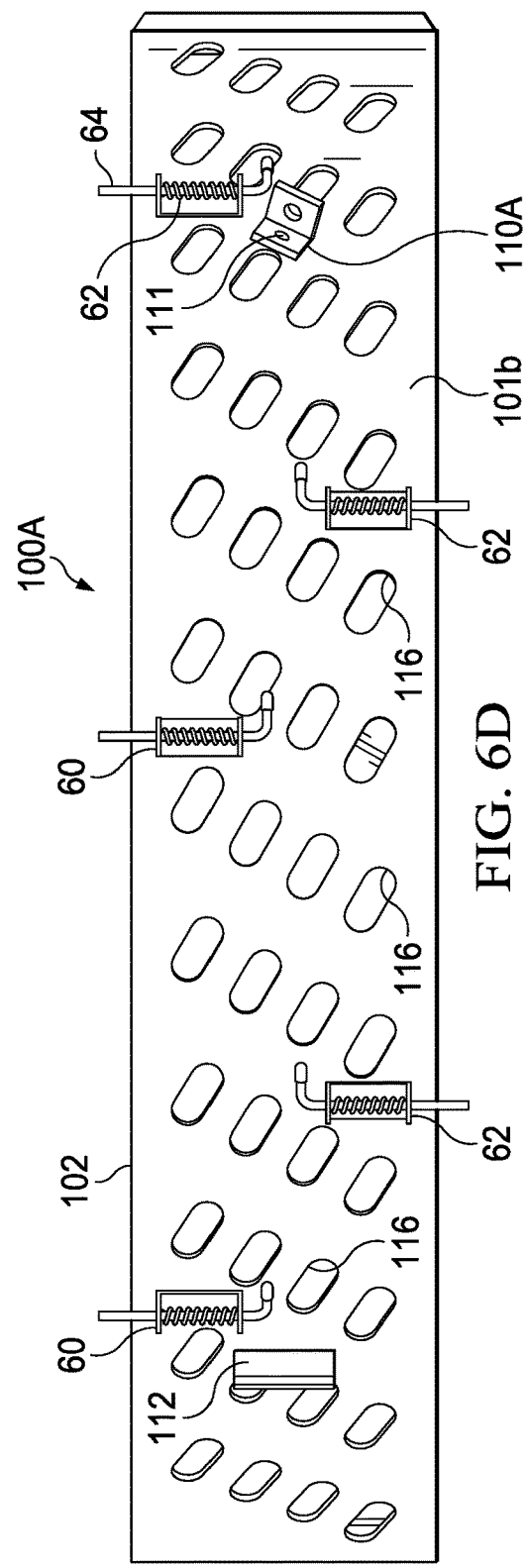
FIG. 6C
FIG. 6D

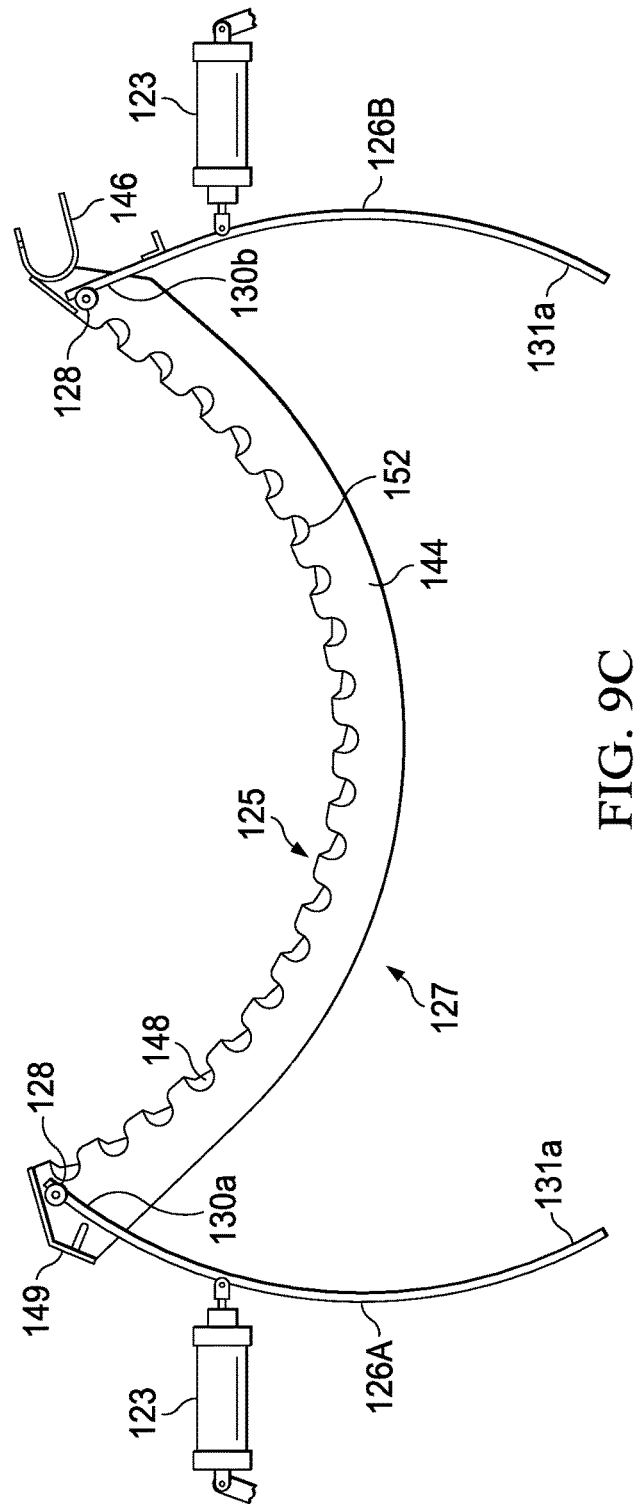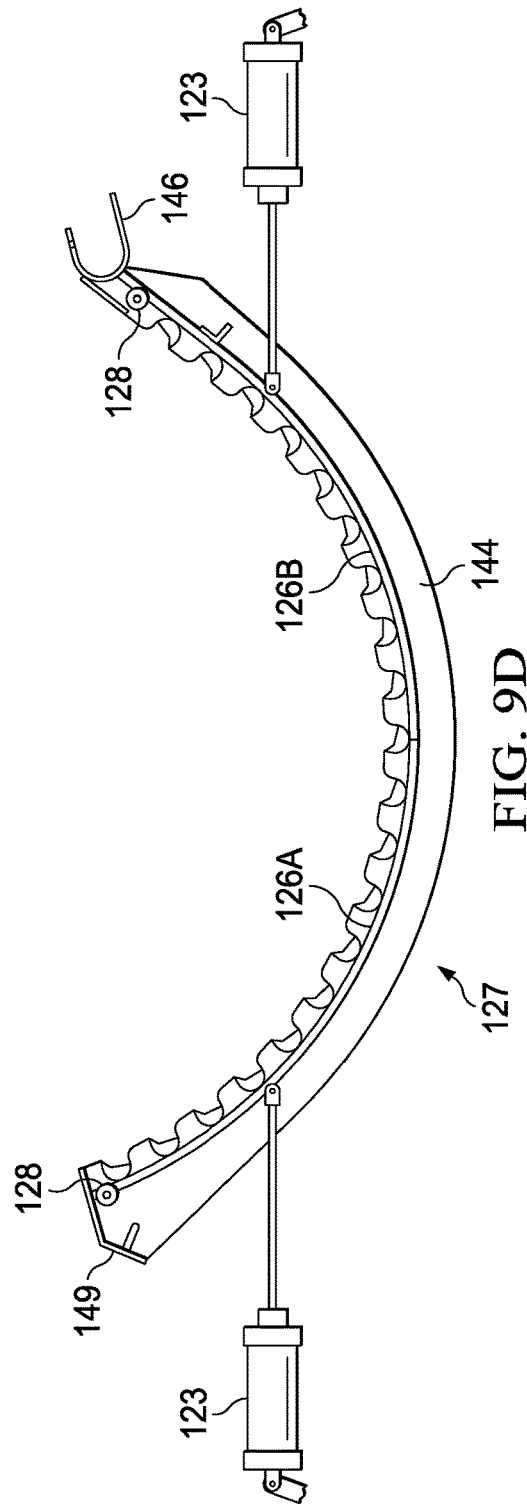
FIG. 9C
FIG. 9D

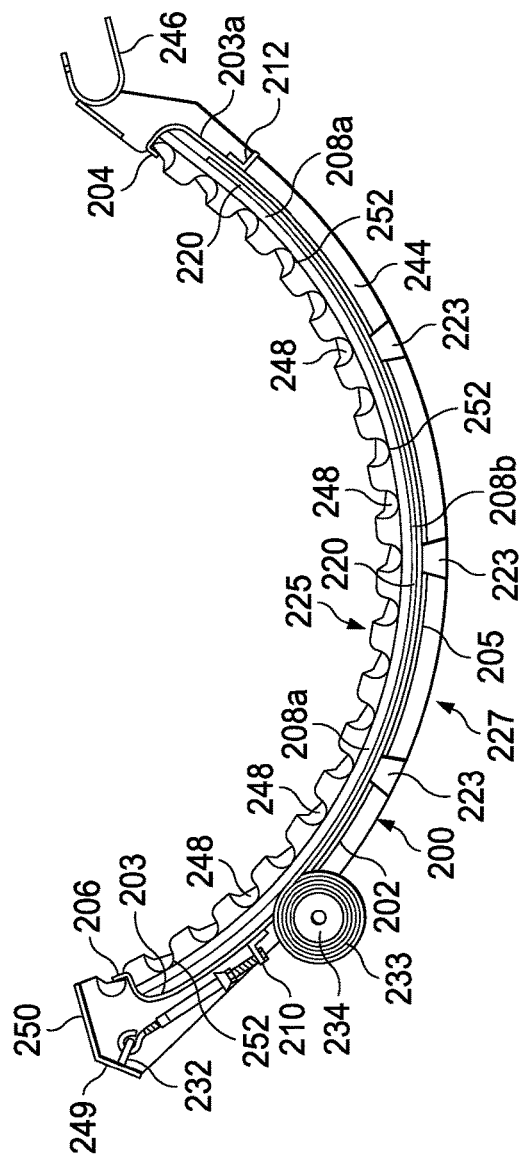
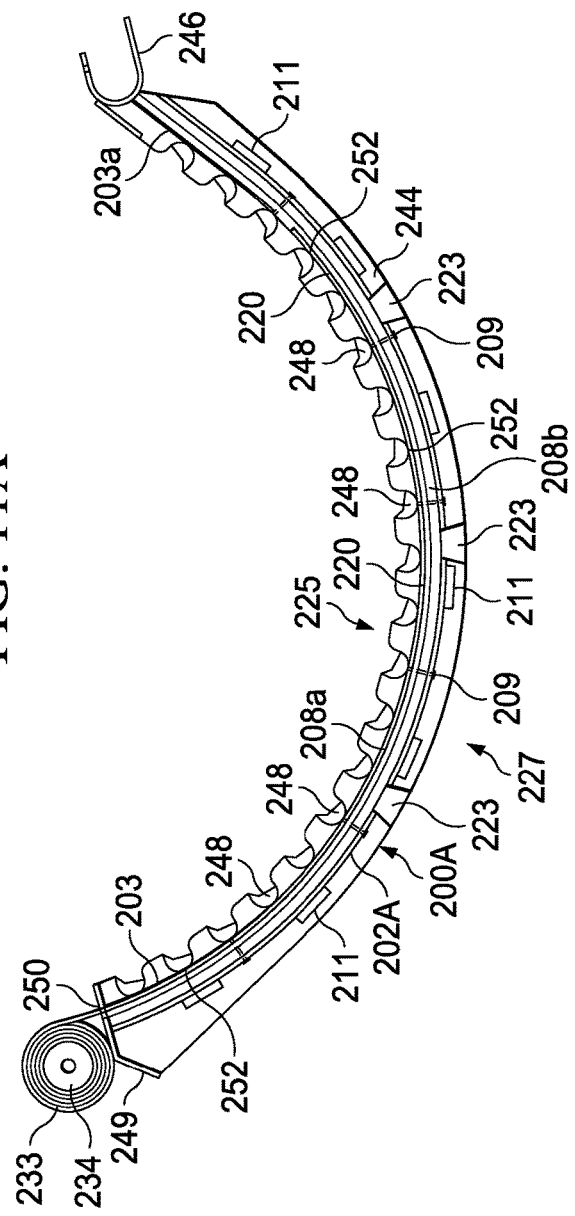
FIG. 11A
FIG. 11B

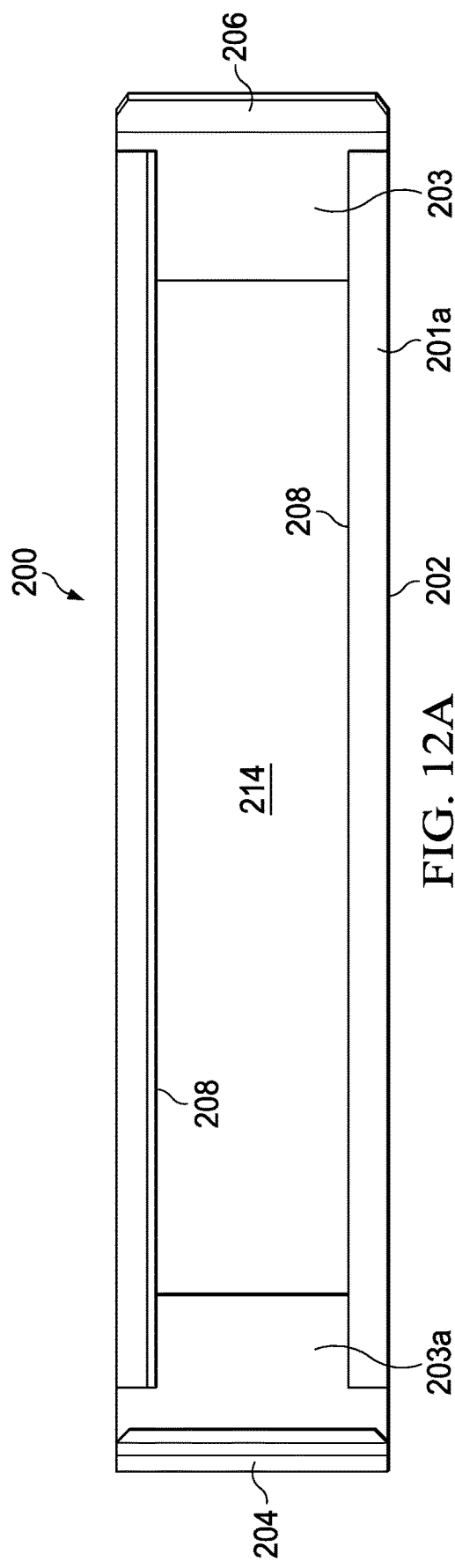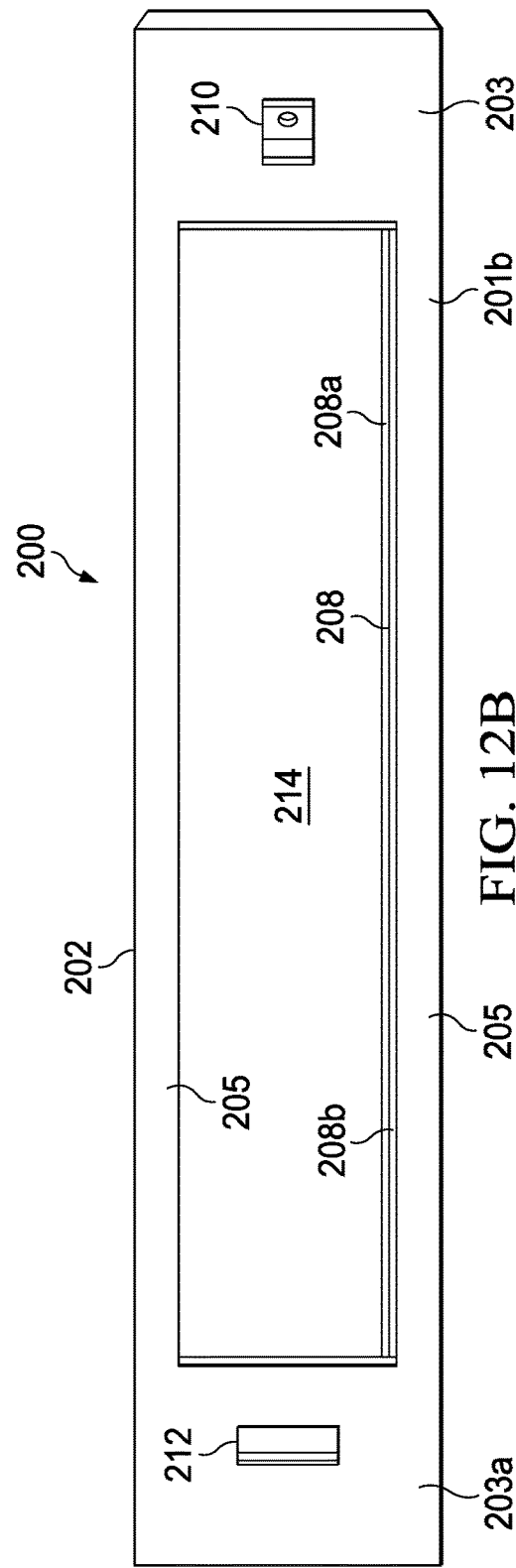
FIG. 12A
FIG. 12B

AUTOMATED, DYNAMIC CONCAVE COVER PLATE SYSTEM AND METHODS

CROSS-REFERENCE TO RELATED APPLICATION

This application is a continuation-in-part application of co-pending U.S. patent application Ser. Nos. 16/129,432 and 16/129,454 filed Sep. 12, 2018, which are related continuation-in-part applications of U.S. patent application Ser. No. 16/050,714 filed Jul. 31, 2018, which is a continuation application of U.S. patent application Ser. No. 15/832,142 filed Dec. 5, 2017, the technical disclosure of which is hereby incorporated herein by reference.

BACKGROUND OF THE INVENTION

Technical Field of the Invention

This invention relates to agricultural harvesting machines of the type that use rotary processing devices, and particularly to a threshing mechanism in which a rotary threshing cylinder cooperates with concave threshing and separator grates with openings, and more particularly with a means for at least partially closing, remotely and automatically, the concave grate openings by the incorporation and/or attachment of one or more automated cover plate systems to provide maximum harvesting versatility.

Description of the Related Art

An agricultural harvester, most commonly known as a combine harvester, is a vehicle used for the harvesting of agricultural crops. Prior art combine harvesters are typically composed of several systems to pick, thresh, separate, clean and retain the grain from the particular crop being harvested. For example, in one type of prior art combine harvester's threshing system, the crop travels axially parallel to and helically around the rotational axis of one or more rotary processing devices commonly referred to as rotors. In other prior art combine harvester's threshing systems, during at least a portion of its travel through the system, the crop travels in a transverse or tangential direction relative to the rotational axis of a rotary processing device commonly referred to as a threshing cylinder. In each of the prior art threshing systems, crop material is processed between rasp elements attached to the periphery of a rotary device and arcuate grates, usually foraminous, stationary threshing concaves and separating grates that at least partially wrap around the rotor. The typical threshing concave used with a rasp bar threshing cylinder consists essentially of an arcuate grate, roughly concentric with the threshing cylinder. The crop material travels around the rotary cylinder and is "wedged" in between the rotary cylinder and threshing concaves causing the grain to be removed from the stalk.

For example, Regier (U.S. Pat. No. 9,215,845) discloses an exemplary prior art combine harvester. As shown in FIG. 1, the depicted combine harvester 10 has a single axial flow rotary processing system 12 that extends generally parallel with the path of travel of the machine. However, as will be seen, the principles of the present invention are not limited to combine harvesters having only a single axial flow rotary processing system. For the sake of simplicity in explaining the principles of the present invention, this specification will proceed utilizing a combine harvester having a single axial flow processing system as the primary example.

The exemplary prior art combine harvester 10 depicted in the illustrated embodiment includes a harvesting header (not shown) at the front of the machine that picks or cuts the harvested crop and delivers the collected crop material to the front end of a feeder house 14. A conveyor 16 moves the crop material rearwardly within the feeder house 14 until reaching the processing system 12. With reference now to FIG. 2, the illustrated embodiment the exemplary prior art processing system 12 has a rotor 20 having an infeed auger 22 on the front end thereof. The auger 22 and rotor 20 advance the crop material axially through the processing system 12 for threshing and separating. The rotor 20 typically includes a plurality of rasp-like elements 55, configured about the rotor's peripheral surface. The rotor is partially encased by a series of threshing concave grate assemblies 24 and separator grate assemblies 26. As the crop material moves around and in-between the rasp-like elements 55 and the threshing concave grate assemblies 24, the crop is threshed. Any free grain, that has been threshed, falls through openings in the concave grate assemblies 24, 26 and is retained by the combine harvester. In other types of processing systems, a conveyor 16 may deliver the crop material directly to a threshing cylinder.

Generally speaking, the crop material entering the processing system 12 moves axially and helically through the system during threshing and separating. During such travel the crop material is threshed and separated by rotor 20 operating in cooperation with preferably concave foraminous separator 23 in comprising at least one threshing concave grate assembly 24 and a concave separator grate assembly 26, with the grain escaping laterally through threshing concave grate assemblies 24 and concave separator grate assemblies 26 into a cleaning mechanism 28 (FIG. 1). Bulkier stalk and leaf material is retained by the threshing concave grate assemblies 24 and separator grate assemblies 26 and ejected out of the processing system 12 at the rear of the combine harvester 10. The cleaning mechanism 28 may further include a blower (not shown), which provides a stream of air directed throughout the cleaning region below processing system 12 and out the rear of the harvester 10 so as to carry lighter chaff particles away from the grain as it migrates downwardly toward the bottom of the machine to a clean grain auger 30. The auger 30 delivers the clean grain to an elevator (not shown) that transfers the grain to a storage bin 34 on top of the machine, from which it is ultimately unloaded via an unloading spout 36.

A plurality of threshing concave grate assemblies 24 and concave separator grate assemblies 26 are arranged side-by-side axially along the processing system 12 to form a part of what may be considered a tubular housing 38 that concentrically receives rotor 20 and serves as part of processing system 12. In the illustrated embodiment, three threshing concave grate assemblies 24 and three concave separator grates assemblies 26 form part of the tubular housing 38. However, it is understood that more or fewer threshing concave grate assemblies 24 and concave separator grate assemblies 26 may be used in the tubular housing 38. As is known in the art, the tubular housing 38 includes a convex top wall (not shown) that extends the full length of housing 38 and effectively closes off the top portion thereof from front to rear. The threshing concave grate assemblies 24 and concave separator grate assemblies 26 are moved adjustably toward and away from rotor 20 to adjust the running clearance between the rotor 20 and concave and separator grate assemblies 24, 26 and to change the shape of the threshing and separating regions as is known in the art and need to be further discussed herein.

As best seen in FIG. 3A, each threshing concave grate assembly 24 typically includes an arcuate first grate 40 and an arcuate second grate 42 pivotally mounted in the processing system 12. A suitable actuator (not shown) is located near the processing system 12 and mounted on portions of the combine harvester frame structure. Preferably, the actuator is remotely operable, such as from the cab 2 of harvester 10. Grates 40 and 42 of each threshing concave grate assembly 24 desirably have substantially similar structure but mirror images, so only grate 40 will be described in detail herein. Additionally, the invention is described herein with respect to a grate of the threshing concave grate assembly 24, but one skilled in the art will understand that the invention may also be used with a concave separator grate assembly 26 without departing from the scope of the invention.

As shown in FIG. 3B, a conventional prior art threshing concave grate 40 typically includes a pair of arcuate, elongated and laterally spaced apart side rails 44 oriented generally transverse to the axis of the rotor 20. One end of each side rail 44 has a hook element 46 used to mount the threshing concave grate assembly 24 on an axial bar (not shown) used to move the threshing concave grate 24 closer or further away from the rotor 20 (FIG. 2). A plurality of axial bars 48 spaced at predetermined intervals span the side rails 44. End plates 49 are preferably affixed between ends of the side rails 44. The axial bars 48 typically have outwardly projecting overhangs 50 at their opposite ends that overlay upper edges of the side rails 44 and are operable to bear against the same when grate 40 is installed. Preferably, the overhangs 50 are received in notches 52 in the upper edges of side rails 44 and welded to the side rails 44. Overhangs 50 also provide a substantially continuous surface when multiple grate assemblies 26 are installed side-by-side in the harvester 10. One or more middle supports 51 are typically positioned between and parallel to the side rails 44 and support the axial bars 48.

Each threshing concave grate 40 is customized for a particular crop type by varying the size, number, shape and spacing of the axial bars 48. The various threshing concave grates 40 are typically swapped out depending upon the crop being harvested. While the plurality of axial bars 48 shown in the figures are depicted as having a generally round cross-section with a partially flattened top or interior surface, it is understood that the axial bars cross section may alternatively be completely round, notched, oval, square or polygonal.

Conventional combine harvesters are utilized to harvest a wide variety of different crops. Farmers generally harvest several crops each year and crop rotation is a standard agricultural practice. However, some crops are easier to thresh (i.e., separate grain or seed from chaff) than others. The threshing concave grates are typically customized for the type of crop being harvested. For example, sunflower seeds can be harvested with a simple shake of the stem of the plant, whereas some varieties of wheat must be vigorously rubbed together for many seconds for the seeds to separate from the chaff. For some crops and operations, it is desirable for the lateral spacing between adjacent axial bars 48 of a threshing concave grate 40 to be very narrow in order to modify the threshing and separating action. The threshing concave grates 40 for harder to thresh grains typically have axial rods 48 that are spaced close together and restrict airflow through the concave so that the material remains in the threshing section longer and hence is more fully threshed by the time it gets to the separation concave grating whose purpose is to capture the threshed grain. However, threshing concave grates 40 are heavy and their installation is time consuming and costly during harvest season. Thus, it is oftentimes desirable to adjust the flow of crop material over the threshing concave grates and separator grates to give the rotor more opportunity to thresh and separate the crop material.

While the basic design of the conventional rasp bar cylinder and threshing concave is long practiced, numerous patents directed at means for modifying the characteristics of the threshing concave grates, including devices and methods for closing or partially closing openings in the concave grate, continue to appear. However, prior art solutions to closing or partially closing threshing concave grates have oftentimes been cumbersome in application and inefficient in flexibility of use. For example, Lindgren (U.S. Pat. No. 2,159,664) discloses using multiple insert filler plates configured between adjacent grate bars to adjust the flow characteristics of a threshing machine. However, the Lindgren invention requires the modification of side bars of the concave (adding pins to help retain the filler strip) and relies on a fastening means which requires access from both the inner and outer sides of the concave. However, swapping out or even adjusting threshing concave grates in the field is a laborious task and often requires two or three people several hours to remove or adjust because of their size, weight and tight compartment constraints.

Young (U.S. Pat. No. 2,686,523), Morgan (U.S. Pat. No. 3,092,115), Baumeister et al. (U.S. Pat. No. 3,191,607) and Davidow et al (U.S. Pat. No. 3,439,684) all disclose systems of multiple filler strips attached to the inside of the threshing concave grates between the axial bars traversing the side rails. Although these systems are effective, they are cumbersome to attach and adjust to a threshing concave grate, and susceptible, in some operating conditions, to becoming detached resulting in the filler strip or components thereof being sucked into the downstream material flow, possibly with some damage to combine components. Furthermore, yet again, one must remove the concave grate assembly to access the inner portion of the threshing concave grate to attach the filler plate, which is simply not practical, especially during time-sensitive harvest season.

Yarbrough (U.S. Pat. No. 4,495,954) discloses a system of filler strip assembly attached to the inside of the threshing concave grate with mechanical screw fasteners. However, the filler strip assembly covers up the threshing elements of the threshing concave grate eliminating any threshing action by threshing concave grate. Moreover, the disclosed filler strips are solid and without openings so none of the resulting grain can readily escape and be captured.

A need, therefore, exists for an improved and more comprehensive mechanism for readily closing or partially closing the opening in a concave or separator grate assembly so as to modify its threshing and separating action. Moreover, a need exists for an improved and more comprehensive mechanism for closing or partially closing the opening in a concave or separator grate assembly that may be readily installed and adjusted in the field.

SUMMARY OF THE INVENTION

The present invention overcomes many of the disadvantages of changing the flow characteristics of prior art combine harvester's concave and separator grate assemblies by providing a removable cover plate assembly, which may be quickly attached, detached and adjusted to the exterior of a threshing concave grate in order to adjust the flow characteristics of the concave or separator grate assemblies. While the invention is described herein with respect to a grate of the threshing concave grate assembly, one skilled in the art will understand that the invention may also be used for the separator grate assembly without departing from the scope of the invention.

The cover plate assembly of the present invention improves the threshing capability of the rasp bar threshing cylinder while simultaneously capturing additional threshed grain. Moreover, the cover plate assembly of the present invention enables a single set of threshing concave grate assemblies to better harvest a wider variety of crop types.

The cover plate assembly comprises an elongated plate body dimensioned to be positioned between two parallel arcuate rails of a threshing concave grate assembly. For example, a preferred embodiment of the cover plate assembly of present invention includes an elongated plate body dimensioned to be positioned between an arcuate side rail and middle support rail of a threshing concave grate assembly. The cover plate assembly is designed to be configured in a curved supinated position against the plurality of axial bars or rods on the exterior of the threshing concave grate assembly. The opposing ends of the cover plate assembly are secured to the axial bars or rods by means of hooking clasp elements formed in the opposing ends of the cover plate. The hooking clasp elements have a dimensional shape that is complementary to the cross-sectional shape of the axial bars or rods, such that they can be easily and quickly attached and slidably locked in place by a simple tug along the longitudinal axis of the cover plate.

The cover plate assembly further includes a latching mechanism that maintains the lateral position of the cover plate so that the hooking clasp elements stay locked about their respective axial bars. For example, in a preferred embodiment the latching mechanism comprises a turn-buckle tension device configured between an anchor device secured to an end plate of the threshing concave grate assembly and an anchor bracket attached to the exterior-facing side of the cover plate. In another embodiment, the latching mechanism comprises a tension draw latch assembly. Indeed, one skilled in the art will understand that a wide variety of latching mechanisms can be employed to apply a tension force between the anchor bracket attached to the cover plate elongated body and the anchor device secured to an end plate of the threshing concave grate assembly.

In another preferred embodiment, the latching mechanism may comprise a turn-buckle tension device configured between an anchor device secured to a side rail of the concave grate assembly and an anchor bracket attached to the exterior-facing side of the cover plate. Alternatively, the anchor device may be secured to a bar extending between the opposing side rails of the concave grate assembly. The anchor bracket may rigidly attached (e.g., welded) or pivotally attached (e.g., by means of a pivoting rivet assembly) to the exterior-facing side of the cover plate.

In yet another alternative embodiment, the cover plate of the present invention may include one or more side latching mechanisms that maintain the lateral position of the cover plate within the side rails so that the hooking clasp elements stay locked about their respective axial bars. The side latching mechanisms may be used as an alternative to or in addition to the previously disclosed end latching devices. For example, in a preferred embodiment the side latching mechanism may comprise a sliding bolt latch mechanism attached to the cover plate and configured to engage a hole drilled in the side rail of the concave grate assembly. In another embodiment, the side latching mechanism may comprise a tension draw latch assembly configured to engage a latch catch attached to or formed into the side rail of the concave grate assembly. Indeed, one skilled in the art will understand that a wide variety of side latching mechanisms can be employed to secure the configuration of the cover plate on the concave grate assembly.

The cover plate may also include one or more accessory brackets attached to the exterior-facing side of the cover plate to assist the user in properly positioning and initially securing of the cover plate to a threshing concave grate assembly.

When properly installed, the elongated body of the cover plate assembly is pulled tightly against the back of the exterior side of the threshing concave grate assembly significantly changing airflow characteristics through the concave openings and consequently creating a cushion of air between concave and the cylinder of the combine. This cushion of air regulates the rate at which the crop material moves through the concave section. By restricting the airflow through a threshing concave grate assembly the time in which the crop is in the threshing section of the concave is prolonged which facilitates more material-on-material rubbing contact, thereby greatly improving threshing and separation of grain from chaff for hard-to-thresh crop types and varieties.

The elongated body of the cover plate assembly is preferably constructed of a single plate of high strength material such as metal, high strength plastics or composite fabric material. While a preferred embodiment of the cover plate assembly is constructed of steel plating that is permanently bent in an arcuate shape matching the exterior arcuate shape of a threshing concave grate assembly, it is understood that the elongated body of the cover plate assembly may be constructed of flexible, high strength materials such as stainless steel or woven composite materials. Alternatively, the elongated body can also be cast into a predetermined arcuate shape. In addition, while a preferred embodiment of the cover plate assembly features an elongated body having a unitary construction, wherein the hooking clasp elements on opposing ends of the assembly are simply formed into the ends of the elongated body, it is understood that the elongated body, and the two hooking clasp elements may comprise individual parts of a composite construction wherein the elongated body and the two hooking clasp elements are constructed of different materials. For example, the elongated body may be constructed of a woven plastic material, while the hooking clasp elements may be constructed of metal that are attached to the elongated body.

Moreover, the material used to construct the elongated body of the cover plate assembly may also have a wide variance of porosity and permeability. This may be accomplished by a variety of techniques. While a preferred embodiment of the cover plate assembly is constructed of solid plate material, other embodiments include a plurality of apertures or holes formed in the elongated body. The holes may be randomly placed or formed in a geometric pattern. The holes increase the airflow through the threshing concave grate assembly and provides an exit route for threshed grain from to be unloaded and captured so that the separation grate is not overloaded. In addition, the plurality of apertures or holes may further include means for adjusting the shape or size of the aperture.

For example, in one embodiment, such adjusting means may simply comprise a plug device for plugging the aperture. Alternatively, the adjusting means may comprise a sliding panel or gate mechanism incorporated into the elongated body that features movable panel or gate sections which could be positioned to close or partially close a hole or aperture.

The material that the elongated body is constructed of may also have a natural porosity and permeability. For example, the elongated body of the cover plate may be constructed of a metal mesh or composite material having organic porosity and permeability characteristics.

The longitudinal length of the elongated body of the cover plate assembly may also be varied to change the characteristics of the threshing concave grate. While a preferred embodiment of the invention is suitably dimensioned to substantially cover the entire lateral circumference of a threshing concave grate assembly, other embodiments may include elongated bodies having lesser longitudinal lengths so as to cover only a portion of the lateral circumference of a threshing concave grate assembly.

A preferred embodiment of the cover plate assembly of the present invention includes an elongated body having an adjustable width. The elongated body is comprised of two elongated plates attached in a slidably adjustable configuration for adjusting the lateral dimension or width of the cover plate assembly. In one embodiment, the two elongated plates are attached by means of a plurality of bolts attached to one plate and captured in slots formed in a second plate.

The invention also includes multiple embodiments of an automated, dynamic cover plate systems. Embodiments of the previously described invention can be automated in a variety of ways. A variety of actuation systems may be incorporated into the standard cover plate to automate its flow characteristics. For example, the slidable gates, plates and panels may be automated using actuator devices that advance and retract the gates and panels over their respective apertures.

In another embodiment, a cover plate assembly permits a variety of automated actuation systems to automate its flow characteristics. In one embodiment, the cover plate features an elongated body featuring a central opening or aperture. The cover plate assembly is dimensioned to fit within a section of a threshing concave grate configured between two parallel arcuate rails. The cover plate assembly may be modified to include a means for automatically modifying or adjusting the flow characteristics of the cover plate assembly by pivotally moving two half cover plate assemblies to a desired position relative to cover plate assembly. In addition, the automated system can be further refined by directly incorporating the means for automatically modifying or adjusting the flow characteristics into a standard concave grate.

Other embodiments of the automated, dynamic cover plate system of the present invention include an elongated cover plate frame assembly having a central opening formed therein and dimensioned to be positioned between two parallel arcuate rails of a concave grate. The cover plate frame assembly is very similar to the previously disclosed cover plate assembly having two end panels connected by two side straps or bands; however, the cover plate frame assembly further includes one or more tracks or channels arranged in a parallel configuration on opposing sides of a central opening in the cover plate frame assembly. The tracks or channels may be configured either under the straps or bands in cover plate frame assembly or on top of the straps or bands. The cover plate frame assembly may be attached to the concave grate by means of clasp elements formed in the opposing ends of the cover plate frame assembly. Alternatively, the cover plate frame assembly may be attached to the concave grate by means of fasteners connected to either the axial bars or the arcuate side rails. The tracks or channels of the cover plate frame assembly are designed to slidably receive one or more different cover plate inserts, which are used to modify or adjust the flow characteristics of the concave grate.

In an alternate embodiment, the automated, dynamic cover plate system of the present invention is directly incorporated into a concave grate assembly. In such an embodiment, the modified concave grate includes one or more tracks or channel formed into or attached to the parallel arcuate rails of the concave grate. The tracks or channels of the concave grate are designed to slidably receive one or more different cover plate inserts, which are used to modify or adjust the flow characteristics of the concave grate In one embodiment, the cover plate inserts comprise a fully retractable, flexible plate constructed of high strength material. The cover plate insert may be extended and retracted as required and may be stored in a coil attached to the concave grate or the cover plate frame assembly. In another embodiment, the cover plate insert comprises a plurality of segmented cover plate sections. The cover plate frame assembly may further include actuators used to move the cover plate inserts as necessary to modify or adjust the flow characteristics of the concave grate In another embodiment, the cover plate frame assembly or the modified concave grate may further include a plurality of pivotal cover plate shutter configured in the tracks or channels of the cover plate system. The cover plate shutters are designed to rotate when actuated to modify or adjust the flow characteristics of the concave grate.

In yet another embodiment, the automated, dynamic cover plate system of the present invention may include one or more embodiments of individual, dynamic, cover plate mechanisms. The individual cover plate mechanisms may be directly incorporated into and integral to the concave grate, they can also be readily adapted to and incorporated into the previously disclosed cover plate frame assembly and the modified concave grate.

Embodiments of individual, dynamic, cover plate mechanisms may comprise pivotally hinged cover plate mechanisms, sliding vent shutter cover plate mechanisms, inflatable shutter mechanisms and lateral-hinged, flapper plate mechanisms. All of the individual, dynamic, cover plate mechanisms may comprise an actuator device that modify or adjust the flow characteristics of the concave grate when the mechanism is actuated.

The actuator device of the automated, dynamic cover plate system of the present invention may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

All of the actuator devices may be controlled, either manually or automatically, by the operator (preferably in the cab of the combine harvester) by means of a conventional electrical, radio, pneumatic or mechanical connection. Moreover, the controlling mechanism may be connected to a computerized or automated intelligence system that evaluates real-time environmental, operational and/or historical data to determine the proper amount of modification or adjustment to the flow characteristics of the concave grate using the automated, dynamic cover plate system of the present invention.

For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence may include global positioning system (GPS) information and historical data from previous harvests that could be used to predict variances in yield rates at a particular GPS location, which can be used advantageously adjust the amount of modification or adjustment to the flow characteristics of the concave grate using the automated, dynamic cover plate system of the present invention

BRIEF DESCRIPTION OF THE DRAWINGS

A more complete understanding of the method and apparatus of the present invention may be had by reference to the following detailed description when taken in conjunction with the accompanying drawings, wherein:

FIG. 6C is a top plan view of the interior side of the alternative embodiment of the cover plate assembly of the present invention shown in FIG. 5C;

FIG. 6D is a top plan view of the exterior side of the alternative embodiment of the cover plate assembly of the present invention shown in FIG. 5C;

FIG. 9C illustrates a partially cutaway side view of an embodiment of a threshing concave grate configured with an embodiment of the automated, dynamic cover plate assembly of the present invention that includes a "clam shell" door mechanism configured in an "opened" position;

FIG. 9D illustrates the partially cutaway side view of an embodiment of a threshing concave grate configured with an embodiment of the automated, dynamic cover plate assembly of the present invention that includes the "clam shell" door mechanism configured in a "closed" position;

FIG. 11A illustrates a partially cutaway side view of an embodiment of a threshing concave grate incorporating principles of an embodiment of an automated, dynamic cover plate assembly of the present invention comprising a retractable cover plate insert assembly configured within a concave frame assembly attached to the threshing concave grate;

FIG. 11B illustrates a partially cutaway side view of a threshing concave grate incorporating principles of another embodiment of an automated, dynamic cover plate assembly of the present invention comprising a retractable cover plate insert assembly configured within a concave frame assembly attached to the threshing concave grate;

FIG. 12A is a top plan view of the interior side of a first embodiment of a concave frame assembly of the present invention shown in FIG. 10A;

FIG. 12B is a top plan view of the exterior side of the concave frame assembly of the present invention shown in FIG. 12A;

Figure 1:
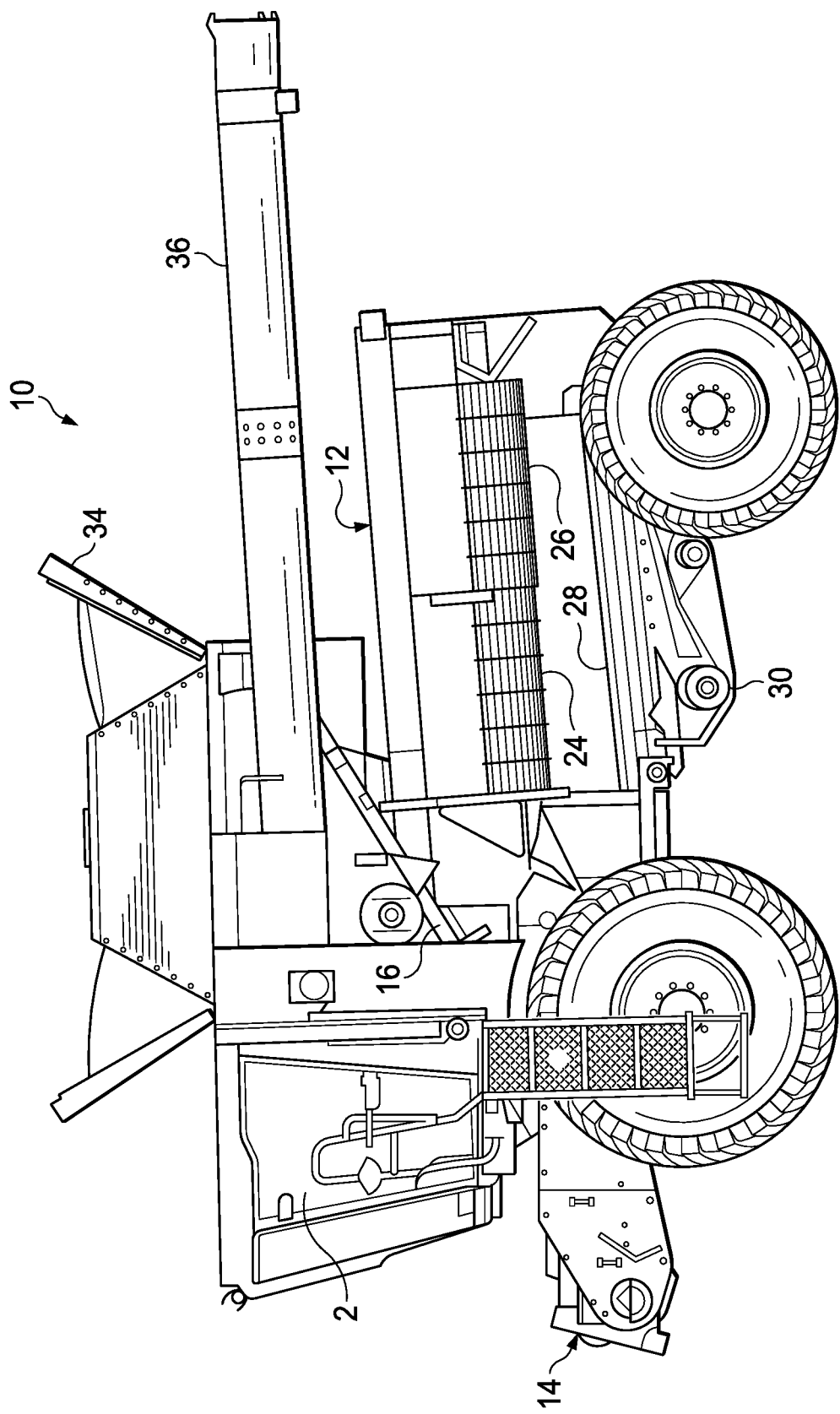
FIG. 1 is a schematic side elevational view of a prior art combine harvester having a processing system utilizing axial flow, portions of the harvester being broken away to reveal internal details of construction.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 4A:
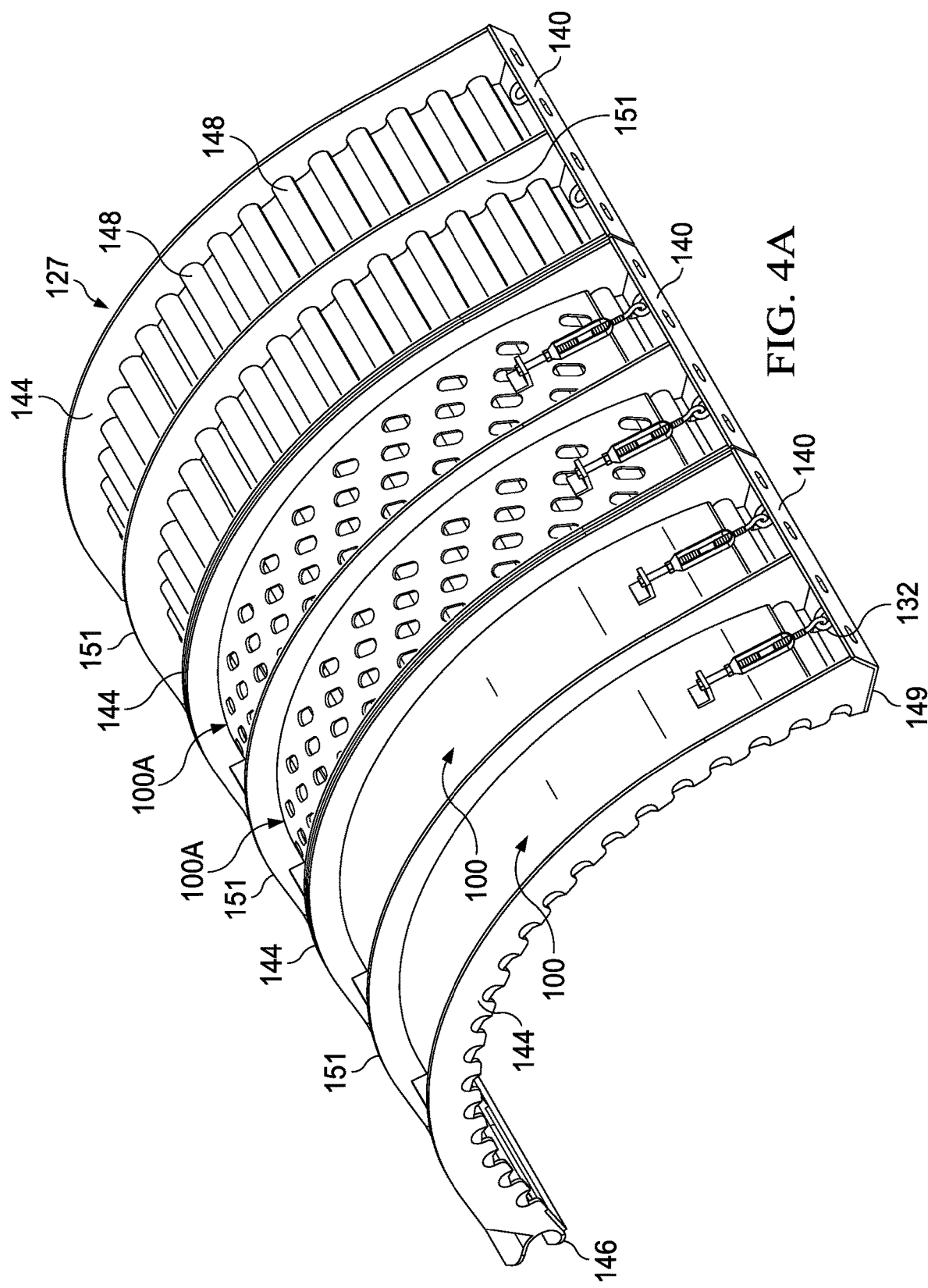
FIG. 4A is an isometric view of multiple threshing concave grates incorporating embodiments of the cover plate assembly of the present invention.
Figure 4B:
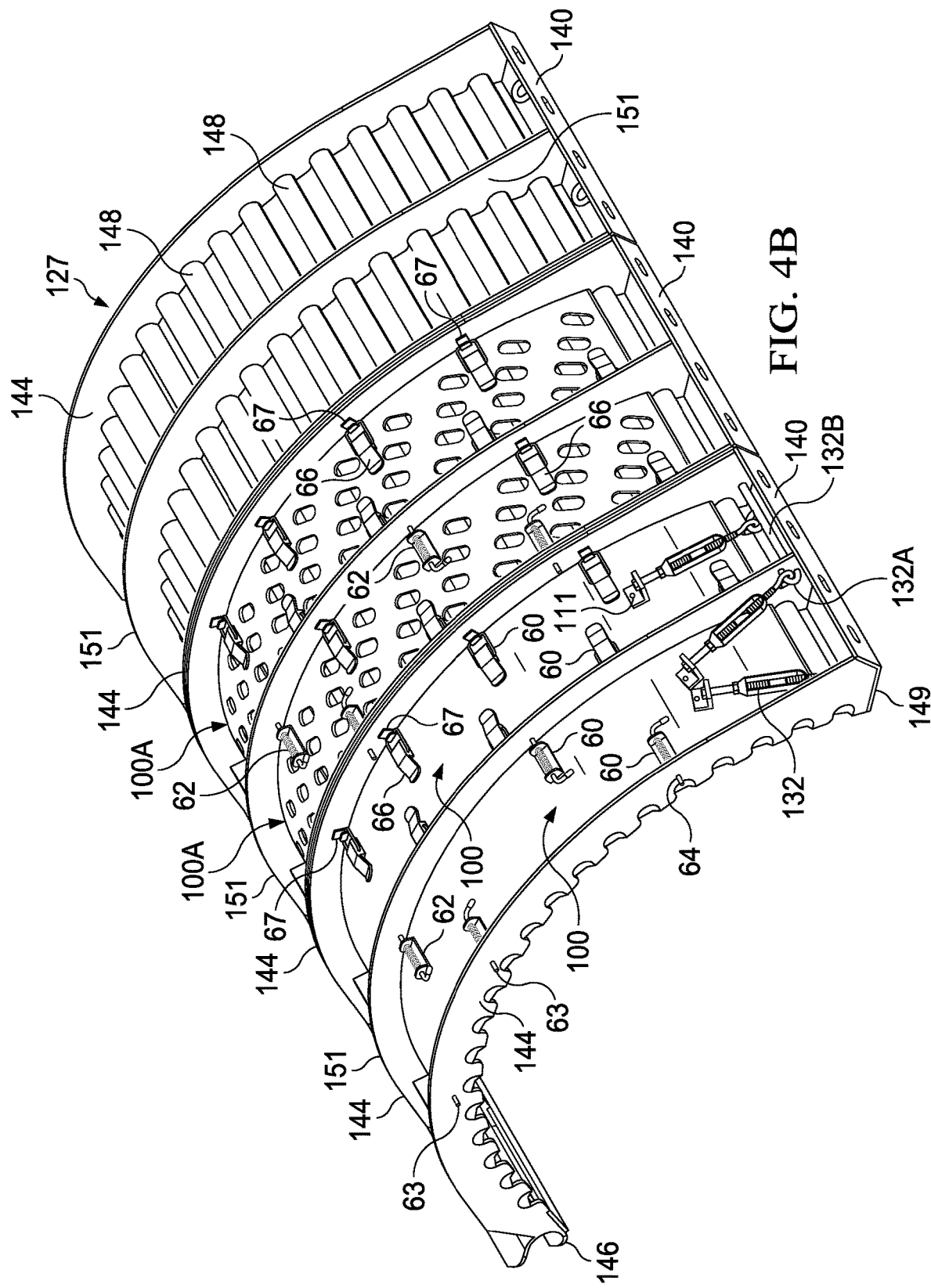
FIG. 4B is an isometric view of a multiple threshing concave grates incorporating alternative embodiments of the cover plate assembly of the present invention.

Turning now to the Figures, and in particular FIGS. 4A and 4B, multiple embodiments of the cover plate assembly of the present invention are shown attached to conventional threshing concave grates 140. While the invention is described herein with respect to a grate of the threshing concave grate assembly, one skilled in the art will understand that the invention may also be used for the separator grate assembly without departing from the scope of the invention.

Figure 2:
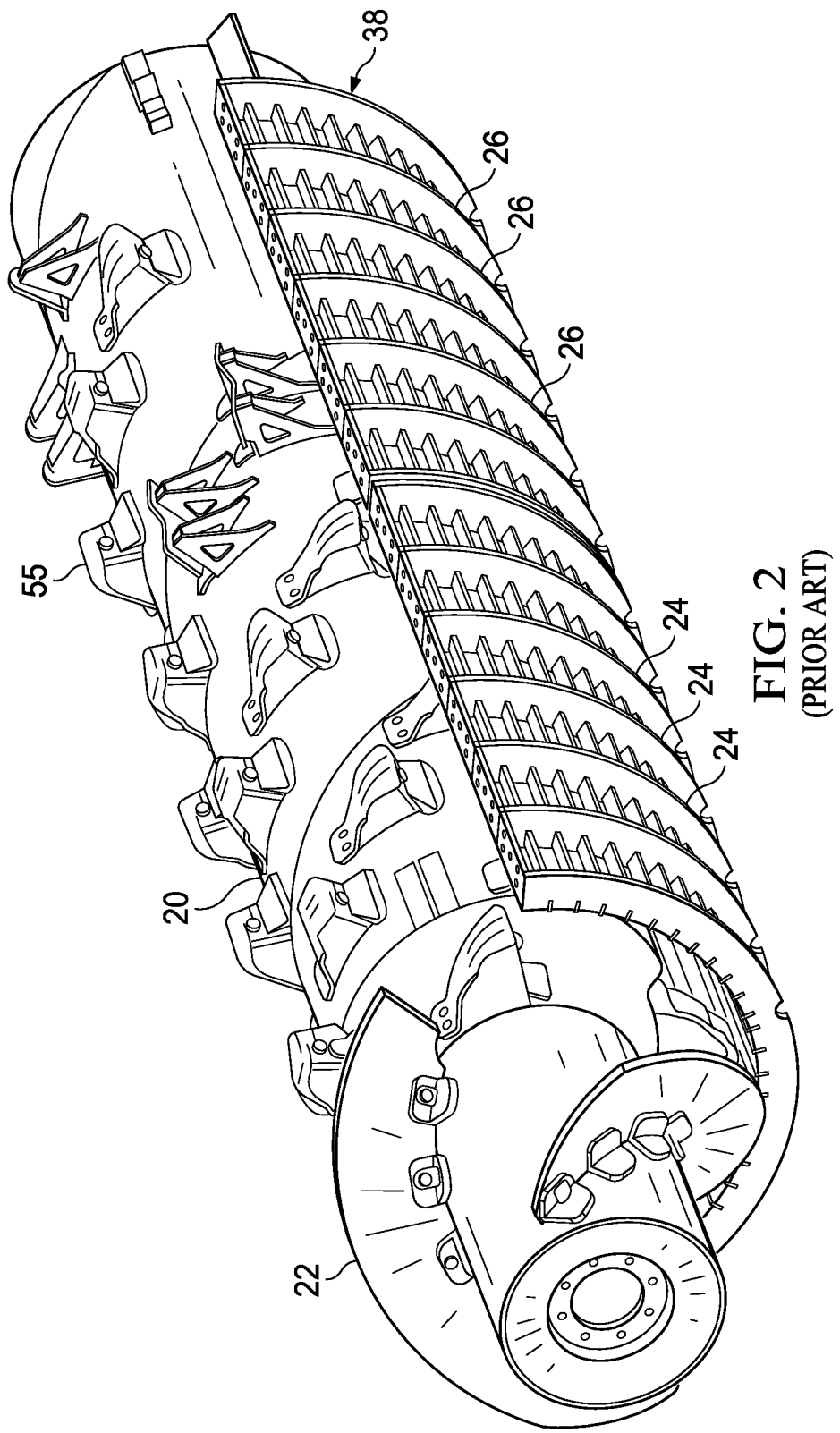
FIG. 2 is an enlarged isometric view of the prior art processing system within the prior art harvester of FIG. 1.
Figure 3A:
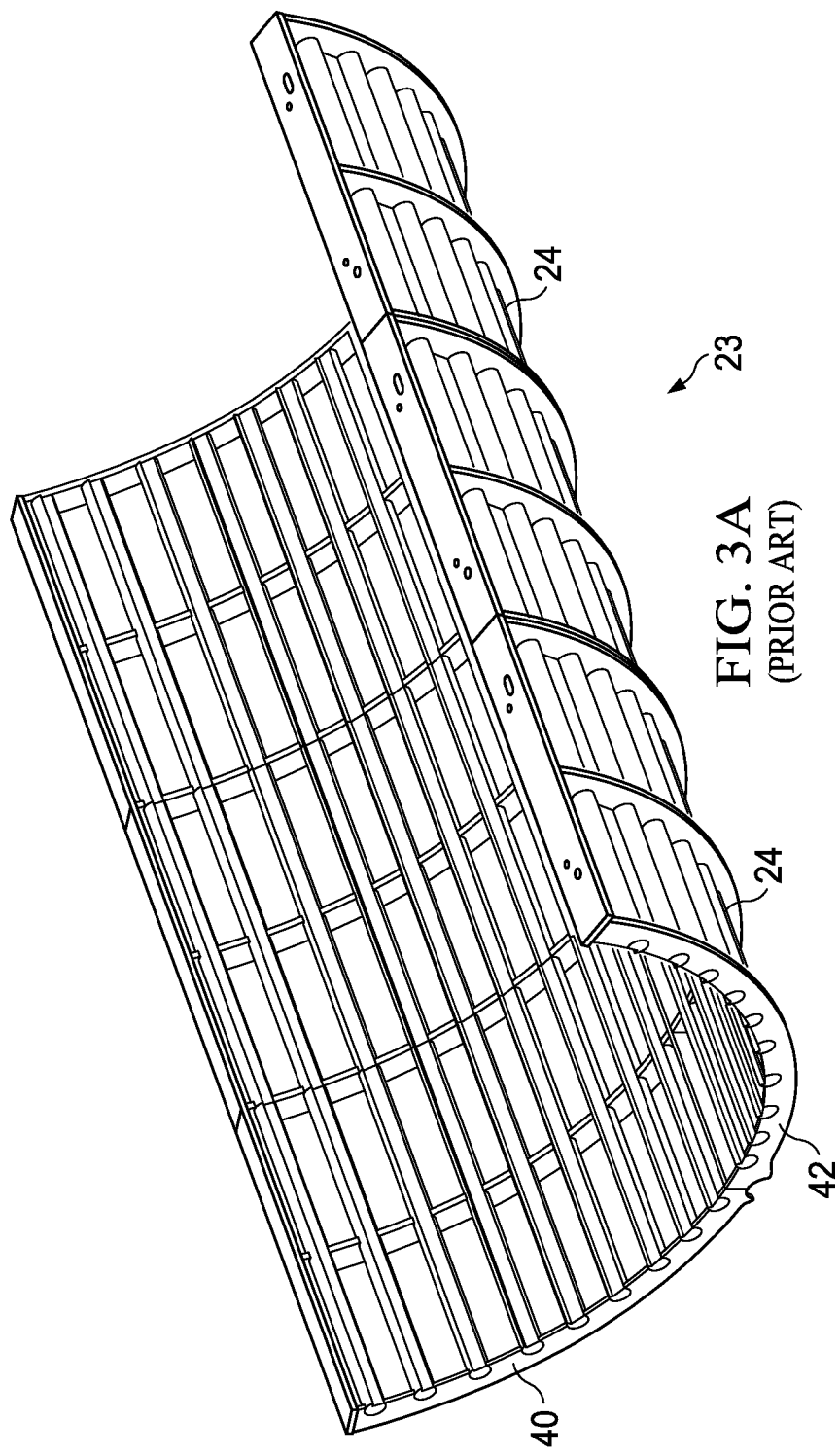
FIG. 3A is an enlarged isometric view of a portion of the prior art processing system of FIG. 2 showing threshing concave grate assemblies.
Figure 3B:
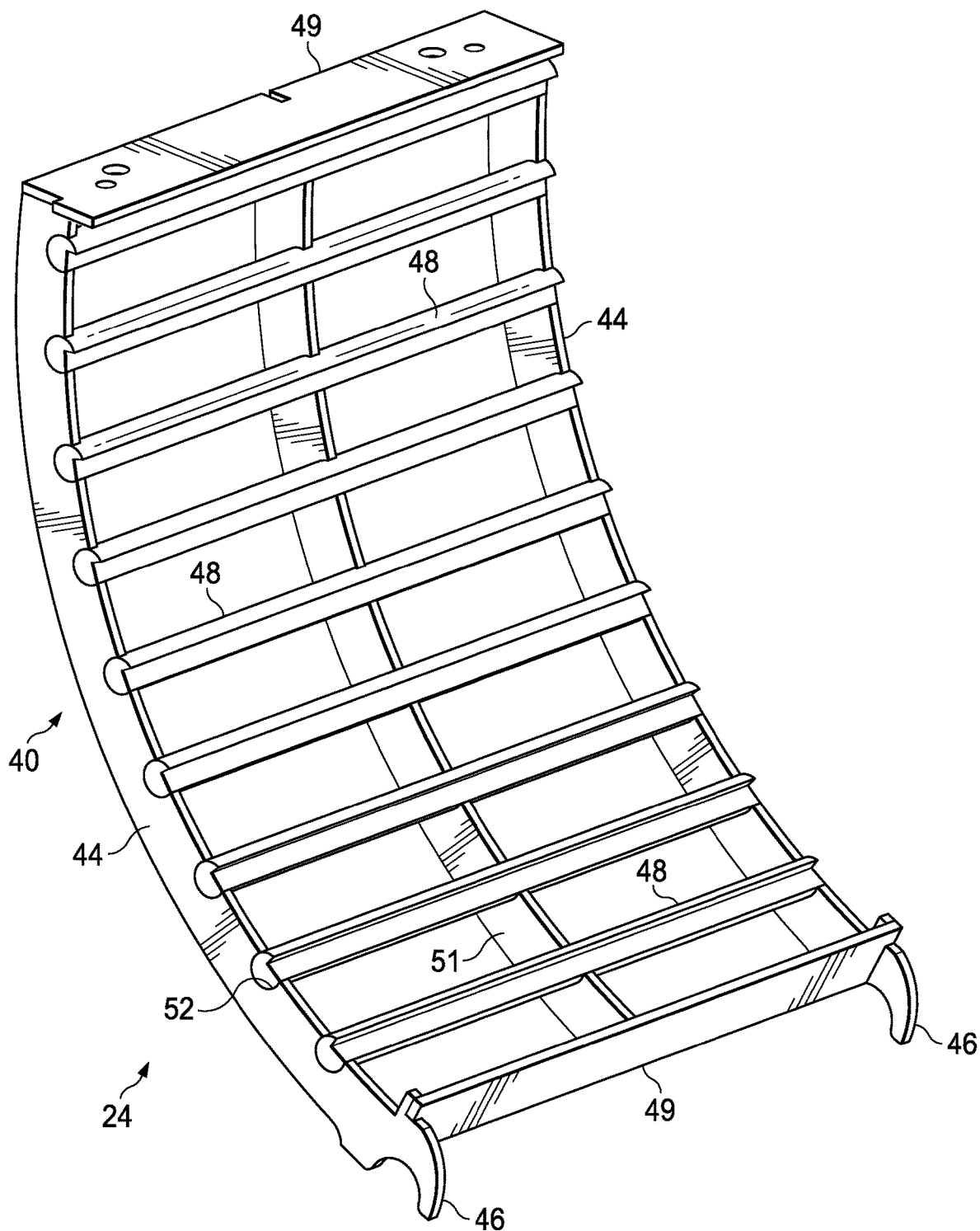
FIG. 3B is a partially cutaway side view of one of the threshing concave grate assemblies of FIG. 3A.

Each of the depicted conventional threshing concave grates 140 include a pair of arcuate, elongated and laterally spaced apart side rails 144 oriented generally transverse to the axis of the rotor 20 (FIG. 2). One end of each side rail 144 has a hook element 146 used to mount the threshing concave grate 140 on an axial bar (not shown) used to move the threshing concave grate 140 closer or further away from the rotor 20 (FIG. 2). A plurality of axial bars 148 span the side rails 144. End plates 149 are preferably affixed between ends of the side rails 144. A middle support rail 151 is typically positioned between and parallel to the side rails 144 and supports the axial bars 148. While the concave grates shown in the drawings depict concave grates typically found on John Deere® combine harvesters, it should be understood that the present invention is not limited to concave grates found on John Deere® combine harvesters, but applies to and may be readily adapted to all makes of combine harvester concave grates.

The axial bars 148 typically have outwardly projecting overhangs at their opposite ends that overlay upper edges of the side rails 144 and are operable to bear against the same when grate 140 is installed. Preferably, the overhangs are received in notches 152 (FIG. 5B) in the upper edges of side rails 144 and welded to the side rails 144. The overhangs also provide a substantially continuous surface when multiple grate assemblies 24, 26 (FIG. 1) are installed side-by-side in the harvester 10 (FIG. 1). While the axial bars 148 shown in FIGS. 4A and B are depicted as having a round or partially round cross section, it is understood that the axial bars 148 can also have a completely round, notched, oval, rectangular or polygonal cross-section.

A first embodiment of the cover plate assembly 100 is depicted in FIG. 4A. The cover plate assembly 100 comprises an elongated plate body 102 dimensioned to be positioned between two parallel arcuate rails (e.g., arcuate side rail 144 and middle support rail 151) of a threshing concave grate 140. The cover plate assembly 100 is designed to be configured in a curved supinated position against the plurality of axial bars 148 on the exterior of the threshing concave grate 140.

The opposing ends of the elongated plate body 102 of the cover plate assembly 100 are secured to the axial bars by means of clasp elements 104, 106 formed in the opposing ends of the cover plate assembly 100. The clasp elements 104, 106 have a dimensional shape that is complementary to the cross-sectional shape of the axial bars 148, such that they can be easily and quickly attached from the exterior side of the threshing concave grate 140 and slidably locked in place by a simple tug along the longitudinal axis of the cover plate assembly 100. Both clasp elements 104, 106 extend from or are configured on the interior facing surface 102a of the elongated body 102.

Figure 5A:
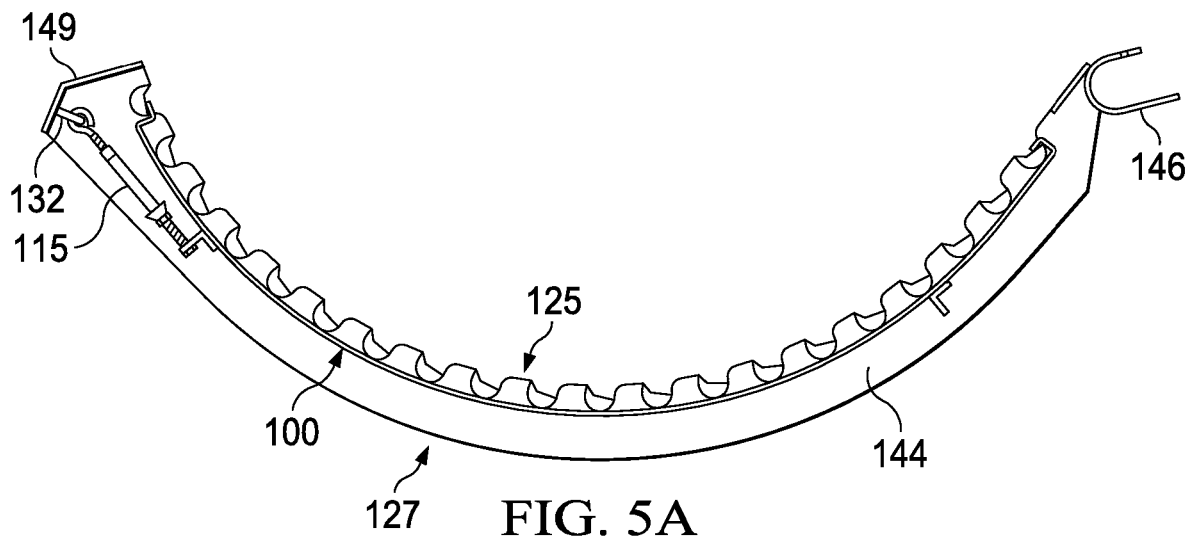
FIG. 5A is a partially cutaway side view of a threshing concave grate incorporating principles of the cover plate assembly of the present invention.
Figure 5B:
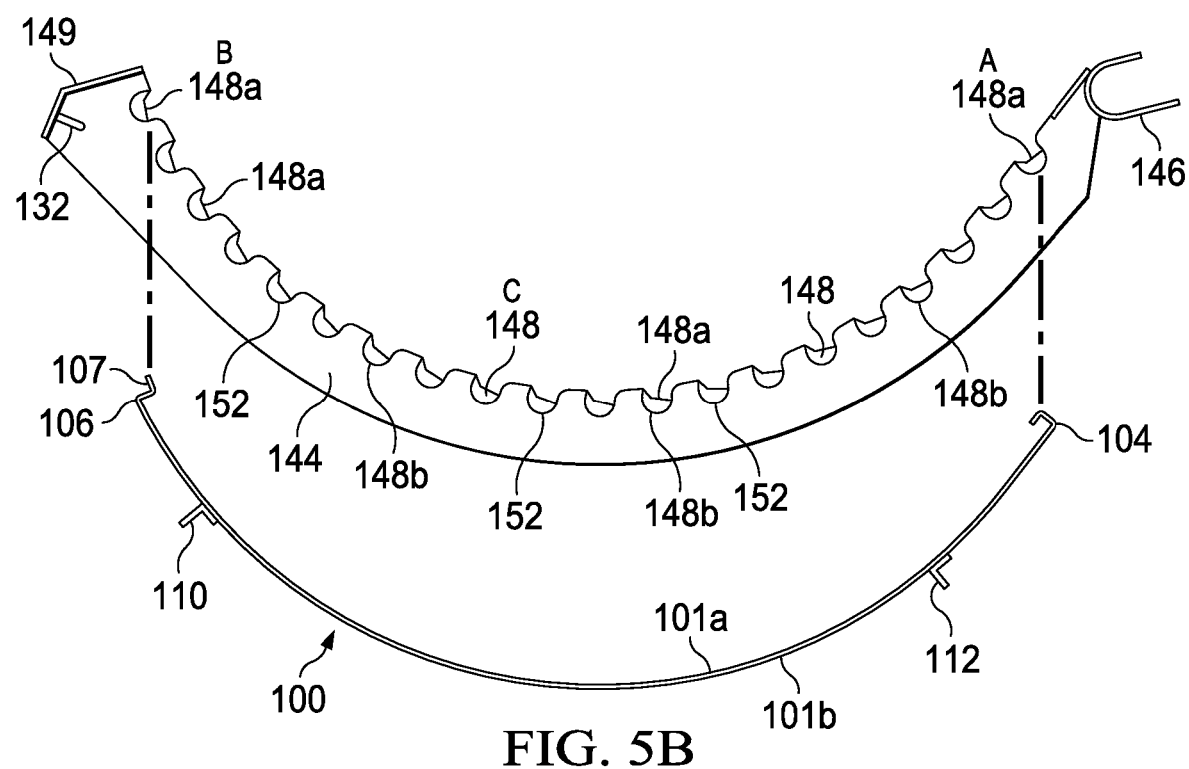
FIG. 5B is an exploded view of the cover plate assembly of the present invention shown in FIG. 5A.
Figure 5C:
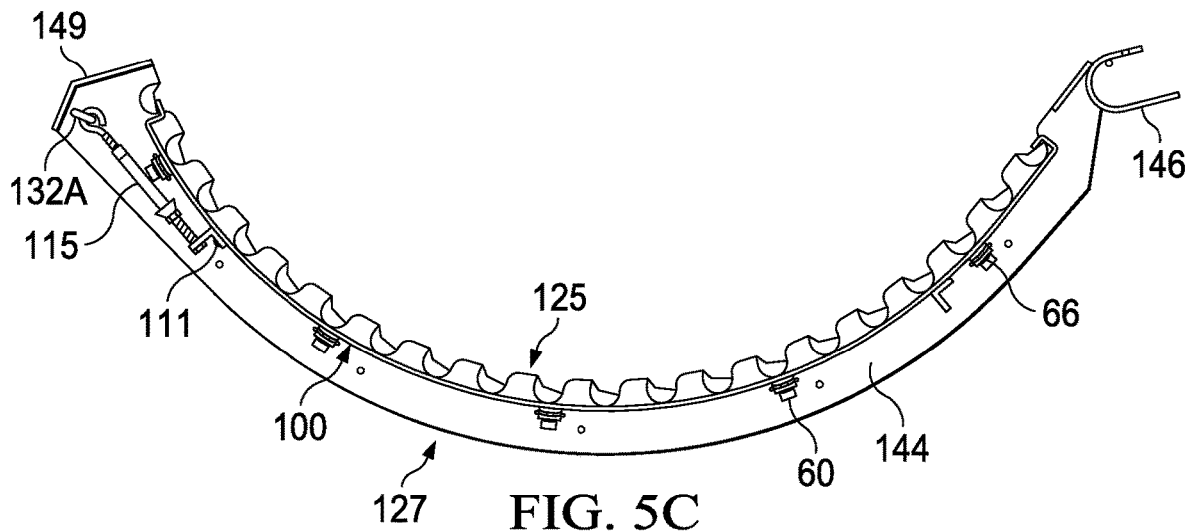
FIG. 5C is a partially cutaway side view of a threshing concave grate incorporating principles of alternative embodiment of the cover plate assembly of the present invention.
Figure 7A:
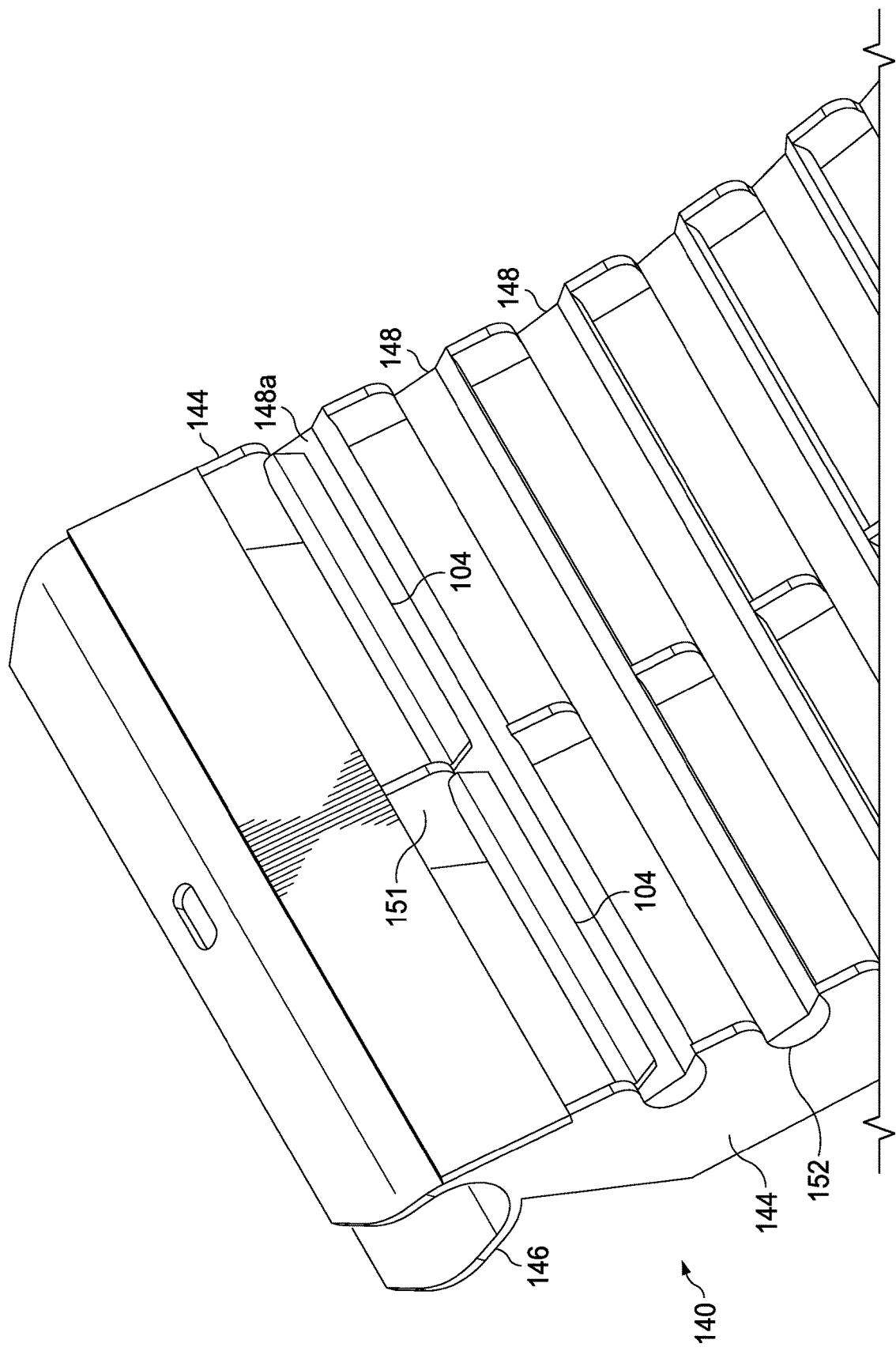
FIG. 7A is an enlarged isometric view of an embodiment of the first or front end of the cover plate assembly of the present invention.

For example, as shown in FIGS. 5B and 7A, the cover plate assembly 100 includes a U-shaped clasp element 104 formed in the first or front end of the elongated plate body 102. The complementary shape of the U-shaped clasp element 104 enables it to be inserted from the exterior side of the threshing concave grate 140 and firmly hook on and grasp the interior or top surface of an axial bar 148a when the cover plate assembly 100 is moved or rotated towards an anchor device (i.e., to the left, as depicted in FIG. 5B) installed on the interior surface of the end plate 149 of the threshing concave grate 140.

Figure 7B:
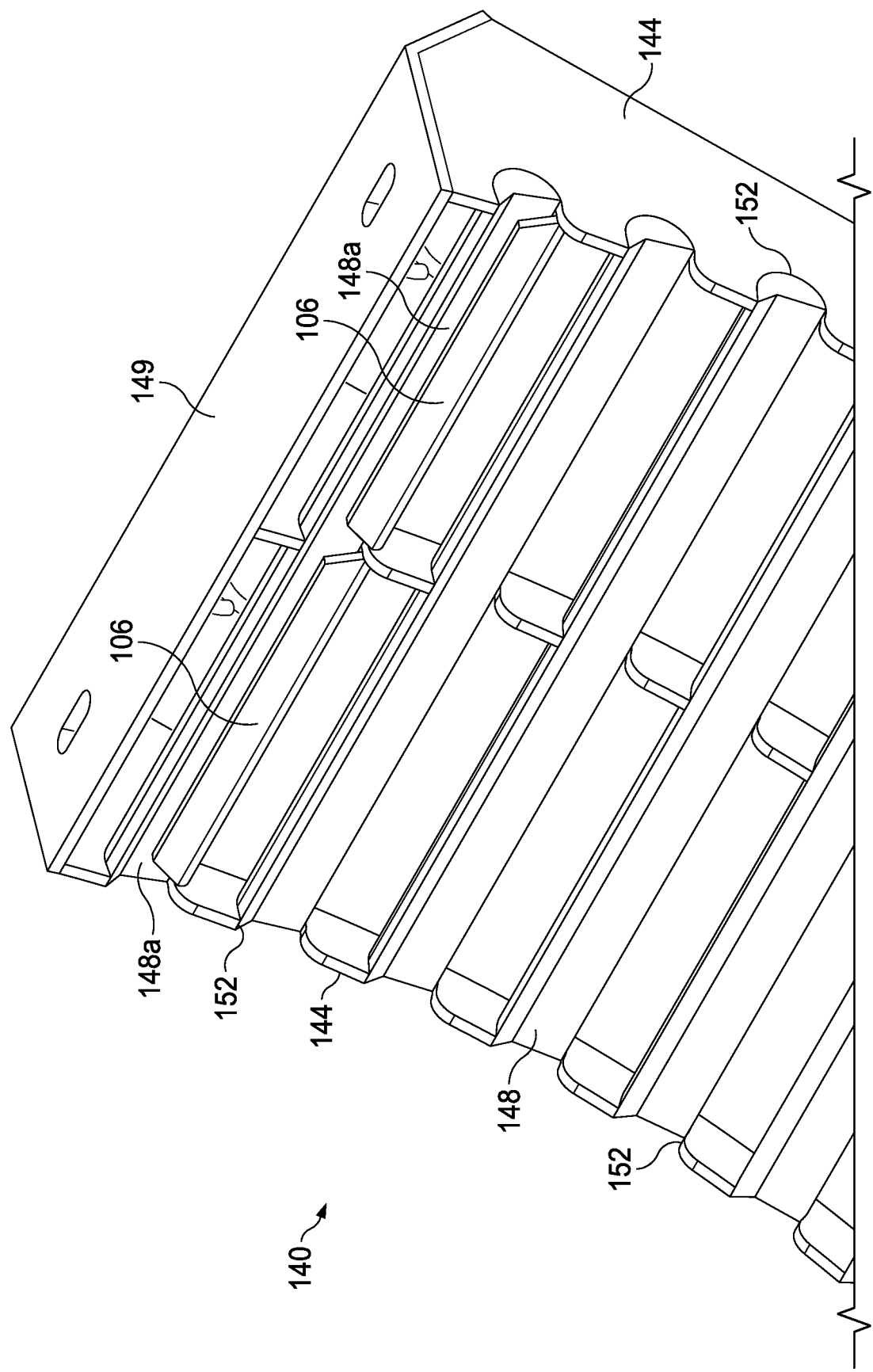
FIG. 7B is an enlarged isometric view of an embodiment of the second or back end of the cover plate assembly of the present invention.

Similarly, as shown in FIGS. 5B and 7B, the cover plate assembly 100 further includes an inverted L-shaped clasp element 106 formed in the second or back end of the elongated plate body 102. The shape of the inverted L-shaped clasp element 106 enables it to also be inserted from the exterior side of the threshing concave grate 140 so that a ledge or surface 107 engages the top surface of another axial bar 148a' when the cover plate assembly 100 assembly is moved or rotated towards an anchor device (i.e., to the left, as depicted in FIG. 5B) installed on the interior surface of the end plate 149 of the threshing concave grate 140.

Preferably, the cover plate assembly 100 is configured so that the clasp elements 104, 106 simultaneously engage their respective axial bars 148 when the cover plate assembly 100 is rotated or moved into its first embodiment of the cover plate assembly 100 is depicted locked position. The cover plate assembly 100 may also include one or more accessory brackets 112 attached to the exterior-facing side 102b of the cover plate body 102 to assist the user in properly positioning and initially securing of the cover plate assembly 100 to a threshing concave grate 140.

The cover plate assembly 100 further includes a latching mechanism 115 that maintains the lateral position of the cover plate assembly 100 so that the clasp elements 104, 106 stay locked in position about their respective axial bars 148. For example, as depicted in FIGS. 4A and 5A, in a preferred embodiment the latching mechanism 115 comprises a turn-buckle tension device configured between an anchor device 132 secured to an end plate 149 of the threshing concave grate 140 and an anchor bracket 110 attached to the exterior-facing side 101b of the cover plate body 102. In an alternative embodiment, the latching mechanism 115 comprises a conventional tension draw latch assembly. Indeed, one skilled in the art will understand that a wide variety of latching mechanisms can be employed to apply a tension force between the anchor bracket 110 attached to the elongated body 102 and the anchor device 132 secured to an end plate 149 of the threshing concave grate 144.

With reference now to FIGS. 4B, 5C-D and 6C-D, in another preferred embodiment, the latching mechanism 115 may comprise a turn-buckle tension device configured between an anchor device 132A secured to a side rail 144 of the concave grate assembly 140 and an anchor bracket 110 attached to the exterior-facing side 101b of the cover plate body 102. As shown in FIG. 4B, the anchor device 132B may alternatively comprise a bar attached to and extending between the opposing side rails 144 of the concave grate assembly 140. The anchor bracket 110 may be rigidly attached (e.g., welded) to the exterior-facing side 101b of the cover plate body 102. Alternatively, the anchor bracket 110 may pivotally attached to the exterior-facing side 101b of the cover plate body 102 by means of a pivoting rivet assembly 111. The pivoting rivet assembly 111 enables an anchor bracket 110 to be properly angled and configured for either an end mounted anchor device 132 or a side-rail mounted anchor device 132B.

With reference again to FIGS. 4B, 5C-D and 6C-D, in yet another alternative embodiment, the cover plate 100 of the present invention may include one or more side latching mechanisms 60 that maintain the lateral position of the cover plate 100 within the side rails 144 so that the hooking clasp elements 104, 106 stay engaged about their respective axial bars 148. The side latching mechanisms 60 may be used as an alternative to, or in addition to, the previously disclosed end latching devices (e.g., 110, 115, 132). For example, as shown in FIG. 4B in a preferred embodiment, the side latching mechanism 60 may comprise at least one sliding bolt latch mechanism 62 attached to the cover plate 100 and configured to engage a corresponding hole 63 drilled in the side rail 144 of the concave grate assembly 140. As depicted, the sliding bolt latch mechanism may include a biasing element (e.g., spring or cam) to bias the sliding bolt in the locked or engaged position. In another embodiment, the side latching mechanism 60 may comprise at least one tension draw latch assembly 66 configured to engage a latch catch 67 attached to or formed into the side rail 144 of the concave grate assembly 140. Indeed, one skilled in the art will understand that a wide variety of side latching mechanisms can be employed to secure the configuration of the cover plate body 102 on the concave grate assembly 140.

When properly installed and secured in a locked position, the elongated body 102 of the cover plate assembly 100 is pulled tightly against the back of the exterior side of the threshing concave grate 140 significantly changing airflow characteristics through the openings in the threshing concave grate 140 and consequently creating a cushion of air between threshing concave grate 140 and the rotor/cylinder of the combine harvester. This cushion of air regulates the rate at which the crop material moves through the concave section. By restricting the airflow through a threshing concave grate, the time in which the crop is in the threshing section of the concave is prolonged, which facilitates more material-on-material rubbing contact, thereby greatly improving threshing and separation of grain from chaff for hard-to-thresh crop types and varieties.

Figure 5D:
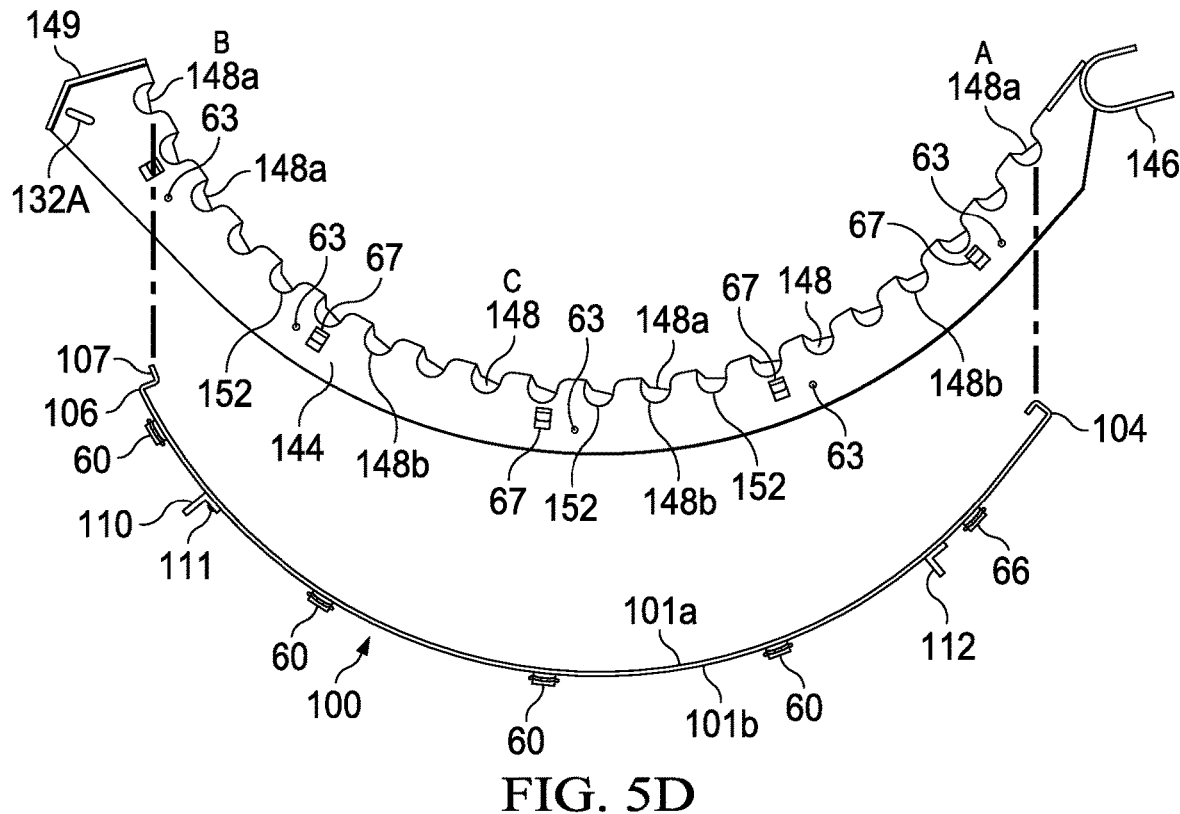
FIG. 5D is an exploded view of the alternative embodiment of the cover plate assembly of the present invention shown in FIG. 5C.

The embodiment of the cover plate assembly 100 shown in the Figures is preferably constructed of a single plate of high strength material such as metal, high strength plastics or composite fabric material. While a preferred embodiment of the cover plate assembly 100 is constructed of steel plating that is permanently bent in an arcuate shape matching the exterior arcuate shape of a threshing concave grate 140 as shown in FIGS. 5B and 5D, it is understood that the elongated body of the cover plate assembly may be constructed of flexible, high strength materials such as stainless steel or woven composite materials. Alternatively, the elongated body can also be cast into a predetermined arcuate shape matching the exterior arcuate shape of a threshing concave grate 140. In addition, while a preferred embodiment of the cover plate assembly features an elongated body 102 having a unitary construction, wherein the clasp elements 104, 106 on opposing ends of the assembly 100 are simply formed into the ends of the elongated body 102, it is understood that the elongated body 102, and the two clasp elements 104, 106 may comprise individual parts of a composite construction wherein the elongated body and the clasp elements are constructed of different materials. For example, the elongated body 102 may be constructed of a woven, high-strength, plastic material, while the clasp elements 104, 106 may be constructed of metal that are attached to opposing ends of the elongated body.

Figure 6A:
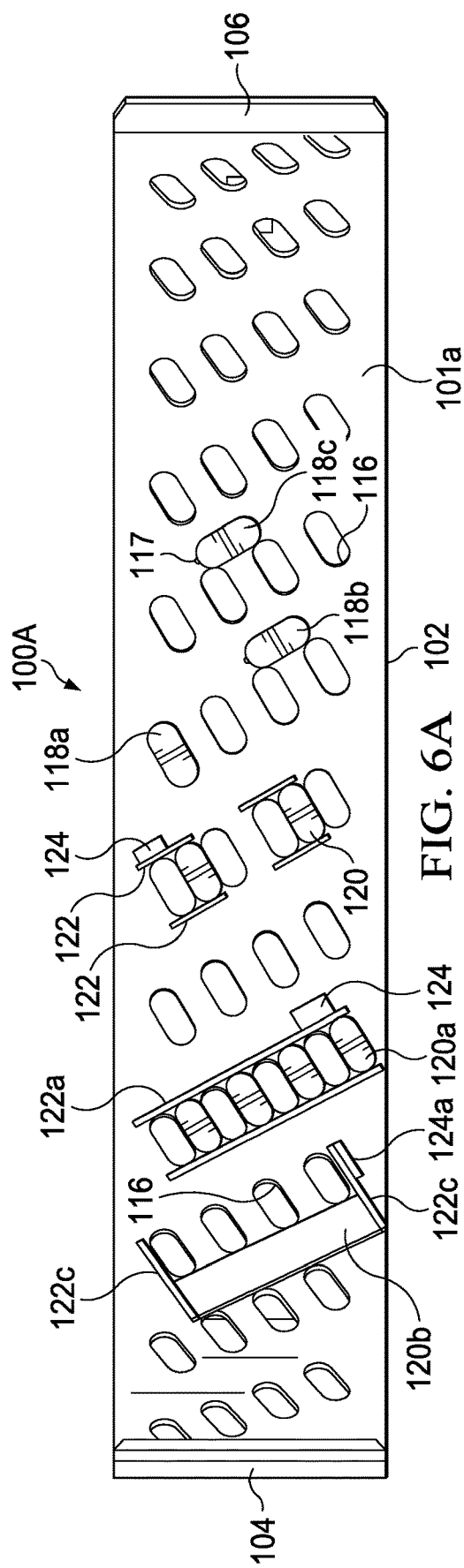
FIG. 6A is a top plan view of the interior side of the cover plate assembly of the present invention shown in FIG. 5A and further illustrating multiple embodiments of simplified automated, dynamic cover plate mechanisms.
Figure 6B:
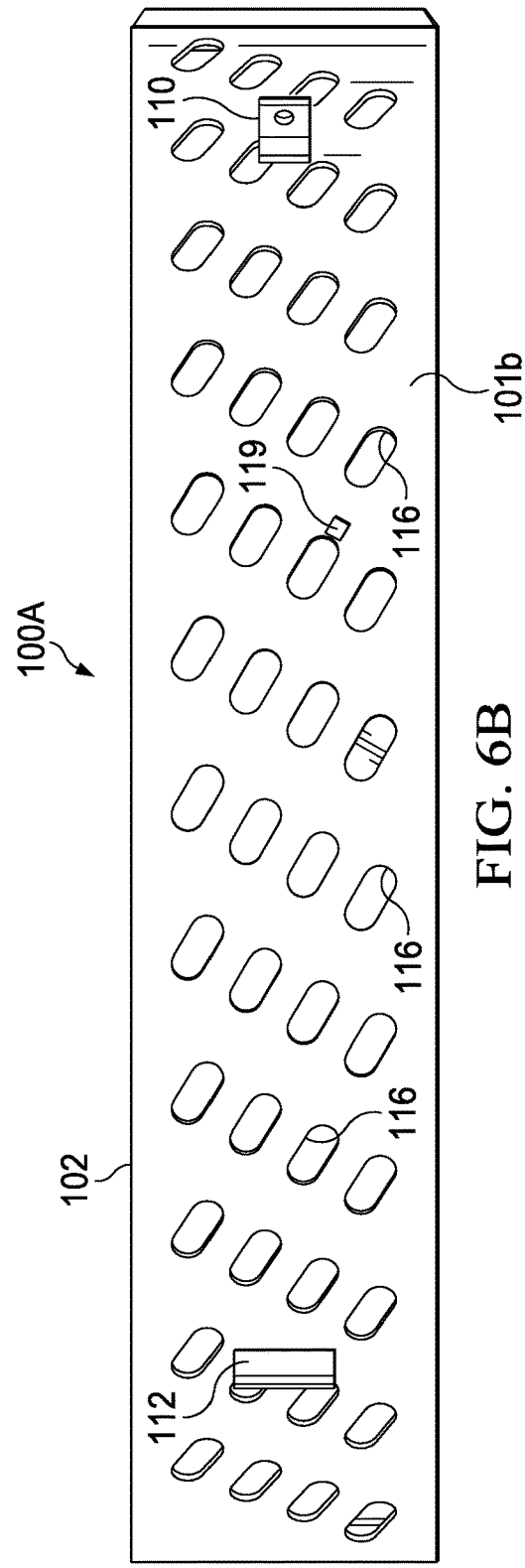
FIG. 6B is a top plan view of the exterior side of the cover plate assembly of the present invention shown in FIG. 5A and further illustrating multiple embodiments of simplified automated, dynamic cover plate mechanisms.

Additionally, the material used to construct the elongated body of the cover plate assembly may also have a wide variance of porosity and permeability. This may be accomplished by a variety of techniques. While a preferred embodiment of the cover plate assembly is constructed of solid plate material, other embodiments include a plurality of apertures or holes formed in the elongated body. For example, as shown in FIGS. 4 and 6, a second embodiment of the cover plate assembly 100A further includes a plurality of apertures or holes 116 formed in the rectangular body 102 of the cover plate assembly 100A. The holes 116 may be configured randomly or in a geometric pattern as shown in FIGS. 6A-D. In addition to increasing the airflow through the cover plate assembly 100A, the holes 116 provide additional exit passages for threshed grain to be unloaded from the rotor/cylinder and captured so that the separation grate is not overloaded. The plurality of apertures or holes 116 may further include means for adjusting the shape or size of the aperture 116. For example, in one embodiment, such adjusting means may simply comprise a plug device 118 for plugging the aperture. The plug device 118 can comprise a screw-in or pop-in plug 118a or a flapper-like cover 118b. Alternatively, the adjusting means may comprise a sliding panel or gate mechanism incorporated into the elongated body 102 that features a movable gate section 120 which could be configured to close or partially close a hole or aperture 106.

The material that the elongated body 102 is constructed of may also have a natural porosity and permeability. For example, the elongated body of the cover plate may be constructed of a metal mesh or composite material having organic porosity and permeability characteristics.

The longitudinal length of the elongated body 102 of the cover plate assembly 100 may also be varied to change the characteristics of the threshing concave grate. While a preferred embodiment of the invention includes an elongated body 102 having a longitudinal length suitably dimensioned to substantially cover the entire lateral circumference of a threshing concave grate, other embodiments may include elongated bodies having lesser longitudinal lengths so as to cover only a portion of the lateral circumference of a threshing concave grate. For example, with reference to FIG. 5B, while a preferred embodiment of the cover plate assembly 100 of the present is dimensioned to substantially cover the entire lateral circumference of a threshing concave grate (i.e., from axial bar 148a (A) to axial bar 148a' (B), other embodiments of the cover plate assembly of the present invention may include elongated bodies having lesser longitudinal lengths so as to cover only a portion of the lateral circumference of a threshing concave grate (i.e., from axial bar 148a (A) to axial bar 148a" (C)).

Figure 8A:
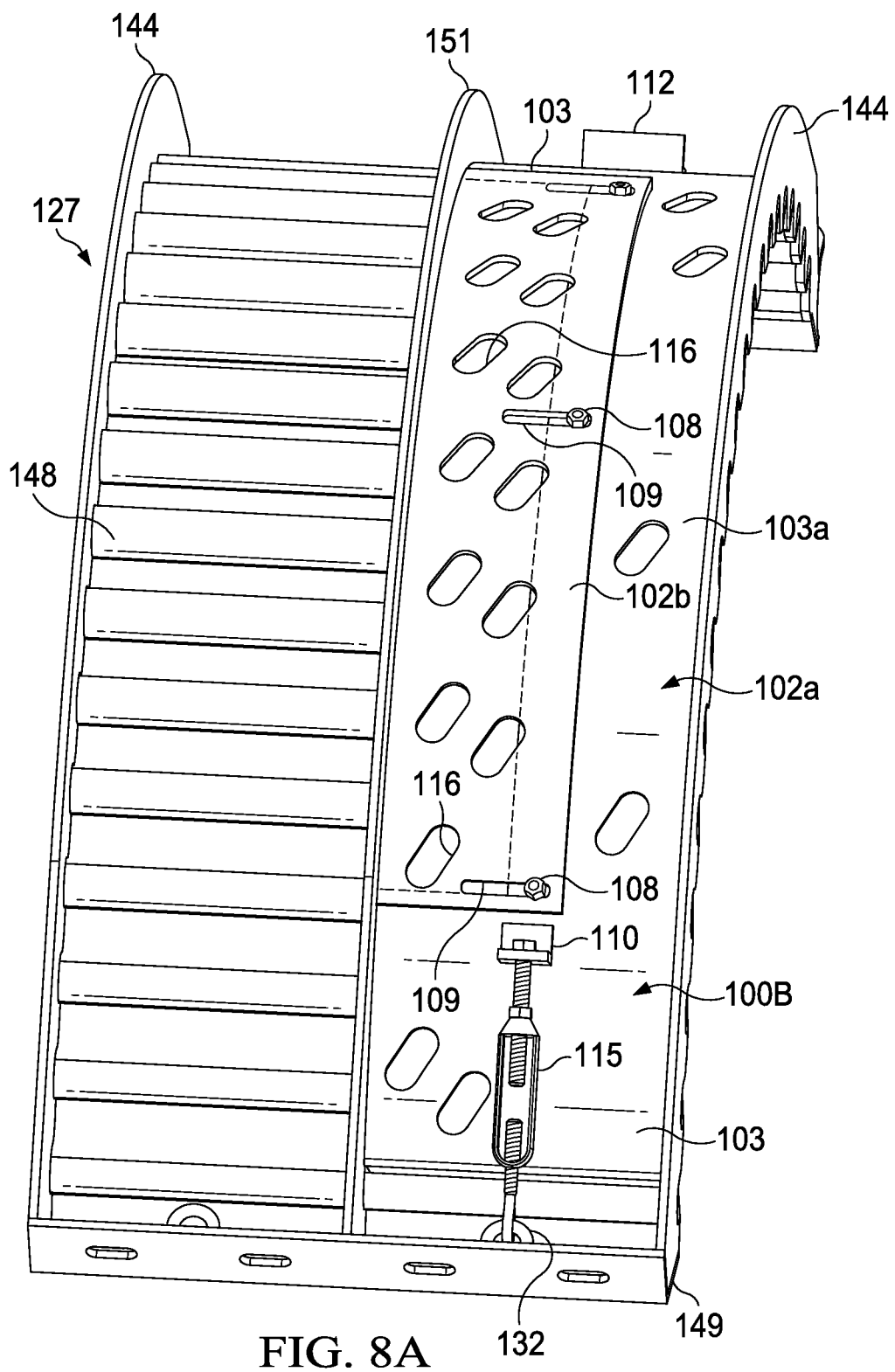
FIG. 8A is a threshing concave grate incorporating an alternative embodiment of the cover plate assembly of the present invention.
Figure 8B:
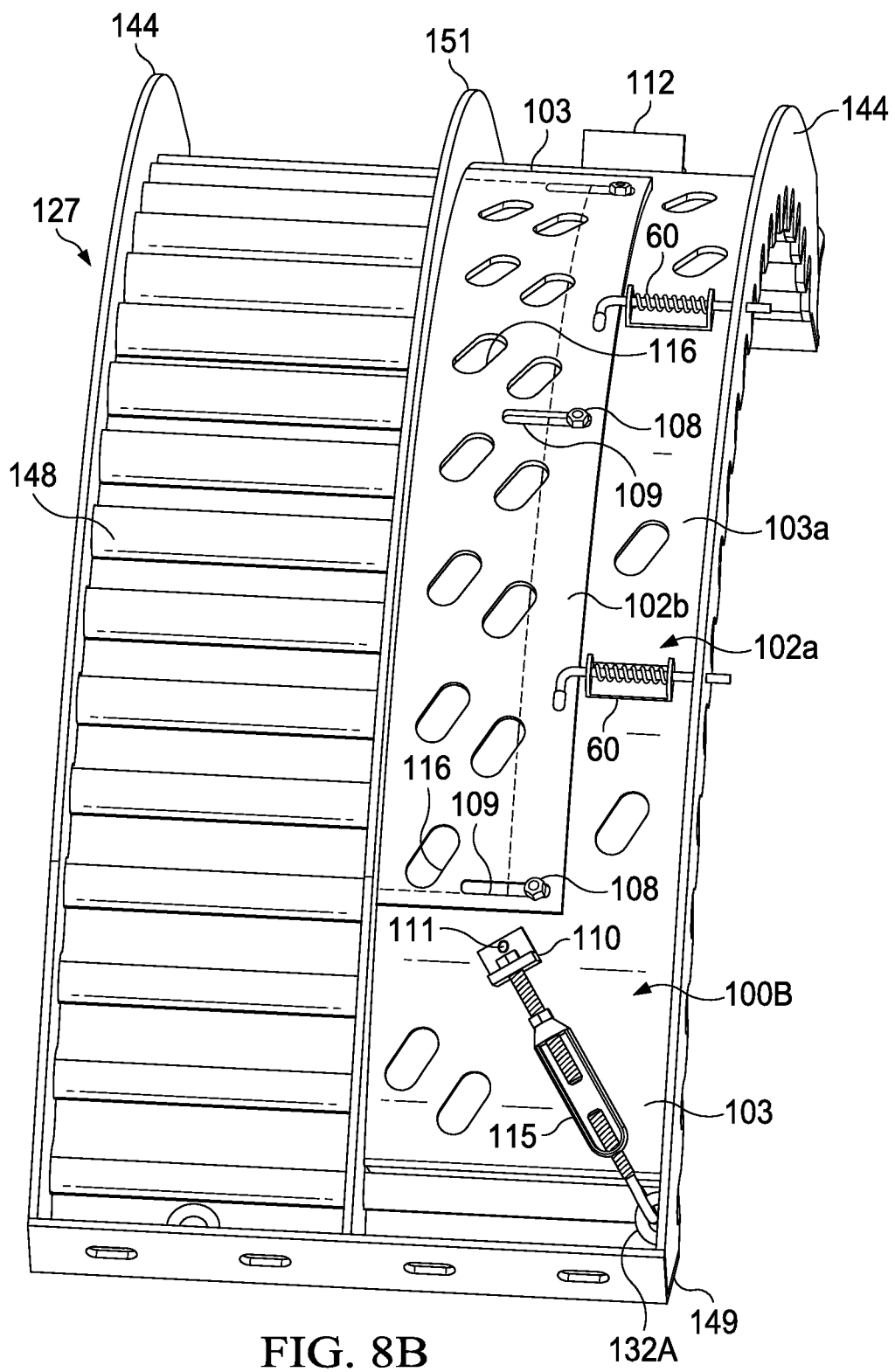
FIG. 8B is a threshing concave grate incorporating another alternative embodiment of the cover plate assembly of the present invention.

With reference now to FIGS. 8A-B another preferred embodiment of the cover plate assembly 100B of the present invention is shown. The cover plate assembly 100B features an elongated body having an adjustable width. The cover plate assembly 100B is dimensioned to fit within a section of a threshing concave grate 140 configured between two parallel arcuate rails (e.g., arcuate side rail 144 and middle support rail 151). The elongated body of the cover plate assembly 100B is comprised of two elongated plates 102a, 102b, which are attached in a slidably adjustable configuration for adjusting the lateral dimension or width of the cover plate assembly 100B. In a preferred embodiment, the two elongated plates 102a, 102b are attached to each other by means of a plurality of bolts 108 attached to a first or main plate 102a and captured in slots 109 formed in a second or accessory plate 102b. The main plate 102a features panel sections 103 configured on each of the opposing ends which span the entire section width of the threshing concave grate 140 while the width of the middle section 103a of the main plate 102a is less than the full section width of the of the threshing concave grate 140. The second or accessory plate 102b is positioned in a slidable configuration with the first or main plate 102a so that the opening in the middle section 103a of the main plate 102a may be adjusted as desired. As with previous embodiments, the elongated plates 102a, 102b of the cover plate assembly 100B may include holes or apertures 116 to further adjust the flow characteristics of the adjustable cover plate assembly 100B.

The cover plate assembly 100B further includes a latching mechanism 115 that maintains the lateral position of the cover plate assembly 100B so that the clasp elements 104, 106 stay locked in position about their respective axial bars 148. For example, as depicted in FIG. 8A, the latching mechanism 115 may comprise a turn-buckle tension device configured between an anchor bracket 110 attached to the exterior-facing side of the cover plate main body 102a and an anchor device 132 secured to an end plate 149 of the concave grate 140. In an alternative embodiment, the end latching mechanism 115 may comprise a conventional tension draw latch assembly. Indeed, one skilled in the art will understand that a wide variety of latching mechanisms can be employed to apply a tension force between the anchor bracket 110 attached to the elongated body 102 and the anchor device 132 secured to an end plate 149 or side rail 144 of the threshing concave grate 144.

As shown in FIG. 8B, the latching mechanism 115 may also comprise a turn-buckle tension device configured between an anchor device 132A secured to a side rail 144 of the concave grate assembly 140 and an anchor bracket 110 attached to the exterior-facing side of the main cover plate body 102a. As previously disclosed, the anchor device 132B may alternatively comprise a bar extending between the opposing side rails 144 of the concave grate assembly 140. The anchor bracket 110 attached to the main cover plate body 102a may be rigidly attached (e.g., welded) to the exterior-facing side of the main cover plate body 102a. Alternatively, the anchor bracket 110 may pivotally attached to the exterior-facing side of the main cover plate body 102a by means of a pivoting rivet assembly 111. The pivoting rivet assembly 111 enables the anchor bracket 110 to be selectively angled and configured for either an end mounted anchor device 132 or a side-rail mounted anchor device 132B.

The cover plate assembly 100B may also or alternatively include one or more side latching mechanisms 60 that maintain the lateral position of the main cover plate assembly 100B within the side rails 144 so that the hooking clasp elements 104, 106 stay engaged about their respective axial bars 148. As mentioned previously, the side latching mechanisms 60 may be used as an alternative to, or in addition to, the previously disclosed end latching devices (e.g., 110, 115, 132). For example, as shown in FIG. 8B in a preferred embodiment, the side latching mechanism 60 may comprise at least one sliding bolt latch mechanism 62 attached to the main cover plate 100b and configured to engage a corresponding hole drilled in the side rail 144 of the concave grate assembly 140. As depicted, the sliding bolt latch mechanism may include a biasing element (e.g., spring or cam) to bias the sliding bolt in the locked or engaged position. In another embodiment, the side latching mechanism 60 may comprise at least one tension draw latch assembly 66 (see FIG. 4B) configured to engage a latch catch 67 attached to or formed into the side rail 144 of the concave grate assembly 140. Indeed, one skilled in the art will understand that a wide variety of side latching mechanisms can be employed to secure the configuration of the main cover plate body 102b on the concave grate assembly 140.

The cover plate assembly of the present invention improves the threshing capability of the rasp bar threshing cylinder while simultaneously permitting the capture of additional threshed grain. Moreover, the methods for using the cover plate assembly of the present invention enables a single set of threshing concave grate assemblies to better harvest a wider variety of crop types.

The cover plate assembly of the present invention eliminates the need to change threshing concave grates when harvesting harder to thresh crops and allows the operator to simply attach cover plate assemblies to the backside (i.e., exterior) of the threshing concave grates. A plurality of cover plate assemblies of the present invention can be readily added to or removed from a combine harvester depending on how difficult the crop is to thresh. In general, crop material that is more difficult to thresh requires more cover plate assemblies so that the crop material is held in the threshing section longer. By adding cover plate assemblies of the present invention to a combine harvester, the operator can adjust the rate at which the crop material moves through the threshing concaves, facilitating more crop material rubbing on crop material, and thereby providing superior threshing capability with less grain damage. In addition, the strategically placed and engineered holes or apertures 116 in the cover plate assembly allow for grain to be captured as it is threshed and retained by the combine. Moreover, it prevents the separation grate assemblies, whose purpose is to unload threshed grain, from becoming overloaded causing grain to be lost out the back of the combine.

Methods employing the cover plate assembly of the present invention also enhance the harvesting effectiveness of combine harvesters when harvesting high-moisture crops. For example, high-moisture corn kernels are harder to separate from the cob, which necessitates the need for the crop material to stay in the threshing section longer. The cover plate assembly can be used to adjust the flow rate of the threshing concave, keeping the crop material (i.e., corn in this particular instance) in the threshing section for a longer time, thereby enabling the threshing section to better separate grain from chaff.

Methods employing the cover plate assembly also enhance the harvesting effectiveness of combine harvesters when harvesting delicate, dry, or easy to crack and/or split crops. For example, edible beans are delicate and are known to crack and split easily. The addition of the cover plate assembly to a threshing concave grate creates a cushion of air which provides for a softer thresh by means of more crop material rubbing on crop material. With the installation the cover plate assembly on the threshing concave grates, the rotor speed can be decreased preventing needless damage to the crop. The air cushion created by the cover plate assembly enables more material-on-material threshing. The clearance or distance between the concave and rotor can also be increased which reduces compressing the crop against the concave thereby decreasing the mechanical damage to the crop. Furthermore, increasing the clearance/distance between the concave and rotor also increases the volume of crop material that can be processed, thereby allowing the operator to increase the ground speed of the agricultural thresher. By increasing the volume of crop material being processed, the rotor is full of more crop material, consequently resulting in more material-on-material threshing and less grain damage (e.g., cracks and splits).

Methods employing the cover plate assembly of the present invention also enhance the harvesting effectiveness of combine harvesters when harvesting crops that have a lot of small leafy, foreign material around seed. Material such as this often ends up intermixed with the harvested seed. Material other than grain (MOG), results in dockage/discount on price per unit the farmer receives when selling the crop. For example, when harvesting sunflower seeds, the seeds thresh easily but there is a lot of leafs, pedals and other foreign material surrounding the seeds. When sunflowers are harvested much of this MOG falls down through the threshing concave grates and oftentimes ends up in the grain tank with the sunflower seeds. The cover plate assembly of the present invention can be used as a course filter to reduce or close the large gaps in the threshing concave grates filtering out a significant portion of the MOG. However, the apertures in the cover plate assemblies will allow the small sunflower seed to still fall through and end up in the tank.

The present invention addresses and overcomes the aforementioned limitations of the prior art by providing a cover plate assembly that restricts the rate of speed at which the crop moves through the threshing concave section, so that the crop is in the threshing concave section which improves the separation of grain and chaff. This proves especially beneficial for hard-to-thresh, delicate and high-moisture crops and allows one set of concaves to be more versatile in all crops. From one crop to the next, cover plate assembly can easily and quickly be added or removed depending on how difficult the crop is to thresh. The cushion of air that is created by the cover plate assembly allows for more material to be processed through a rotor, facilitating more material-on-material rubbing, and thereby producing a cleaner grain sample with less mechanical damage.

While the previously disclosed embodiments of cover plate assemblies and the disclosed methods of use of the present invention greatly improve the threshing and separating performance of combine harvesters by closing or partially closing the apertures in a concave or separator grate assembly thereby changing its flow characteristics, there remains one significant limiting factor—the cover plate assembly must be manually installed or removed from the concave grate, which indubitably limits the practicality of changing the flow characteristics of a concave grate assembly to improve the threshing and separating performance at every beneficial occasion. In other words, the cover plate assembly is either "on" (i.e., installed) the concave grate or it's "off" (i.e., removed) and the process of installing or removing the cover plate assembly is a time-consuming and costly process. For example, in order to close or partially close the concave grate apertures, an operator must shut the combine harvester off, climb out of the cab, open the combine harvester's side panel, remove the shields to the rotor, install the cover plate assembly, put the shields to the rotor back on, close the side panel, climb back into the cab of the combine harvester, start it back up and then continue harvesting. If the concave grate apertures subsequently need to be opened, repeat the same process except remove the cover plate assembly. There is no formula for when a concave assembly needs to be put on or taken off, that depends on many factors including, but not limited to: crop moisture, crop hybrid, crop yield, crop maturity—variables which can all change within the course of seconds, even within the same field. This may seem to be a trivial point; however, it's practically and pragmatically impossible for an operator to shut down harvesting to perform the time-consuming manual process of installing or removing the cover plate assembly every time it would improve the threshing or separating performance. With the current invention, the operator typically assesses the conditions at the start of each harvest day then sets up the concave grate and cover plate assembly with the configuration that they feel will perform best for the majority of that harvest day. Occasionally an operator will make a change within the course of a harvest day, but the operator severely limits their "downtime" because the harvest window (time in which an operator can harvest a crop) is unpredictable, finite and always getting shorter. Further, weather can drastically effect the harvest window so that when the weather is good (meaning they can harvest) they must utilize every second they can because the weather can turn quickly to non-harvestable conditions and harvest can come to an abrupt halt, sometimes for many days. The current cover plate assembly definitely improves the threshing and separation performance of a combine harvester, but on a day-to-day basis in practical-sense, which still has significant value over the course of the harvest season but it does not allow for instantaneous, second-by-second adjustment of the concave flow characteristics to give the operator constant optimal threshing and separating performance—with significant value to the operator. There still exists the need to dynamically adjust the flow characteristics of a concave or separator grate instantaneously or on-the-go. For example, it would be extremely useful if an operator could dynamically adjust or modify the flow characteristics of a concave or separator grate (by opening or closing the concave apertures) remotely from the combine harvester cab 2 (FIG. 1) without having to stop the combine harvester. Moreover, it would be very useful if the flow characteristics of a concave grate could be adjusted automatically and/or dynamically by signal in response to real-time data from environmental, operational and/or historical data via one or more transducers, sensors, cameras, computers, artificial intelligence, ancillary system or a combination thereof. Environmental data includes, but is not limited to crop conditions, harvest conditions, soil conditions, field conditions, atmospheric conditions. Operational data includes, but is not limited to crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position. Historical data includes, but is not limited to environmental data, operational data, performance data and crop data. To further illustrate the need and value of this invention, it is estimated that an automated, dynamic cover plate system like described above would make hundreds of changes to the concave flow characteristics (apertures) to improve threshing and separating performance of a combine harvester in the course of one harvest day—impossible to accomplish with the invention in its current embodiment. It would also be advantageous if such an automated, dynamic cover plate system could be easily adapted to retrofit a wide variety of combine harvesters; in addition to being incorporated into an original equipment manufacturer or production concave grate. Thus, a need exists for an improved and more comprehensive mechanism for dynamically closing or partially closing the apertures in a concave or separator grate assembly by signal so as to modify its flow characteristics, thereby improving its threshing and separating action, instantaneously. This need is further amplified by the fact there is an increasing demand for food production (with the ever increasing global population) and consequently, the weight on operators to meet such demand has never been greater and with limited land, can only be accomplished with increased efficiency and productivity. This invention accomplishes both.

Embodiments of the previously described present invention can be easily automated in a variety of ways. For example, as shown in FIGS. 6A-B a variety of actuation systems may be incorporated into the standard cover plate 100A to automate its flow characteristics (to open, close, or partially close the apertures in the concave whereby crop or grain pass-through). The slideable panel or gate 120 may be automated by configuring it in a track mechanism 122 having a linear actuator device 124 that upon actuation causes the slidable gate 120 to be advanced or retracted automatically over its respective aperture 116 in the cover plate body 102. Moreover, more than one slideable panel or gate 120a may be configured within the track mechanism 122a to cover more than one aperture 116. In addition, the slideable panel or-gate 120, 120a may be dimensioned to cover a single aperture or a series of apertures. For example, as shown in FIG. 6A, a slideable gate 120b is configured between tracks 122c and actuated by linear actuator device 124a to vary the position of the slideable gate 120b over its respective multiple apertures 116.

The linear actuator device 124 may comprise any of a number of known systems such as hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

Alternatively, a plug device 118c may include a rotary pin 117 connected to a rotary actuator device 119 which upon actuation causes the plug device 118c to rotate automatically over or away from its respective aperture 116 in the cover plate body 102. The rotary actuator device may comprise any of a number of known systems such as hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

While the various slideable gates and rotary plugs are depicted on the interior side or surface 101a of the cover plate body 102, it is understood that such slideable gates and rotary plugs may be configured on the exterior side or surface 101b of the cover plate body 102 or even between the interior and exterior surfaces of the cover plate body 102.

The actuator devices 119,124 may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the slidable gates 120 and rotary plugs. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence system may include global positioning system (GPS) information and historical data from previous harvests that can be used to predict variances in yield rates at a particular GPS location, which could be used advantageously to modify or adjust the flow characteristics of the cover plate by closing or opening one or more cover plate apertures 116.

Figure 8C:
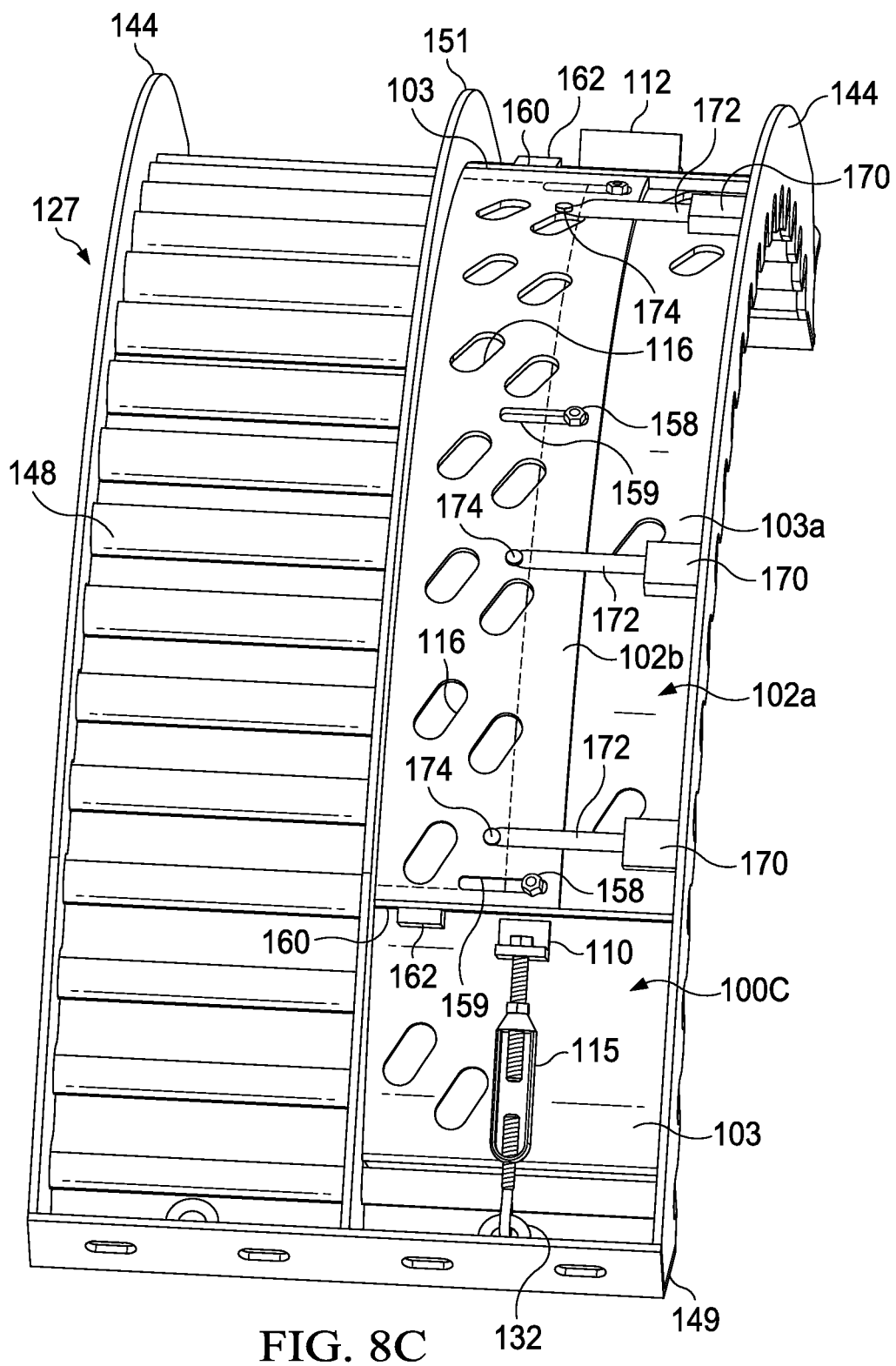
FIG. 8C illustrates a threshing concave grate incorporating an embodiment of an automated, dynamic cover plate assembly of the present invention.

With reference now to FIG. 8C a variety of actuation systems may be incorporated into the previously disclosed embodiment of the cover plate assembly 100B to automate its flow characteristics. The automated cover plate assembly 100C of the present invention features an elongated body having an adjustable width. The cover plate assembly 100C is dimensioned to fit within a section of a threshing concave grate 140 configured between two parallel arcuate rails (e.g., arcuate side rail 144 and middle support rail 151). The elongated body of the cover plate assembly 100B is comprised of the same two elongated plates 102a, 102b, which are attached in a slidably adjustable configuration for adjusting the lateral dimension or width of the cover plate assembly 100C. However, in the automated embodiment, the two elongated plates 102a, 102b are attached to each other by means of a plurality of guide pin bolts 158 attached to the first or main plate 102a and captured in guide slots 159 formed in a second or accessory plate 102b. The main plate 102a features end panel sections 103 configured on each of the opposing ends which span the entire section width of the threshing concave grate 140 while the width of the middle section 103a of the main plate 102a is less than the full section width of the of the threshing concave grate 140. The second or accessory plate 102b is positioned in a slidable configuration with the first or main plate 102a so that the opening in the middle section 103a of the main plate 102a may be adjusted as desired. As with previous embodiments, the elongated plates 102a, 102b of the cover plate assembly 100B may include holes or apertures 116 to further adjust the flow characteristics of the adjustable cover plate assembly 100B.

The automated cover plate assembly 100C further includes an actuating means for automatically adjusting or moving the accessory elongated plate 102b relative to main elongated plate 102a. For example, in one embodiment, the actuating means comprises one or more linear actuators 170 attached to the main elongated plate 102a or side rail 144 and having an actuating means (such as a piston 172) attached to a connector 174 attached to the accessory elongated plate 102b. When actuated, the linear actuator 174 causes the accessory elongated plate 102b to move relative to the main plate 102a so that the opening in the middle section 103a of the main plate 102a may be adjusted as desired.

Alternatively, the actuating means may comprise a track system 160 configured on the opposing ends of the accessory elongated plate 102b. The track system 160 may further comprise a linear actuator device 162 that upon actuation causes the accessory plate 102b to move relative to the main plate 102a so that the opening in the middle section 103a of the main plate 102a may be adjusted as desired.

The linear actuator devices 162, 170 may comprise any of a number of known systems such as hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator devices 162, 170 may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the accessory plate 102b. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence system may include global positioning system (GPS) information and historical data from previous harvests that could be used to predict variances in yield rates at a particular GPS location, which could be used advantageously to modify or adjust the flow characteristics of the automated cover plate assembly 100C by moving the accessory plate 102*b* to a desired position relative to the main plate 102*a*.

Figure 8D:
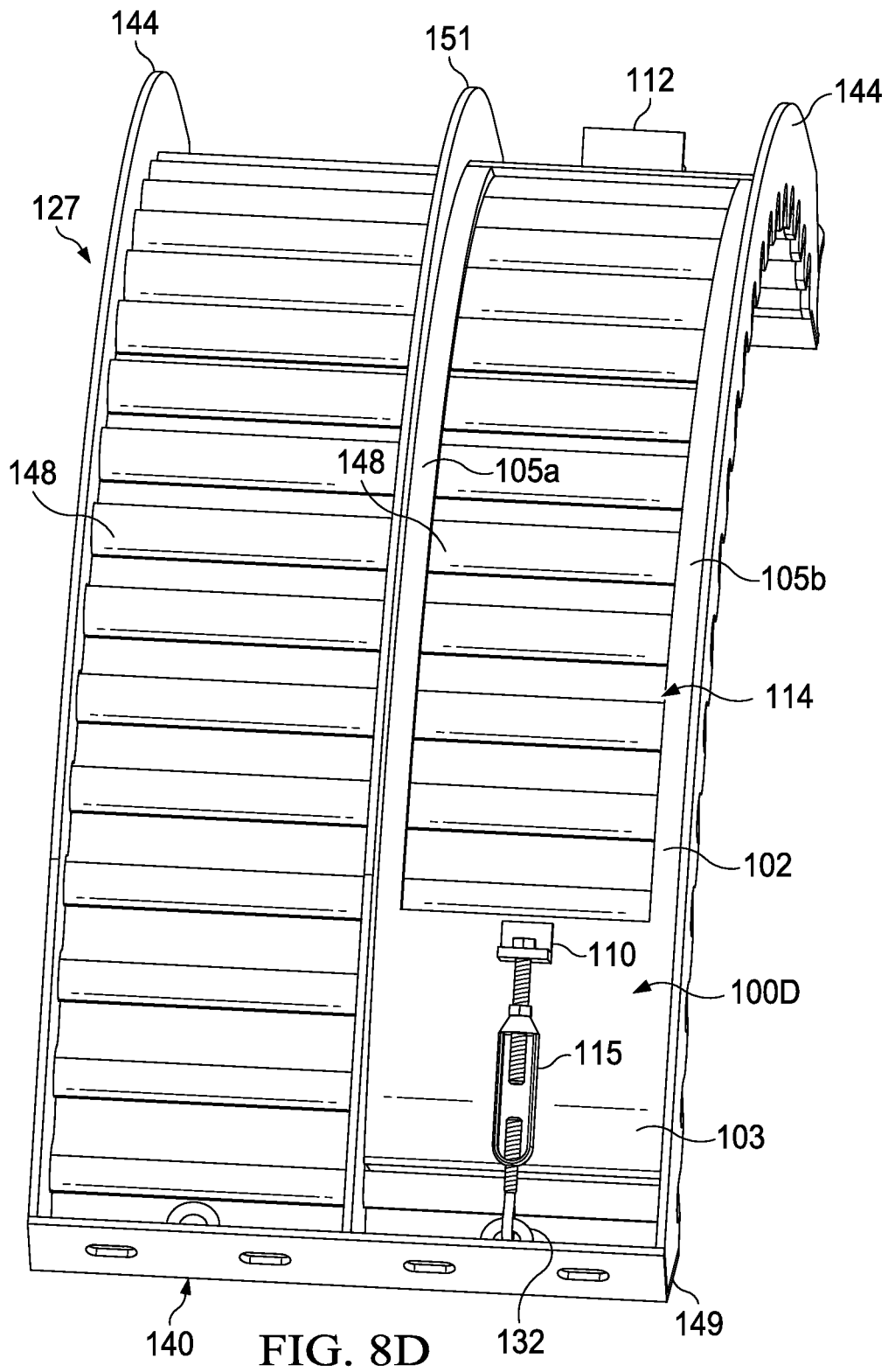
FIG. 8D illustrates a threshing concave grate incorporating another alternative embodiment of the cover plate assembly of the present invention that features a central aperture or hole in the cover plate.

With reference now to FIG. 8D, another embodiment of the cover plate assembly 100D is depicted that permits a variety of automated actuation systems to automate its flow characteristics. The cover plate assembly 100D of the present invention features an elongated body featuring a central opening or aperture 114. The cover plate assembly 100D is dimensioned to fit within a section of a threshing concave grate 140 configured between two parallel arcuate rails (e.g., arcuate side rail 144 and middle support rail 151). The elongated body of the cover plate assembly 100D is comprised of a rectangular body 102 having a central opening section 114. In the embodiment depicted in FIG. 8D, two end panel sections 103 on each end of the rectangular body 102 are connected by side straps or bands 105 that substantially abut against its respective arcuate rails (e.g., arcuate side rail 144 or middle support rail 151) of the threshing concave grate 140. While the central opening section 114 is depicted in FIG. 8D as a single hole or aperture, it is understood that the section may alternatively comprise a section having a series of smaller apertures 116, such as depicted in FIGS. 6A-B.

The end panel sections 103 and the side straps or bands 105 may comprise a unitary or composite structure. For example, the end panel sections 103 and side straps or bands 105 may comprise a unitary structure formed out of a single sheet or panel of material with the central opening 114 being cut out or removed from the sheet or panel. Alternatively, the cover plate assembly 100D may comprise a composite structure, wherein the end panel sections 103 and the side straps or bands 105 are each constructed separately and then bonded together.

The cover plate assembly 100D is designed to be configured in a curved, supinated position adjacent to and against the plurality of axial bars 148 on the exterior of the threshing concave grate 140. The cover plate assembly 100D depicted in FIG. 8D is secured to the axial bars by means of the previously disclosed clasp elements 104, 106 (FIGS. 7A and B) formed in the opposing end panel sections 103 of the cover plate assembly 100D. While the cover plate assembly 100D depicted in FIG. 8D displays a turn-buckle type tension device 115 it is understood that the cover plate assembly 100D may be attached to the concave grate 140 by any previously disclosed methods or devices in this description.

Figure 9A:
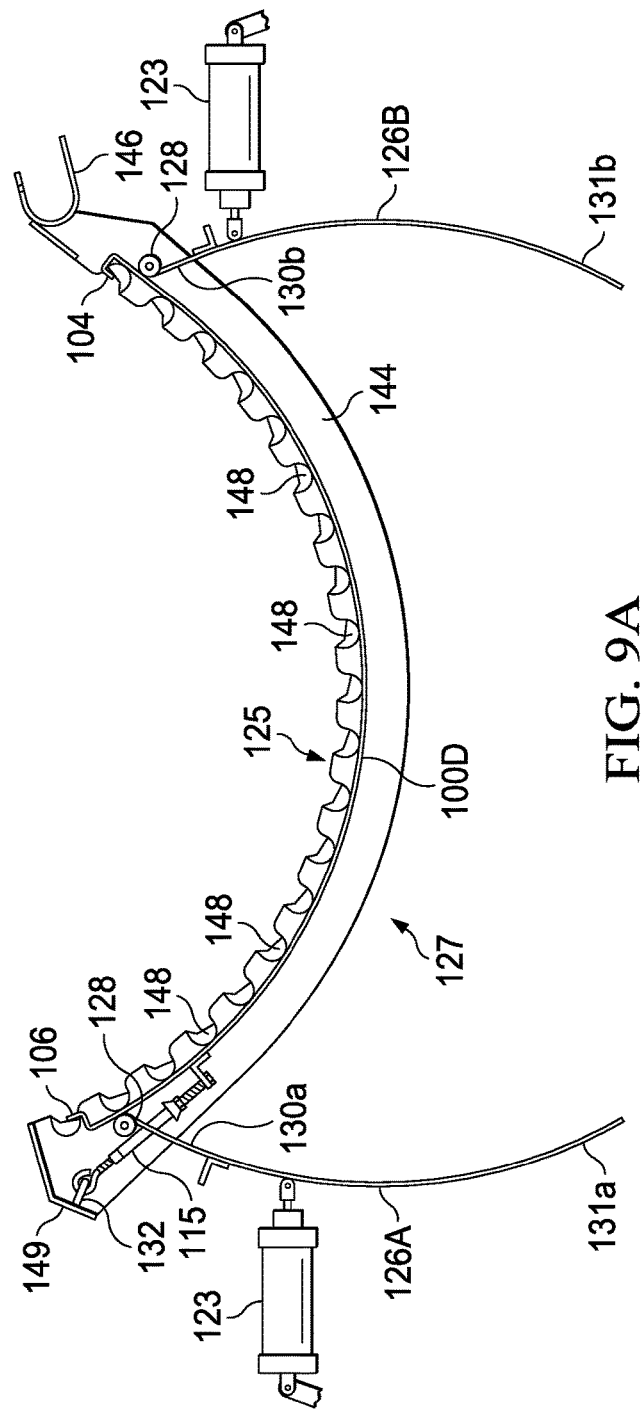
FIG. 9A illustrates a partially cut away side view of an embodiment of a threshing concave grate incorporating an alternate embodiment of the cover plate assembly shown in FIG. 8D having a "clam shell" door mechanism configured in an "opened" position.

With reference now to FIG. 9A, the cover plate assembly 100D may be modified to include a means for automatically modifying or adjusting the flow characteristics of the cover plate assembly 100D by pivotally moving two half cover plate assemblies 126A, 126B to a desired position relative to cover plate assembly 100D. The cover plate assembly 100D may further comprise a clamshell door arrangement consisting of two half cover plate assemblies 126A, 126B pivotally attached to the end panel sections 103 of the cover plate assembly 100D by means of a hinge mechanism 128. The hinge mechanism 128 is attached to its respective end panel section 103 and to a proximal end section 130 of its respective half cover plate assembly 126.

Figure 9B:
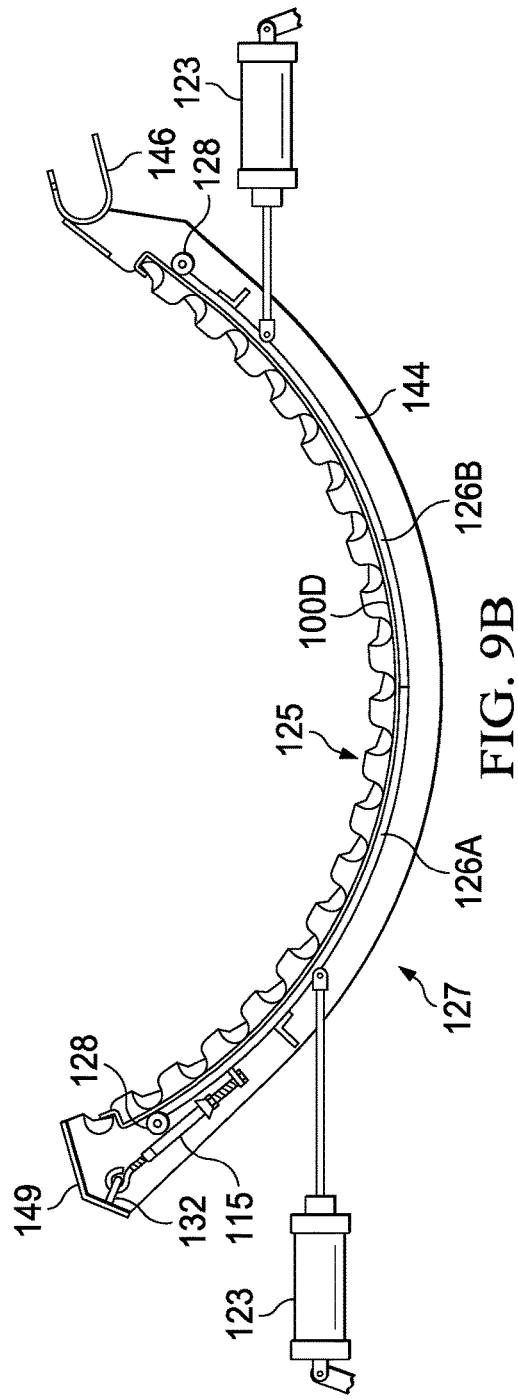
FIG. 9B illustrates the partially cutaway side view of the embodiment of a threshing concave grate incorporating the embodiment of the cover plate assembly shown in FIG. 8D having the "clam shell" door mechanism configured in a "closed" position.

The actuating means for automatically modifying or adjusting the flow characteristics of the automated cover plate assembly 100D comprises one or more linear actuators 123 attached to each half cover plate assembly 126. It is understood that the actuators 123 are also attached or anchored to a portion (not shown) of the combine harvester 10 (FIG. 1) When actuated, the linear actuator 123 causes each half cover plate assembly 126 to pivot about its hinge mechanism 128 so that the central opening 114 (FIG. 8D) in the cover plate assembly 100D may be adjusted as desired. For example, FIG. 9A depicts a modified cover plate assembly 100D with the half cover plate assemblies 126A, 126B in a "fully opened" position, while FIG. 9B depicts the modified cover plate assembly 100D with the half cover plate assemblies 126A, 126B in a "fully closed" position. By adjusting the position of the half cover plate assemblies 126A, 126B between the "fully opened" and "fully closed" positions, the modified cover plate assembly 100D depicted in FIGS. 9A-B permits a wide variety of modification and adjustment of the concave grate's flow characteristics.

In addition, the automated system can be further refined by directly incorporating the means for automatically modifying or adjusting the flow characteristics into a standard concave grate. For example, with reference now to FIGS. 9C-D, the automated, dynamic cover plate system of the present invention shown in FIGS. 9A-B may be further adapted to a standard concave grate. In this embodiment, the previously disclosed cover plate assembly 100D is dispensed with and the two half cover plate assemblies 126A, 126B are dimensioned to fit within a section of a threshing concave grate 140 configured between two parallel arcuate rails (e.g., arcuate side rail 144 and middle support rail 151 (FIG. 8D)).

The hinge mechanism 128 is directly incorporated into the concave grate 140. For example, as depicted in FIGS. 9C-D, hinge mechanisms 128 are configured between the two parallel arcuate rails (e.g., arcuate side rail 144 and middle support rail 151) near the end plate 149 and the hook 146 on the exterior or convex side 127 of the concave grate 140.

The clamshell door arrangement, consisting of two half cover plate assemblies 126A, 126B, are pivotally attached to the concave grate 140 by means of the hinge mechanisms 128. Each hinge mechanism 128 is configured between the two parallel arcuate rails (e.g., arcuate side rail 144 and middle support rail 151) and attached to its respective a proximal end section 130 of its respective half cover plate assembly 126.

The actuating means for pivotally moving the half cover plate assemblies 126 comprises one or more linear actuators 123 attached to each half cover plate assembly 126. It is understood that the actuators 123 are also attached or anchored to a portion (not shown) of the combine harvester 10 (FIG. 1). When actuated, the linear actuator 123 causes each half cover plate assembly 126 to pivot about its hinge mechanism 128 so that the openings between the axial bars 148 in the concave grate 140 may be adjusted as desired. For example, FIG. 9C depicts the half cover plate assemblies 126A, 126B configured in a "fully opened" position, while FIG. 9D depicts the half cover plate assemblies 126A, 126B configured in a "fully closed" position. By adjusting the position of the half cover plate assemblies 126A, 126B between the "fully opened" and "fully closed" positions, the automated concave grate depicted in FIGS. 9C-D permits a wide variety of modification and adjustment of the concave grate's flow characteristics.

The linear actuator devices 123 shown in FIGS. 9A-D may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator devices 123 may be controlled, either manually or automatically, by the operator in the cab 2 (FIG. 1)

of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the half cover plate assemblies 126A, 126B. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence system may include global positioning system (GPS) information and historical data from previous harvests that could be used to predict variances in yield rates at a particular GPS location, which could be used advantageously to modify or adjust the flow characteristics of the automated cover plate assembly 100D or standard concave grate by moving the half cover plate assemblies 126A, 126B to a desired position relative to the exterior concave surface of the automated cover plate assembly 100D or standard concave grate.

Figure 10A:
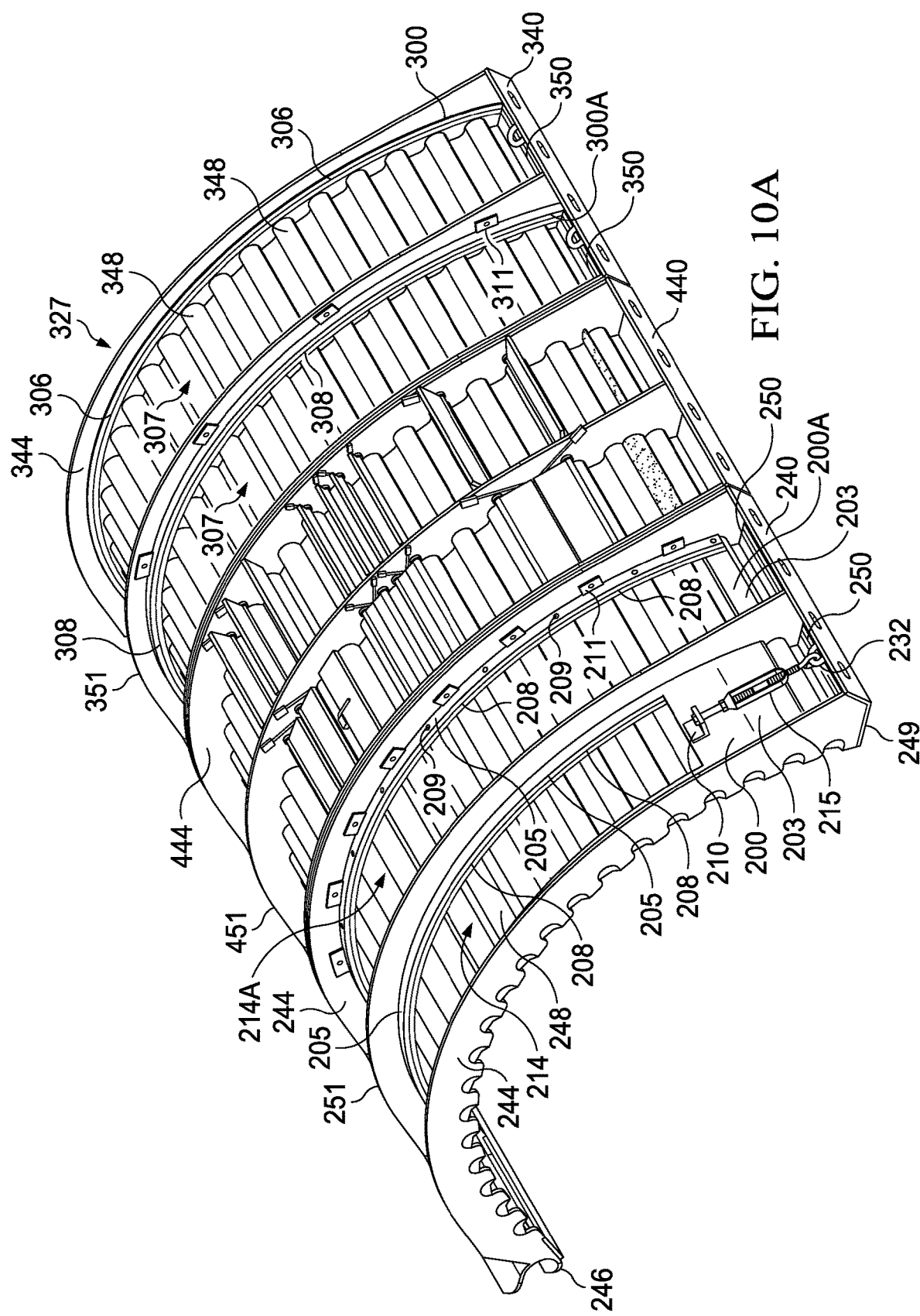
FIG. 10A is an isometric view of multiple threshing concave grates incorporating variant embodiments of the automated, dynamic cover plate assembly of the present invention.

With reference now to the Figures, and in particular FIG. 10A, multiple embodiments of the automated, dynamic cover plate system of the present invention are shown incorporated onto and into conventional threshing concave grates. While the invention is described herein with respect to a grate of the threshing concave grate assembly, one skilled in the art will understand that the invention may also be used for the separator grate assembly without departing from the scope of the invention.

Each of the depicted conventional threshing concave grates include a pair of arcuate, elongated and laterally spaced apart side rails oriented generally transverse to the axis of the rotor 20 (FIG. 2). For example, a first concave grate 240 (configured on the far left) includes a pair of arcuate, elongated and laterally spaced apart side rails 244 oriented generally transverse to the axis of the rotor 20 (FIG. 2). One end of each side rail 244 has a hook element 246 used to mount the threshing concave grate 240 on an axial bar (not shown) used to move the threshing concave grate 240 closer or further away from the rotor 20 (FIG. 2). A plurality of axial bars 248 span the side rails 244. End plates 249 are preferably affixed between ends of the side rails 244 and may include one or more slots 250 formed therethrough. A middle support rail 251 is typically positioned between and parallel to the side rails 144 and supports the axial bars 248. While the concave grates shown in the drawings depict concave grates typically found on John Deere® combine harvesters, it should be understood that the present invention is not limited to concave grates found on John Deere® combine harvesters, but applies to and may be readily adapted to all makes of combine harvester concave grates.

The axial bars 248 typically have outwardly projecting overhangs at their opposite ends that overlay upper edges of the side rails 244 and are operable to bear against the same when grate 240 is installed. Preferably, the overhangs are received in notches 252 (FIG. 10B) in the upper edges of side rails 244 and welded to the side rails 244. The overhangs also provide a substantially continuous surface when multiple grate assemblies 24, 26 (FIG. 1) are installed side-by-side in the combine harvester 10 (FIG. 1). While the axial bars 248 shown in FIGS. 10A-E are depicted as having a round or partially round cross section, it is understood that the axial bars 248 can also have a completely round, notched, oval, rectangular or polygonal cross-section.

Similarly, a second concave grate 340 (configured on the far right) includes a pair of arcuate, elongated and laterally spaced apart side rails 344 oriented generally transverse to the axis of the rotor 20 (FIG. 2). With additional reference to FIGS. 10D and E, one end of each side rail 344 has a hook element 346 used to mount the threshing concave grate 340 on an axial bar (not shown) used to move the threshing concave grate 340 closer or further away from the rotor 20 (FIG. 2). A plurality of axial bars 348 span the side rails 344. End plates 349 are preferably affixed between ends of the side rails 344 and may include one or more slots 350 formed therethrough. A middle support rail 351 is typically positioned between and parallel to the side rails 344 and supports the axial bars 348. While the concave grates shown in the drawings depict concave grates typically found on John Deere® combine harvesters, it should be understood that the present invention is not limited to concave grates found on John Deere® combine harvesters, but applies to and may be readily adapted to all makes of combine harvester concave grates.

The axial bars 348 typically have outwardly projecting overhangs at their opposite ends that overlay upper edges of the side rails 344 and are operable to bear against the same when grate 340 is installed. Preferably, the overhangs are received in notches 352 in the upper edges of side rails 344 and welded to the side rails 344. The overhangs also provide a substantially continuous surface when multiple grate assemblies 24, 26 (FIG. 1) are installed side-by-side in the combine harvester 10 (FIG. 1). While the axial bars 348 shown in FIGS. 10A, D and E are depicted as having a round or partially round cross section, it is understood that the axial bars 348 can also have a completely round, notched, oval, rectangular or polygonal cross-section.

Likewise, a third concave grate 440 (configured in the middle between the first 240 and second 340 concave grates) includes a pair of arcuate, elongated and laterally spaced apart side rails 444 oriented generally transverse to the axis of the rotor 20 (FIG. 2). The third concave grate 440 depicted in FIG. 10A depicts multiple embodiments of individual, dynamic, cover plate mechanisms of the present invention. With additional reference to FIGS. 16A-B, one end of each side rail 444 has a hook element 446 used to mount the threshing concave grate 440 on an axial bar (not shown) used to move the threshing concave grate 440 closer or further away from the rotor 20 (FIG. 2). A plurality of axial bars 448 span the side rails 444. End plates 449 are preferably affixed between ends of the side rails 444. A middle support rail 451 is typically positioned between and parallel to the side rails 444 and supports the axial bars 448. While the concave grates shown in the drawings depict concave grates typically found on John Deere® combine harvesters, it should be understood that the present invention is not limited to concave grates found on John Deere® combine harvesters, but applies to and may be readily adapted to all makes of combine harvester concave grates.

Figure 16A:
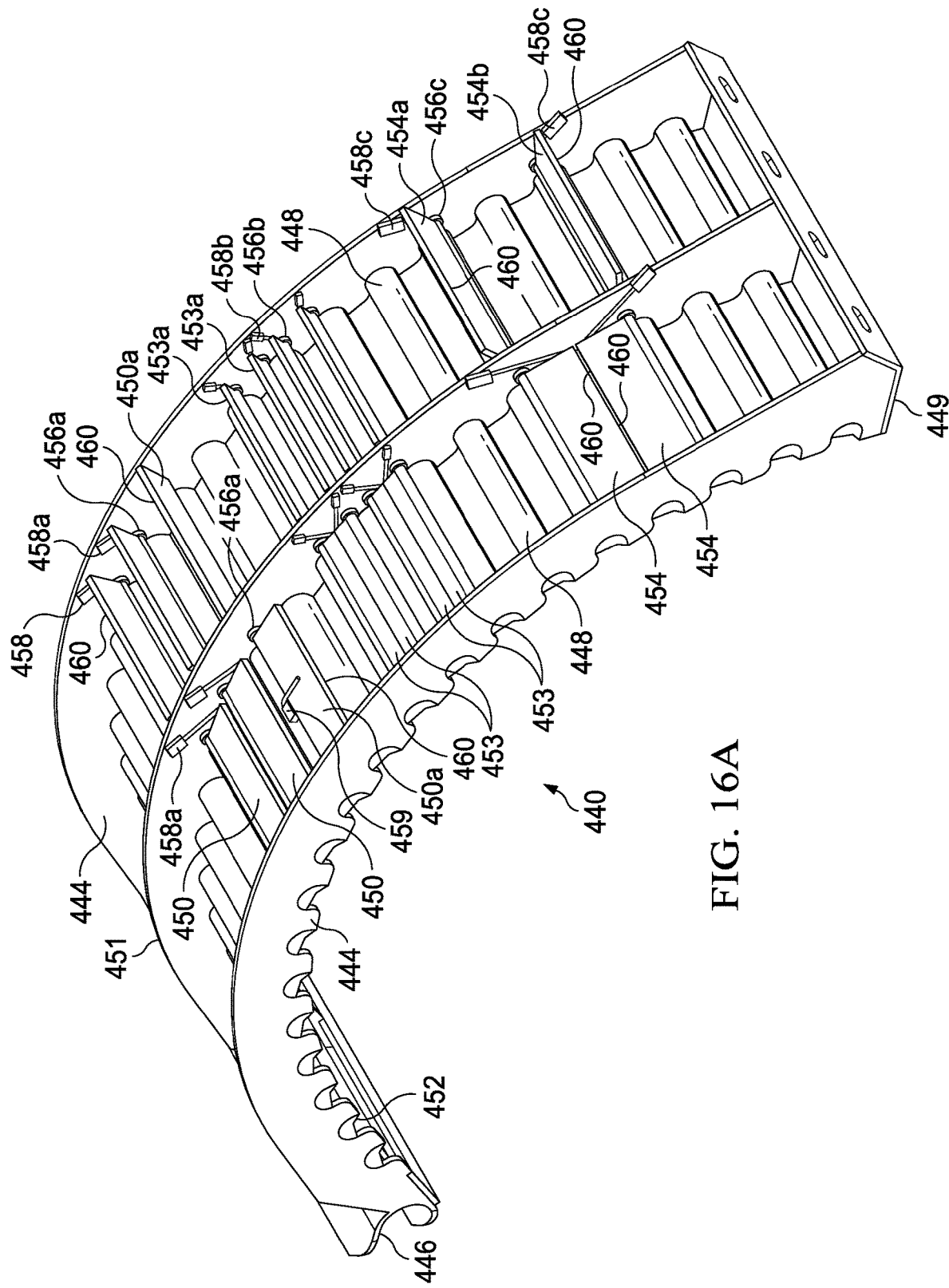
FIG. 16A illustrates a perspective view of a concave grate incorporating principles of multiple embodiments of individual, dynamic, pivotally hinged cover plate mechanisms of the present invention.
Figure 16B:
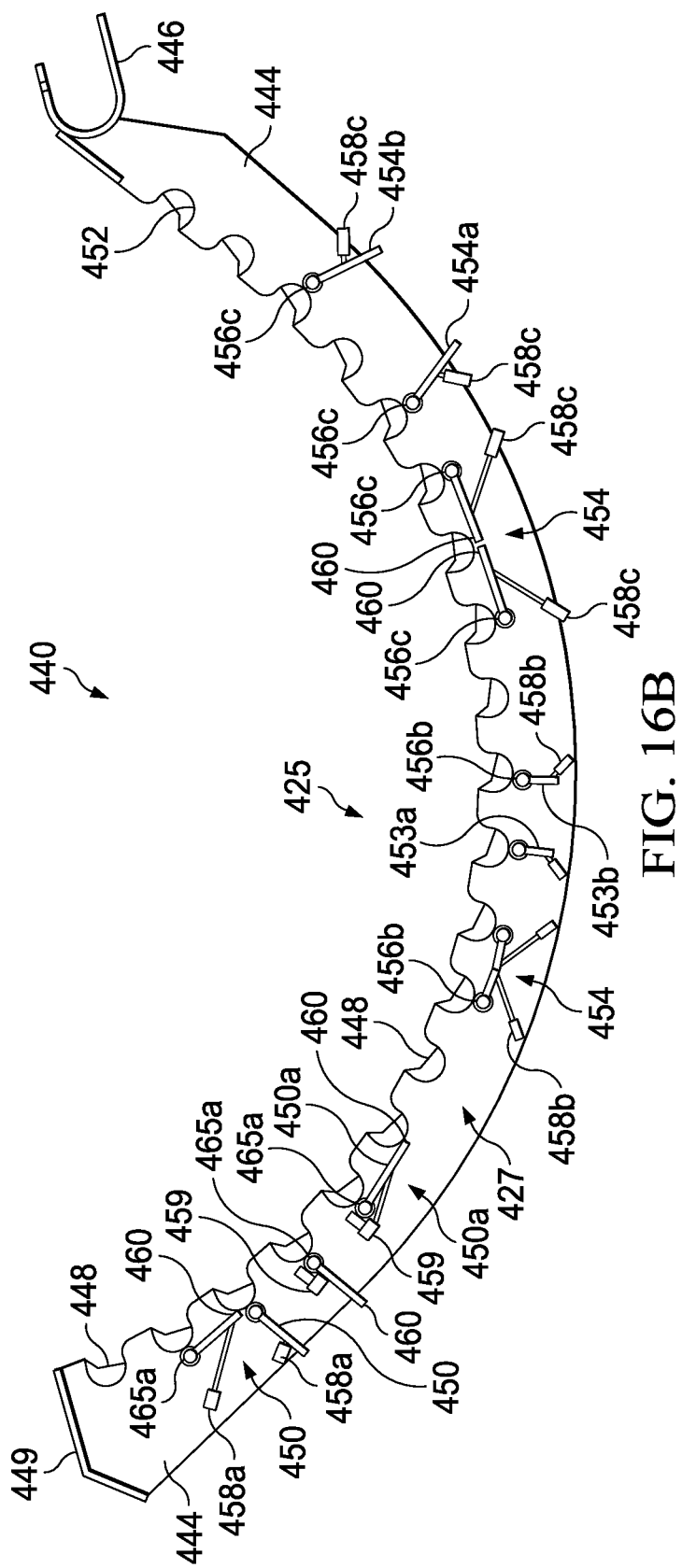
FIG. 16 B illustrates a partially cutaway side view of the concave grate and cover plate mechanisms shown in FIG. 16A.

The axial bars 448 typically have outwardly projecting overhangs at their opposite ends that overlay upper edges of the side rails 444 and are operable to bear against the same when grate 440 is installed. Preferably, the overhangs are received in notches 452 in the upper edges of side rails 444 and welded to the side rails 444. The overhangs also provide a substantially continuous surface when multiple grate assemblies 24, 26 (FIG. 1) are installed side-by-side in the combine harvester 10 (FIG. 1). While the axial bars 448 shown in FIGS. 10A and 16A-B are depicted as having a round or partially round cross section, it is understood that the axial bars 448 can also have a completely round, notched, oval, rectangular or polygonal cross-section.

A first embodiment of the automated, dynamic cover plate system of the present invention 200 is partially depicted in FIGS. 10A-B and 12A-B. As shown on the far left concave grate 240 of FIG. 10A, the automated, dynamic cover plate system 200 comprises an elongated cover plate frame assembly 202 having a central opening 214 formed therein and dimensioned to be positioned between two parallel arcuate rails (e.g., arcuate side rail 244 and middle support rail 251) of a concave grate 240. The cover plate frame assembly 202 is very similar to the previously disclosed cover plate assembly 100D having two end panels 203, 203a connected by two side straps or bands 205, however, the cover plate frame assembly 202 further includes one or more tracks or channels 208 arranged in a parallel configuration on opposing sides of a central opening 214 in the cover plate frame assembly 202. The tracks or channels 208 may be configured either under the straps or bands 205 as shown in cover plate frame assembly 202 or on top of the straps or bands 205 as depicted in a variant embodiment cover plate frame assembly 202A. The two side straps 205, each housing one or more tracks or channels 208, are positioned on each side of the cover plate frame assembly 202 and configured to substantially abut against its respective arcuate rails (e.g., arcuate side rail 244 or middle support rail 251) of the threshing concave grate 240. The one or more tracks or channels 208, positioned on each side of the cover plate frame assembly 202, are configured to receive a cover plate insert 220, which will be described subsequently in greater detail.

The end panels 203, 203a and side straps or bands 205 may comprise a unitary or composite structure. For example, the end panels 203, 203a and side straps or bands 205 may comprise a unitary structure formed out of a single sheet or panel of material with the central opening 214 being cut out or removed from the sheet or panel. Alternatively, the cover plate frame assembly 202 may comprise a composite structure, wherein the end panel 203, 203a and the side straps or bands 205 are each constructed separately and then bonded together. The one or more tracks or channels 208 may be configured on the interior side or surface 201a of the automated, dynamic cover plate system 200.

The cover plate frame assembly 202 is designed to be configured in a curved, supinated position adjacent to and against the plurality of axial bars 248 on the exterior of the threshing concave grate 240. In the first embodiment of the automated, dynamic cover plate system 200 shown in FIGS. 10A and B, the cover plate frame assembly 202 is secured to the axial bars 248 by means of clasp elements 204, 206 formed in the opposing end panel 203, 203a of the cover plate frame assembly 202. These clasp elements are very similar, if not identical, in form and function to the previously disclosed clasp elements 104, 106. (supra) For example, the clasp elements 204, 206 have a dimensional shape that is complementary to the cross-sectional shape of the axial bars 248, such that they can be easily and quickly attached from the exterior side of the threshing concave grate 240 and slidably locked in place by a simple tug along the longitudinal axis of the cover plate frame assembly 202. Both clasp elements 204, 206 extend from or are configured on the interior side or surface 201 a of the cover plate frame assembly 202. For example, the cover plate frame assembly 202 includes a U-shaped clasp element 204 formed in the first or front end panel 203a of the elongated cover plate frame assembly 202. The complementary shape of the U-shaped clasp element 204 enables it to be inserted from the exterior side of the threshing concave grate 240 and firmly hook on and grasp the interior or top surface of an axial bar 248a when the cover plate frame assembly 202 is moved or rotated towards an anchor device (i.e., to the left, as depicted in FIG. 10B) installed on the interior surface of the end plate 249 of the threshing concave grate 240.

Figure 10B:
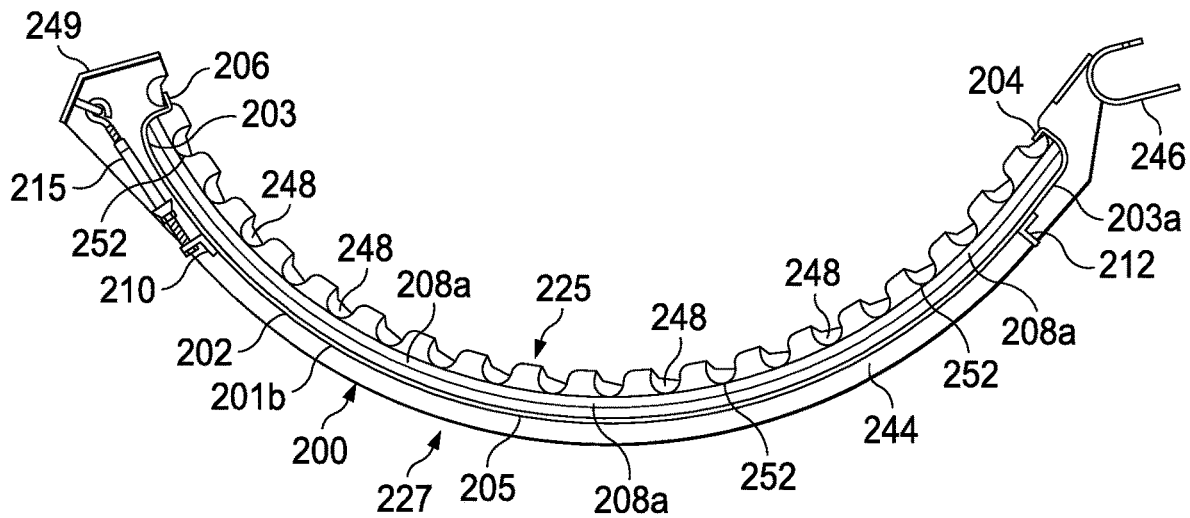
FIG. 10B is a partially cutaway side view of a threshing concave grate incorporating principles of one embodiment of a concave cover plate frame assembly of the present invention.
Figure 10C:
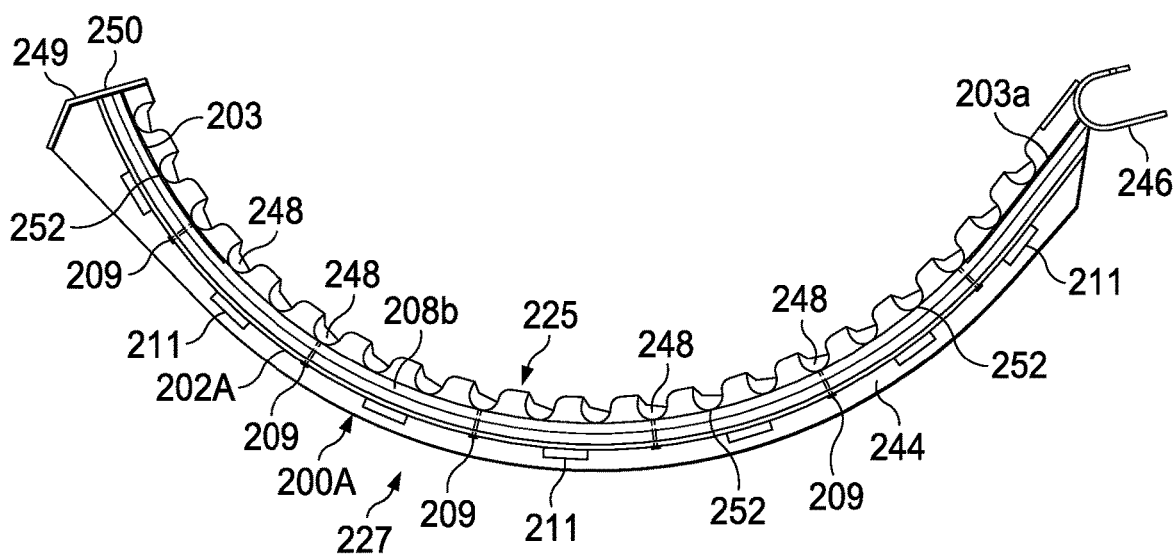
FIG. 10C is a partially cutaway side view of a threshing concave grate incorporating principles of a second embodiment of a concave cover plate frame assembly of the present invention.
Figure 10D:
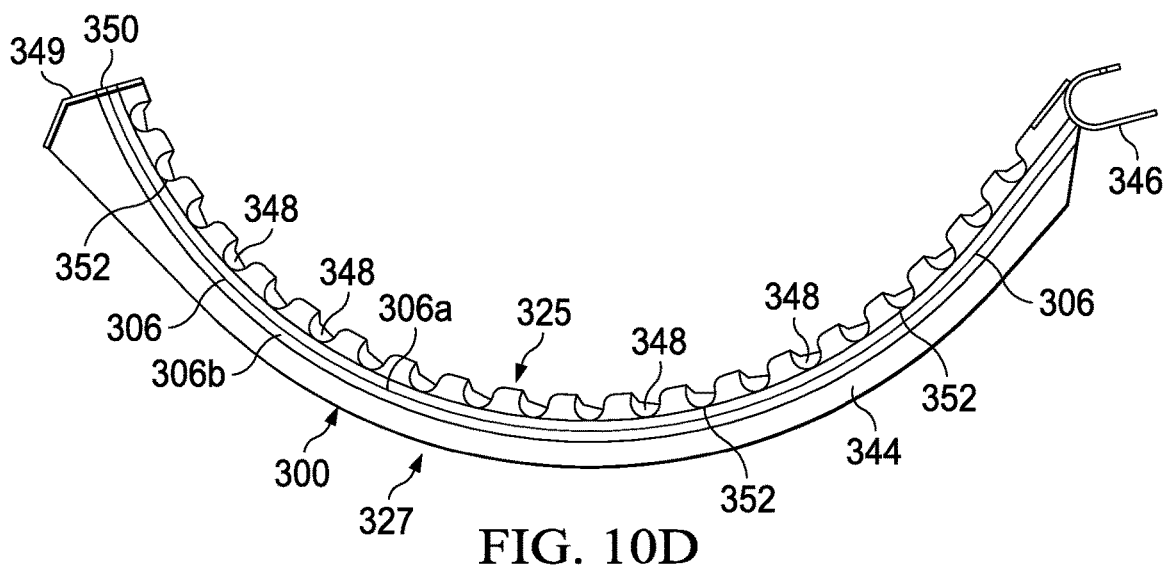
FIG. 10D is a partially cutaway side view of an embodiment of a threshing concave grate incorporating principles of an alternate embodiment of the automated, dynamic cover plate assembly of the present invention comprising one or more grooves/tracks/pathways formed into side rail.
Figure 10E:
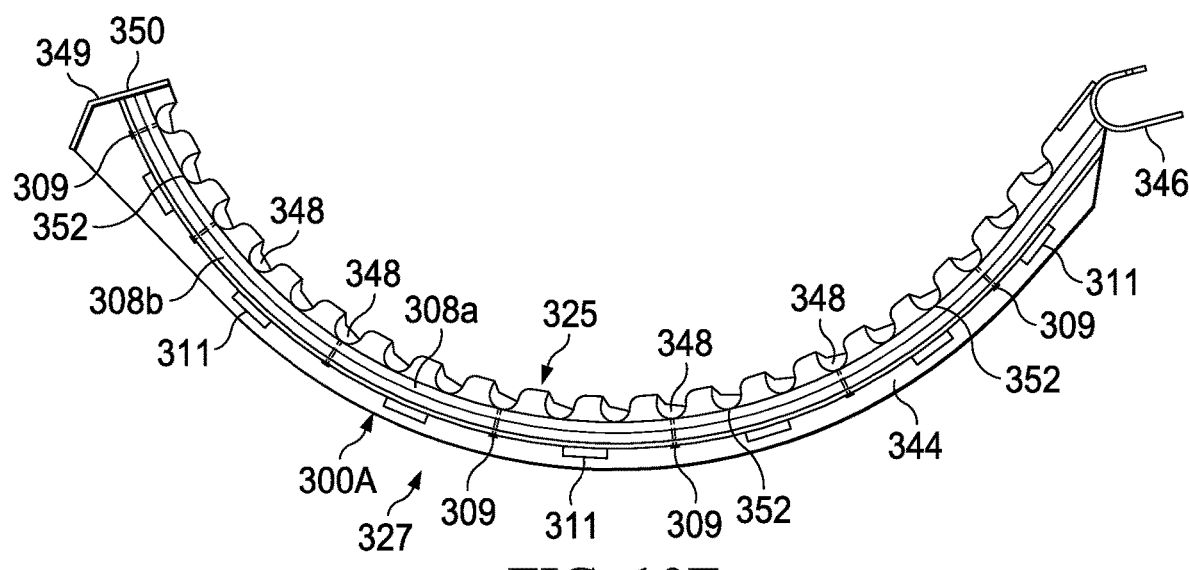
FIG. 10E is a partially cutaway side view of an embodiment of a threshing concave grate incorporating principles of an alternate embodiment of the automated, dynamic cover plate assembly of the present invention comprising one or more grooves/tracks/pathways attached to and extending away from a side rail.

Similarly, as shown in FIGS. 10B and 12A, the cover plate assembly 200 further includes an inverted L-shaped clasp element 206 formed in the second or back end panel 203 of the elongated cover plate frame assembly 202. The shape of the inverted L-shaped clasp element 206 enables it to also be inserted from the exterior side of the threshing concave grate 240 so that a ledge or surface engages the top surface of another axial bar when the cover plate frame assembly 202 is moved or rotated towards the anchor device (i.e., to the left, as depicted in FIG. 10B) installed on the interior surface of the end plate 249 of the threshing concave grate 240.

Preferably, the cover plate frame assembly 202 is configured so that the clasp elements 204, 206 simultaneously engage their respective axial bars 248 when the cover plate frame assembly 202 is rotated or moved into its locked position as depicted in FIG. 10B. The cover plate frame assembly 202 may also include one or more accessory brackets 212 attached to the exterior-facing side 201b of the cover plate frame assembly 202 to assist the user in properly positioning and initially securing of the cover plate frame assembly 202 to a threshing concave grate 240.

The cover plate frame assembly 202 further includes a latching mechanism 215 that maintains the lateral position of the cover plate frame assembly 202 so that the clasp elements 204, 206 stay locked in position about their respective axial bars 248. This latching mechanism 215 is very similar, if not identical, in form and function to the previously disclosed latching mechanism 115. (supra) For example, as depicted in FIGS. 10A-B, in a preferred embodiment the latching mechanism 215 comprises a turnbuckle tension device configured between an anchor device secured to an end plate 249 of the threshing concave grate 240 and an anchor bracket 210 attached to the exterior-facing side 201b of the cover plate frame assembly 202. In an alternative embodiment, the latching mechanism 215 may comprise a conventional tension draw latch assembly. Indeed, one skilled in the art will understand that a wide variety of latching mechanisms can be employed to apply a tension force between the anchor bracket 210 attached second or back end panel 203 of the elongated cover plate frame assembly 202 and the anchor device secured to an end plate 249 of the threshing concave grate 240. Moreover, it is understood that the latching mechanism may comprise any of the previously disclosed latching mechanisms used in conjunction with the previously disclosed cover plate embodiments.

With reference now to FIGS. 10A, 10C, and 12C-D a second or variant embodiment of the automated, dynamic cover plate system of the present invention 200A is partially depicted. As shown on the right-hand side of the far left concave grate 240 in FIG. 10A, the automated, dynamic cover plate system 200A comprises an elongated cover plate frame assembly 202A having a central opening 214 formed therein and dimensioned to be positioned between two parallel arcuate rails (e.g., arcuate side rail 244 and middle support rail 251) of a threshing concave grate 240. The cover plate frame assembly 202A is similar to the previously disclosed cover plate assembly 100D having two end panels 203, 203a connected by two side straps or bands 205, however, the cover plate frame assembly 202A further includes one or more tracks or channels 208 arranged in a parallel configuration on opposing sides of a central opening 214 in the cover plate frame assembly 202A. The tracks or channels 208 may be configured either on top of the straps or bands 205 as shown in cover plate frame assembly 202A or under the straps or bands 205 as depicted in a first embodiment cover plate frame assembly 202. The two side straps 205, each housing one or more tracks or channels 208, are positioned on each side of the cover plate frame assembly 202A and configured to substantially abut against its respective arcuate rails (e.g., arcuate side rail 244 or middle support rail 251) of the threshing concave grate 240. The one or more tracks or channels 208, positioned on each side of the cover plate frame assembly 202A, are configured to receive a cover plate insert 220, which will be described subsequently in greater detail.

The end panels 203, 203a and side straps or bands 205 may comprise a unitary or composite structure. For example, the end panels 203, 203a and side straps or bands 205 may comprise a unitary structure formed out of a single sheet or gate of material with the central opening 214 being cut out or removed from the sheet or panel. Alternatively, the cover plate frame assembly 202A may comprise a composite structure, wherein the end panels 203, 203a and the side straps or bands 205 are each constructed separately and then bonded together.

The variant embodiment of the cover plate frame assembly 202A is designed to be configured in a curved, supinated position adjacent to and against the plurality of axial bars 248 on the exterior or convex side 227 of the threshing concave grate 240. In the second or variant embodiment of the automated, dynamic cover plate system 200A shown in FIGS. 10A, 10C, and 12C-D, the cover plate frame assembly 202A is fixably attached or connected to the concave grate 240. For example, fasteners 209 may be used to fixably connect the cover plate frame assembly 202A to the plurality of axial bars 248. Alternatively, the cover plate frame assembly 202A may be secured to the concave grate 240 by means of brackets 211 fixably attached to the cover plate frame assembly 202A and to sides of the two parallel arcuate rails (e.g., arcuate side rail 244 and middle support rail 251) of the threshing concave grate 240. Moreover, it is understood that the cover plate frame assembly 202A may include and utilize any of the previously disclosed side latching and sliding pin latching mechanisms used in conjunction with the previously disclosed cover plate embodiments.

With reference now to FIGS. 10A and D, a third embodiment of the automated, dynamic cover plate system of the present invention 300 is partially depicted. As shown on the right-hand side of the far right concave grate 340 in FIG. 10A, the automated, dynamic cover plate system 300 comprises a threshing concave grate 340 having two parallel arcuate rails (e.g., arcuate side rail 344 and middle support rail 351) that each have one or more curved tracks/channels/grooves 306 formed into the parallel arcuate rails (e.g., 344, 351) along the outer periphery of the axial bars 348 on the exterior or convex side 327 of the concave grate 340. Thus, the one or more curved tracks/channels/grooves 306 are arranged in a parallel configuration on opposing sides of a central opening 307 in the concave grate 340. The one or more tracks/channels/grooves 306, positioned on each side of the concave grate 340, are configured to receive a cover plate insert 320, which will be described subsequently in greater detail.

With reference now to FIGS. 10A and E, a variant of the third embodiment of the automated, dynamic cover plate system of the present invention 300A is partially depicted. As shown on the left-hand side of the far right concave grate 340 in FIG. 10A, the variant third embodiment of the automated, dynamic cover plate system 300A comprises a threshing concave grate 340 having two parallel arcuate rails (e.g., arcuate side rail 344 and middle support rail 351) that each have one or more curved tracks/channels/grooves 308 arranged in a parallel configuration on opposing sides of central opening 307 in the concave grate 340. The tracks/channels/grooves 308 are positioned to substantially abut against its respective arcuate rails (e.g., arcuate side rail 344 or middle support rail 351) of the threshing concave grate 340 in much the same manner as the two side straps 205 of the variant embodiment of the cover plate frame assembly 202A are configured to substantially abut against its respective arcuate rails (e.g., arcuate side rail 244 or middle support rail 251) of the threshing concave grate 240.

While in one embodiment the tracks/channels/grooves 308 only extend away from the arcuate rails, in an alternate embodiment the tracks/channels/grooves 308 may partially extend or be partially formed into the parallel arcuate rails (e.g., 344, 351). The one or more tracks/channels/grooves 308, positioned on each side of the threshing concave grate 340, are configured to receive a cover plate insert 320, which will be described subsequently in greater detail.

The one or more tracks/channels/grooves 308 are designed to be configured in a curved, supinated position adjacent to and against the plurality of axial bars 348 on the exterior or convex side 327 of the threshing concave grate 340. The one or more tracks/channels/grooves 308 may be fixably attached or connected to the concave grate 340. For example, fasteners 309 may be used to fixably connect the one or more tracks/channels/grooves 308 to the plurality of axial bars 348. Alternatively, one or more tracks/channels/grooves 308 may be secured to the concave grate 340 by means of brackets 311 fixably attached to the one or more tracks/channels/grooves 308 and to sides of the two parallel arcuate rails (e.g., arcuate side rail 344 and middle support rail 351) of the threshing concave grate 340. Moreover, it is understood that the one or more tracks/channels/grooves 308 may utilize any of the previously disclosed side latching and sliding pin latching mechanisms used in conjunction with the previously disclosed cover plate embodiments to be fixably attached to the threshing concave grate 340.

Figure 11C:
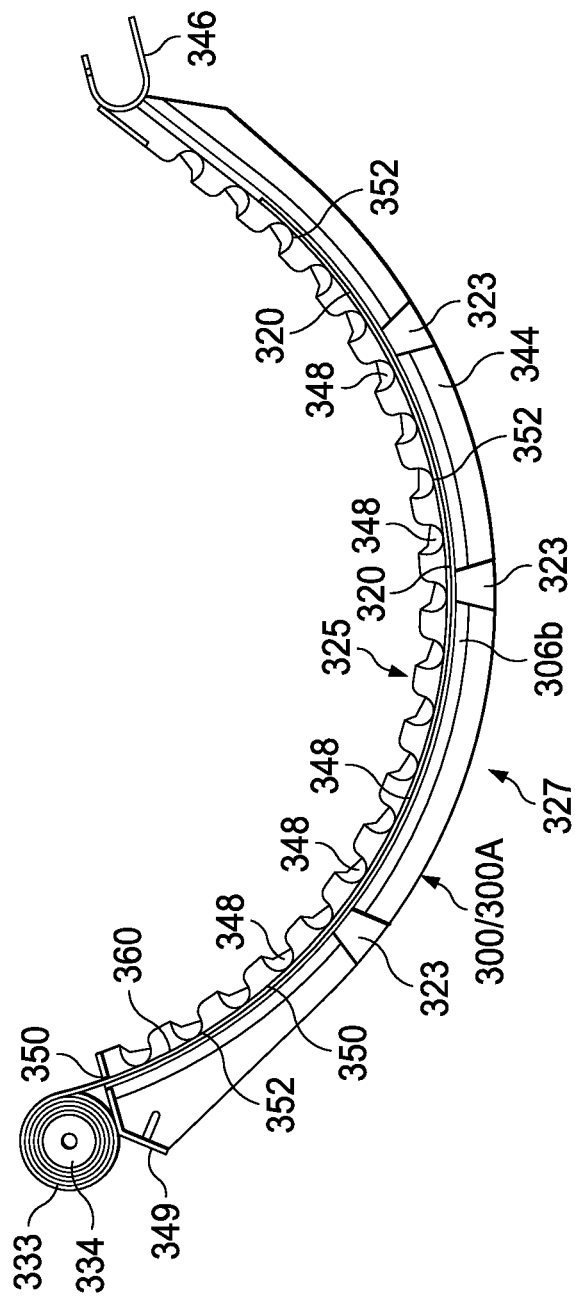
FIG. 11C illustrates a partially cutaway side view of another embodiment of a threshing concave grate incorporating principles of an embodiment of an automated, dynamic cover plate assembly of the present invention comprising a retractable cover plate insert assembly configured between the side rails of the threshing concave grate.

With reference now to FIGS. 11A-C, 12E-F, 13A-D and 14A-B, embodiments of the automated, dynamic cover plate assembly of the present invention are depicted. FIG. 11A depicts a side view of the automated, dynamic cover plate system 200 that comprises an elongated cover plate frame assembly 202 having a central opening 214 (FIG. 10A) formed therein. As shown in the Figures, the system 200 further includes a cover plate insert 220 designed and dimensioned to be slidably coupled between the one or more tracks or channels 208 configured on opposing sides of the central opening 214. In the depicted embodiments, the cover plate insert 220 is a fully retractable, flexible plate constructed of high strength material. The cover plate insert 220 is stored in a coil 233 positioned on the exterior side of the elongated cover plate frame assembly 202 and accesses the tracks or channels 208 in the cover plate frame assembly 202 through the central opening 214.

The cover plate insert 220 may be extended and retracted from the tracks or channels 208 of the cover plate frame assembly 202 by activating an actuators that extends or retracts the cover plate insert 220 in the cover plate frame assembly 202. For example, as depicted in FIG. 11A, the actuator comprises a rotary torsional actuator 234 connected to the coil 233 that, upon activation, urges or retracts the cover plate insert 220 in the tracks or channels 208 of the cover plate frame assembly 202, thereby closing or opening the central opening 214 in the cover plate frame assembly 202. In another embodiment, the actuator may comprise one or more linear actuator devices 223 that upon activation urges or retracts the cover plate insert 220 configured in the tracks or channels 208 of the cover plate frame assembly 202, thereby closing or opening the a central opening 207 in the cover plate frame assembly 202.

FIG. 11B depicts a side view of a variant embodiment 200A of the automated, dynamic cover plate system of the present invention as shown in FIGS. 10A and C and 12E-F. FIG. 11B depicts a side view of the automated, dynamic cover plate system 200A that comprises an elongated cover plate frame assembly 202A having a central opening 214 (FIG. 10A) formed therein. The system 200A further includes a cover plate insert 220 designed to be slidably coupled between the one or more tracks or channels 208 configured on opposing sides of the central opening 214. In the depicted embodiment, the cover plate insert 220 is a fully retractable, flexible plate constructed of high strength material. The cover plate insert 220 may be stored in a coil 233 and accesses the tracks or channels 208 in the cover plate frame assembly 202A through a slot 250 formed in the end plate 249 of the concave grate 240.

The cover plate insert 220 may be extended and retracted from the tracks or channels 208 of the cover plate frame assembly 202A by activating an actuator that extends or retracts the cover plate insert 220 in the cover plate frame assembly 202A. For example, as depicted in FIG. 11B, the actuator comprises a rotary torsional actuator 234 connected to the coil 233 that, upon activation, urges or retracts the cover plate insert 220 through the slot 250 and into the tracks or channels 208 of the cover plate frame assembly 202A, thereby closing or opening the a central opening 214 in the cover plate frame assembly 202A. In another embodiment, the actuator may comprise one or more linear actuator devices 223 that upon activation urges or retracts the cover plate insert 220 through the slot 250 and into the tracks or channels 208 of the cover plate frame assembly 202A, thereby closing or opening the a central opening 214 in the cover plate frame assembly 202A.

The actuator devices 234, 223 may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator devices 234, 223 may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the cover plate insert 220 within the cover plate frame assembly 202/202A. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence may include global positioning system (GPS) information and historical data from previous harvests that could be used to predict variances in yield rates at a particular GPS location, which can be used advantageously to extend or retract the cover plate insert 220 in the cover plate frame assembly 202/202A to modify or adjust the flow characteristics of the automated cover plate assembly 200/200A.

FIG. 11C depicts a side view of the automated, dynamic cover plate systems 300/300A that comprises a threshing concave grate 340 having two parallel arcuate rails (e.g., arcuate side rail 344 and middle support rail 351) that each have one or more curved tracks/channels/grooves 306 formed into the parallel arcuate rails (e.g., 344, 351) along the outer periphery of the axial bars 348 on the exterior or convex side 327 of the concave grate 340. While FIG. 11C depicts a side view of the third embodiment of the automated, dynamic cover plate system of the present invention 300 as shown in FIGS. 10A and D, it is understood that the principles of the invention and its disclosure may be easily adapted to the variant embodiment 300A as shown in FIGS. 10A and E.

The systems 300/330A further include a cover plate insert 320 dimensioned and designed to be slidably coupled between the one or more tracks or channels 306/308 configured on opposing sides of the central opening 307. As shown in the depicted embodiment, the cover plate insert 320 is a fully retractable, flexible plate constructed of high strength material. The cover plate insert 320 is stored in a coil 333 and accesses the tracks or channels 306/308 formed in or attached to the two parallel arcuate rails (e.g., 344, 351) of the threshing concave grate 340 through a slot 350 formed through the end plate 349 of the concave grate 340.

The cover plate insert 320 may be extended and retracted from the tracks or channels 306/308 formed in or attached to the concave grate 340 by activating an actuator that extends or retracts the cover plate insert 320 in the concave grate 340. For example, as depicted in FIG. 11B, the actuator comprises a rotary torsional actuator 334 connected to the coil 333 that, upon activation, urges or retracts the cover plate insert 320 through the slot 350 and into the tracks or channels 306/308 of the concave grate 340, thereby closing or opening the a central opening 307 in the concave grate 340. In another embodiment, the actuator may comprise one or more linear actuator devices 323 that upon activation urge or retract the cover plate insert 320 through the slot 350 and into the tracks or channels 306/308 of the concave grate 340, thereby closing or opening the a central opening 307 in the of the concave grate 340.

The actuator devices 323, 334 may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator devices 323, 334 may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the cover plate insert 320 within the concave grate 340. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computer or automated intelligence may include global positioning system (GPS) information and historical data from previous harvests that could be used to predict variances in yield rates at a particular GPS location, which could be used advantageously to extend or retract the cover plate insert 320 in the concave grate 340 to modify or adjust the flow characteristics of the concave grate 340.

Figure 12C:
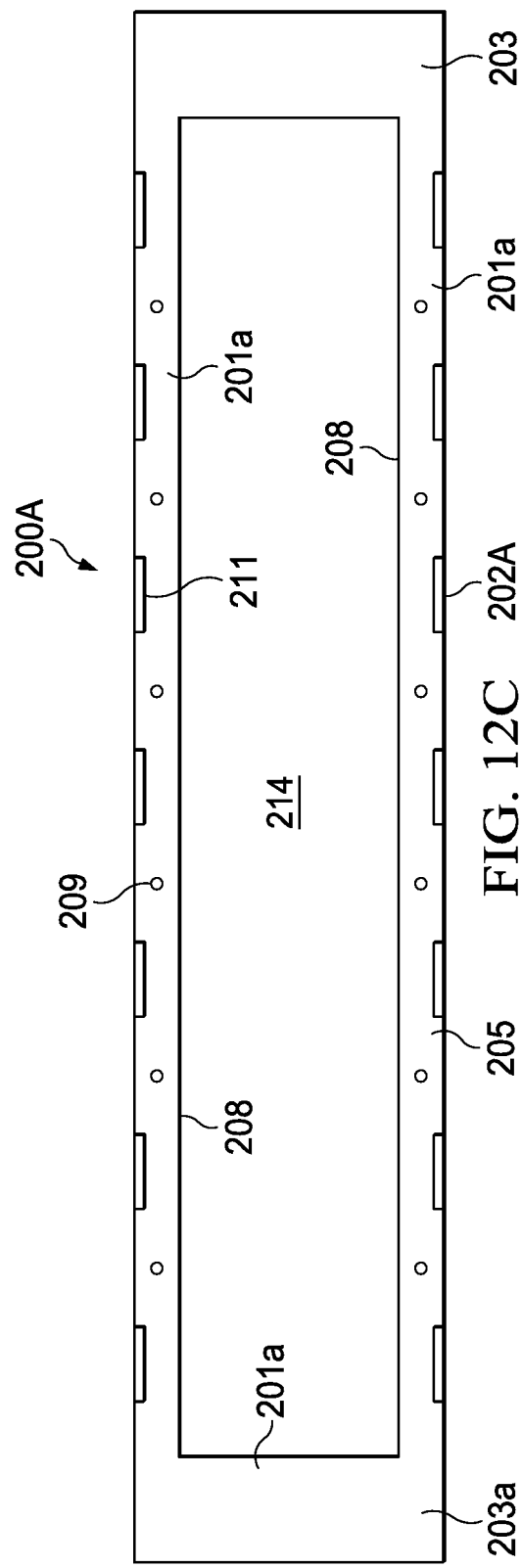
FIG. 12C is a top plan view of the interior side of a second embodiment of a concave frame assembly of the present invention shown in FIG. 10A.
Figure 12D:
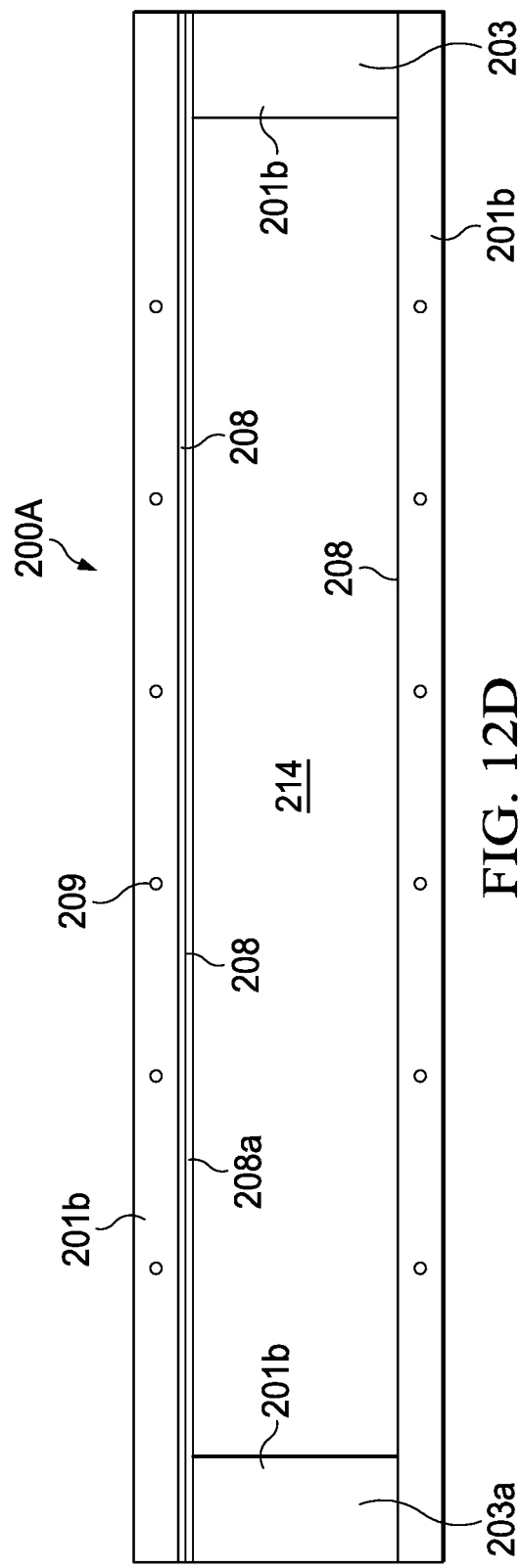
FIG. 12D is a top plan view of the exterior side of the concave frame assembly of the present invention shown in FIG. 12C.
Figure 12E:
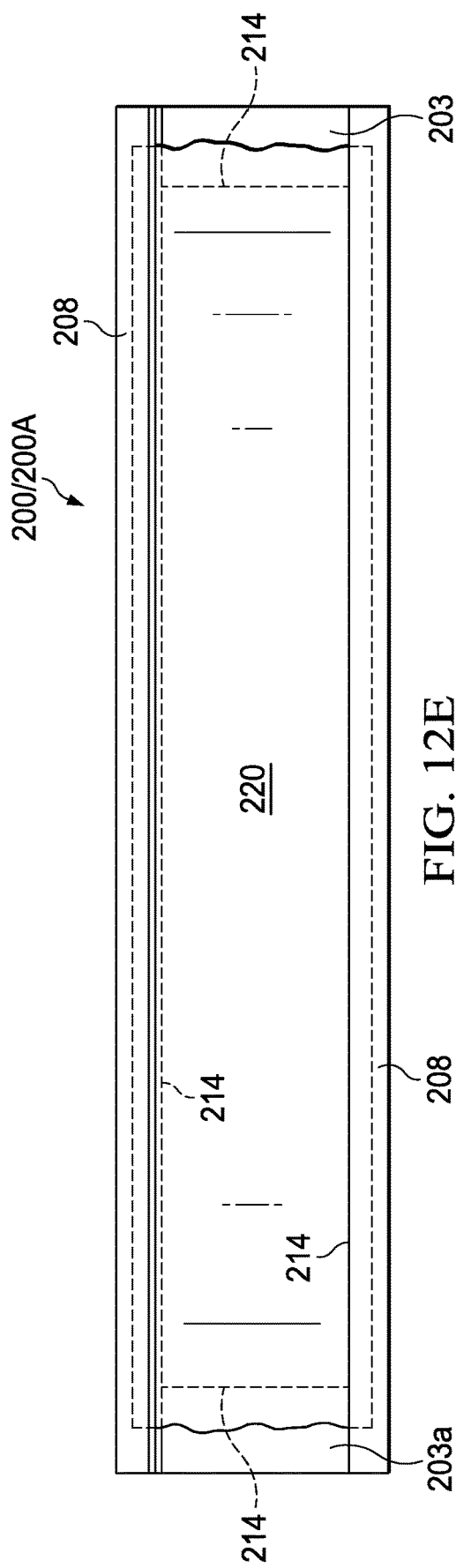
FIGS. 12E-12F illustrate the top plan view of the exterior side of the embodiments of a concave frame assembly of the present invention shown in FIGS. 12A-12D further comprising automated, dynamic cover plate assemblies comprised of retractable cover plate inserts configured between the side tracks or grooves of the concave frame assembly.
Figure 12F:
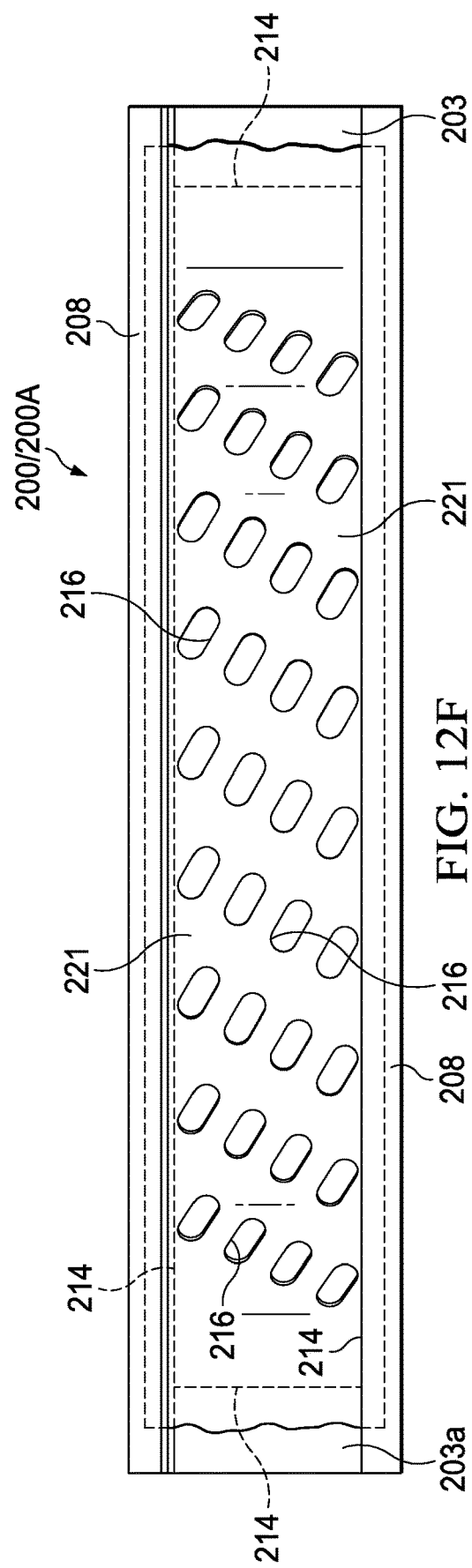

While the cover plate inserts 220/320 in the depicted embodiments may comprise a flexible plate constructed of high strength material, in other embodiments the cover plate inserts 220/320 may additionally include apertures or holes in the cover plate insert. For example, FIG. 12F depicts a cover plate insert having a plurality of apertures or holes 216 formed in the rectangular body of the cover plate inserts 220/320. The holes 216 may be configured randomly or in a geometric pattern as shown in FIG. 12F. Moreover, the cover plate inserts 220/320 in the depicted embodiments may comprise a series of segmented cover plate sections.

Figure 14A:
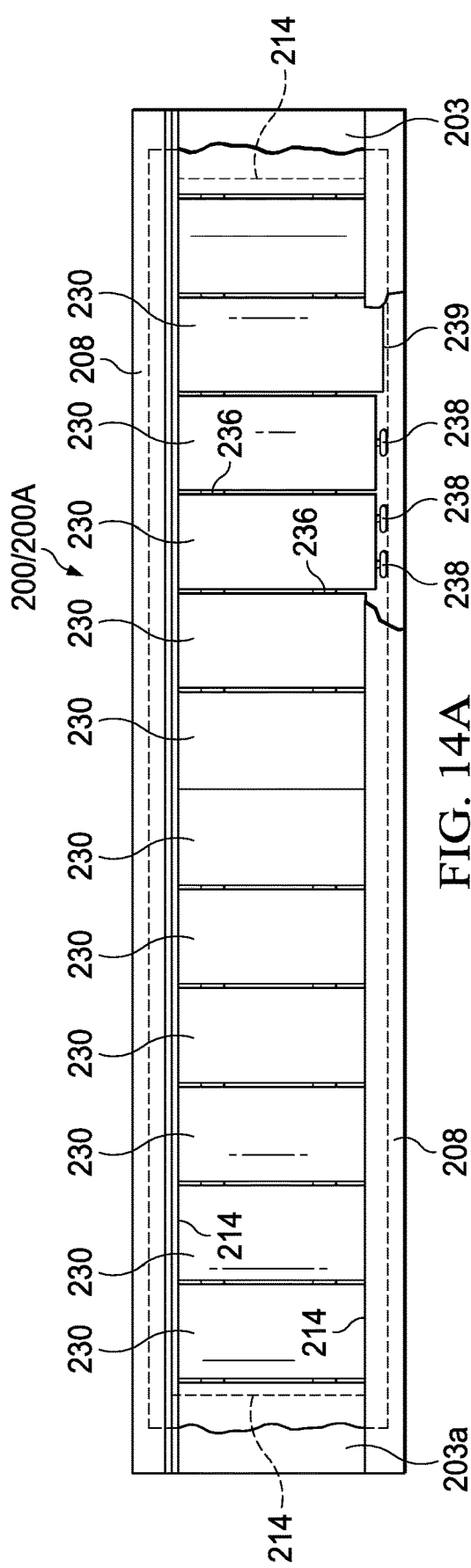
FIGS. 14A-14B illustrate two alternate embodiments of automated, dynamic cover plate assemblies of the present invention comprising a retractable, segmented, cover plate inserts configured between the side tracks or grooves.

For example, FIG. 14A depicts a cover plate insert comprised of a plurality of cover plate segments 230 connected by means of a flexing or hinge mechanism 236 disposed between them. Each cover plate segment 230 may be designed and dimensioned to be slidably coupled between a set of tracks or channels 208/308 configured on opposing sides of a central opening or a cover plate frame. For example, in one embodiment, the opposing end 239 of a cover plate segment 230 may be sized and dimensioned to slidably couple with its respective track or channel 208/308 configured on opposing sides of a central opening or a cover plate frame. Moreover, the lateral cross-section of a cover plate segment 230 may be straight or curved as desired. In alternate embodiments, the opposing ends of a cover plate segment may include one or more friction reducing mechanism 238 such as wheels or bearings.

Figure 14B:
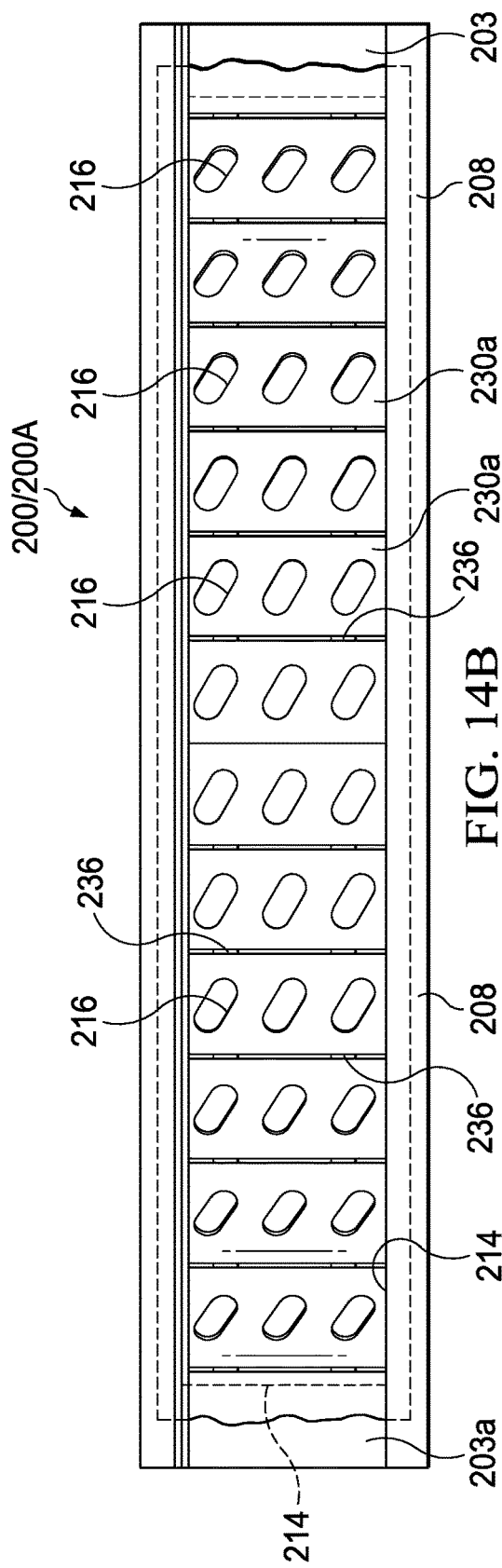

Furthermore, each cover plate segment 230 may also include one or more apertures or holes 216 formed in the rectangular body of each cover plate segment 230. The holes 216 may be configured randomly or in a geometric pattern as shown in FIG. 14B. In addition to increasing the airflow through the cover plate segment 230, the holes 216 provide additional exit passages for threshed grain to be unloaded from the rotor/cylinder and captured so that the separation grate is not overloaded.

Figure 13A:
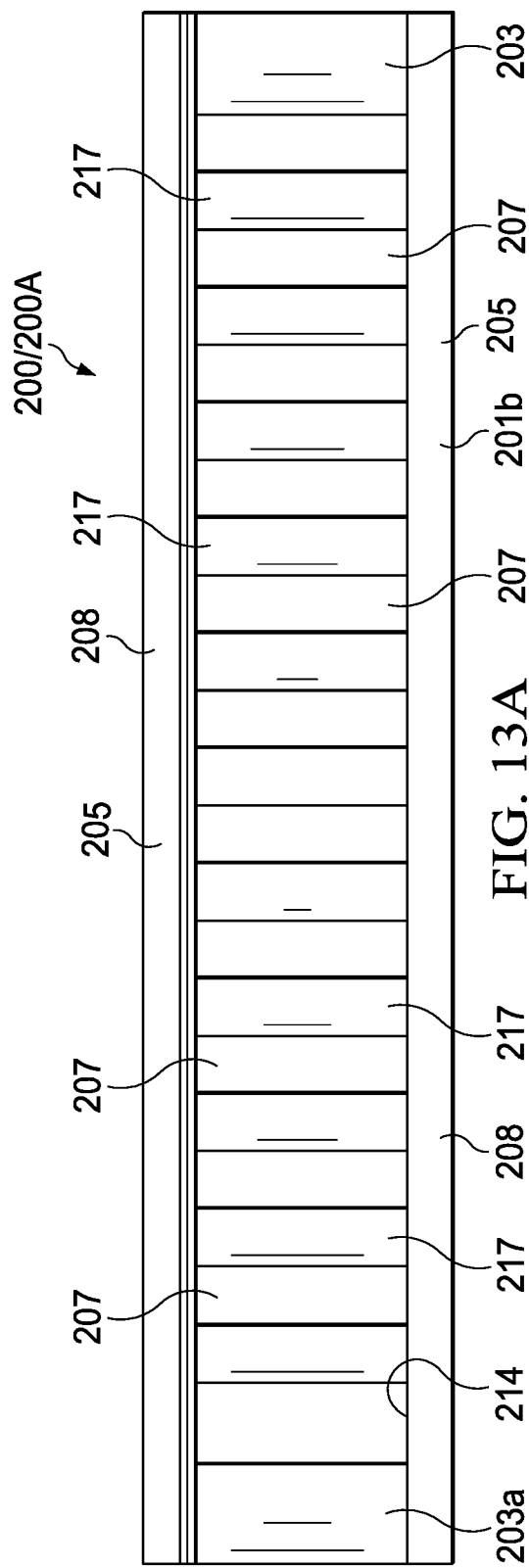
FIG. 13A is a top plan view of the exterior side of an alternate embodiment of a concave frame assembly of the present invention.
Figure 13B:
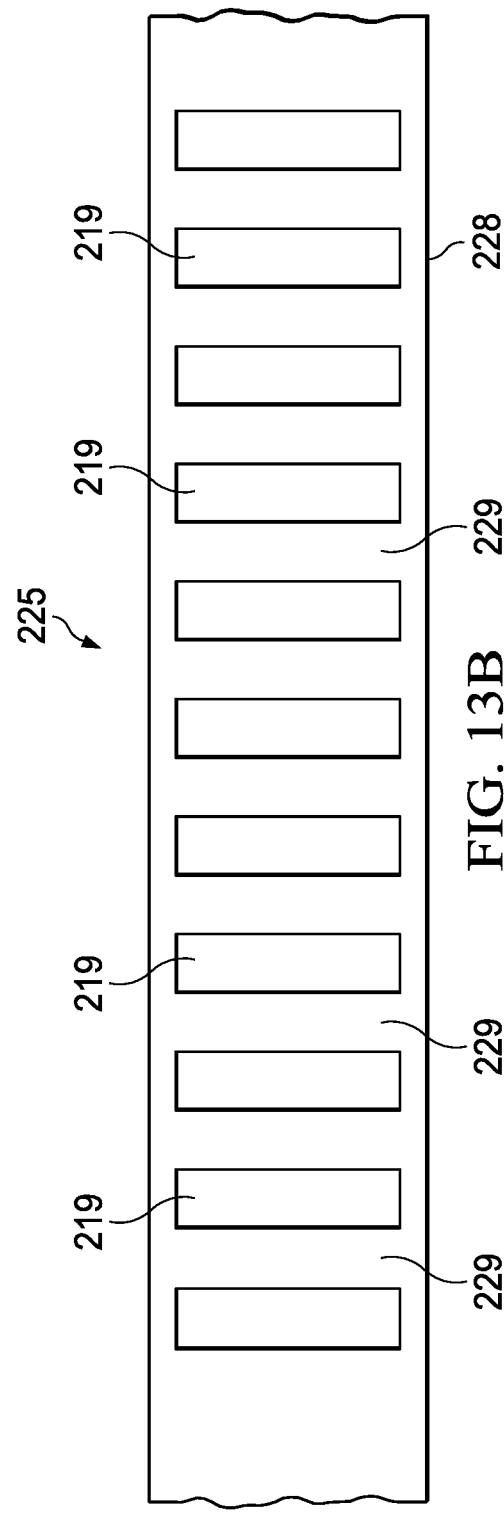
FIG. 13B is a top plan view of an alternate embodiment of a retractable cover plate insert of the present invention.

With reference now to FIGS. 13A-B, another variant embodiment of the cover plate system of the present invention 200/200A are depicted. In the depicted embodiments, the cover plate frames 202/202A are essentially identical as previously described and shown in FIGS. 12A-D, however instead of having a central opening 214 comprising a single large opening, the center portion of cover plate frames 202/202A comprises a series of segmented openings 207 spaced by cross-member sections 217 extending between the side straps or bands 205 of the cover plate frames 202/202A. As shown in FIG. 13B, the variant embodiment of the cover plate system of the present invention 200/200A may further include a special cover plate insert 228 that includes similarly segmented holes or apertures 219 divided by spaced cross member 229. Preferably, the spaced cross member 229 in the cover plate insert 228 are substantially the same dimension as the segmented openings 207 in the cover plate frames 202/202A so that the segmented openings 207 in the cover plate frames 202/202A may be efficiently closed or opened by moving the cover plate insert 228 the width of a single spaced cross member 229. Moreover, the cross-member sections 217 extending between the side straps or bands 205 of the cover plate frames 202/202A may be dimensioned to align with the axial bars 248 positioned between two parallel arcuate rails (e.g., arcuate side rail 244 and middle support rail 251) of a threshing concave grate 240. By significantly reducing the distance needed to advance the cover plate insert 228 to fully close the variant embodiment of the cover plate system of the present invention, the actuators (e.g., 223, 234) may be greatly simplified due to only having to move the cover plate insert a short distance.

Figure 13C:
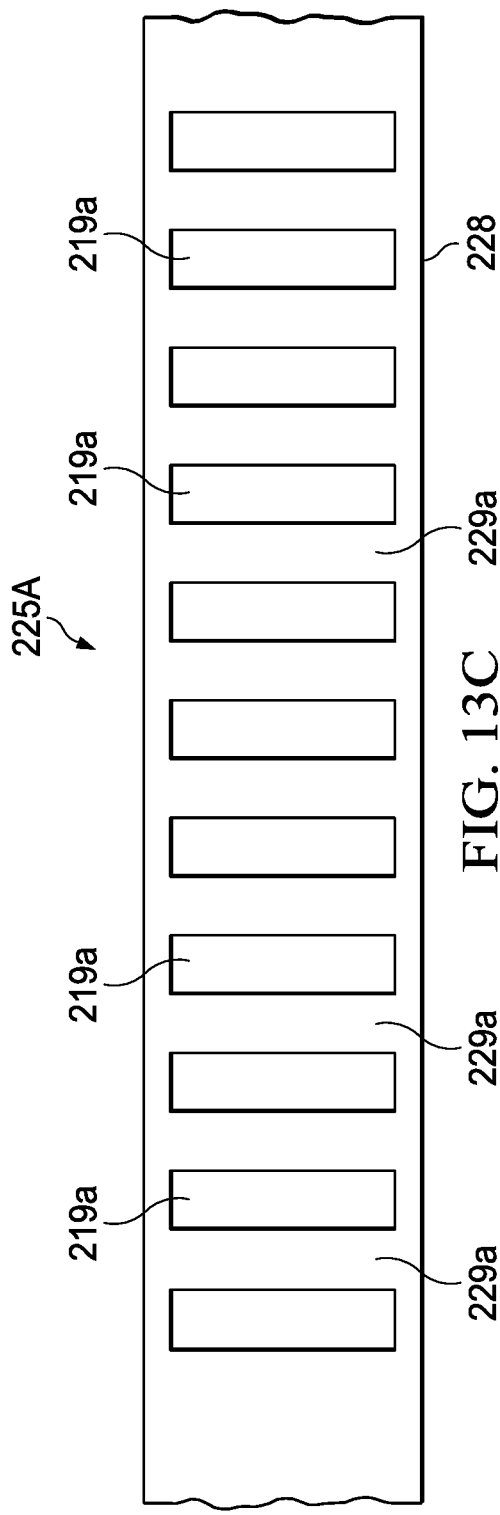
FIG. 13 C-D illustrates variant embodiments of retractable cover plate inserts configured between the side tracks or grooves.
Figure 13D:
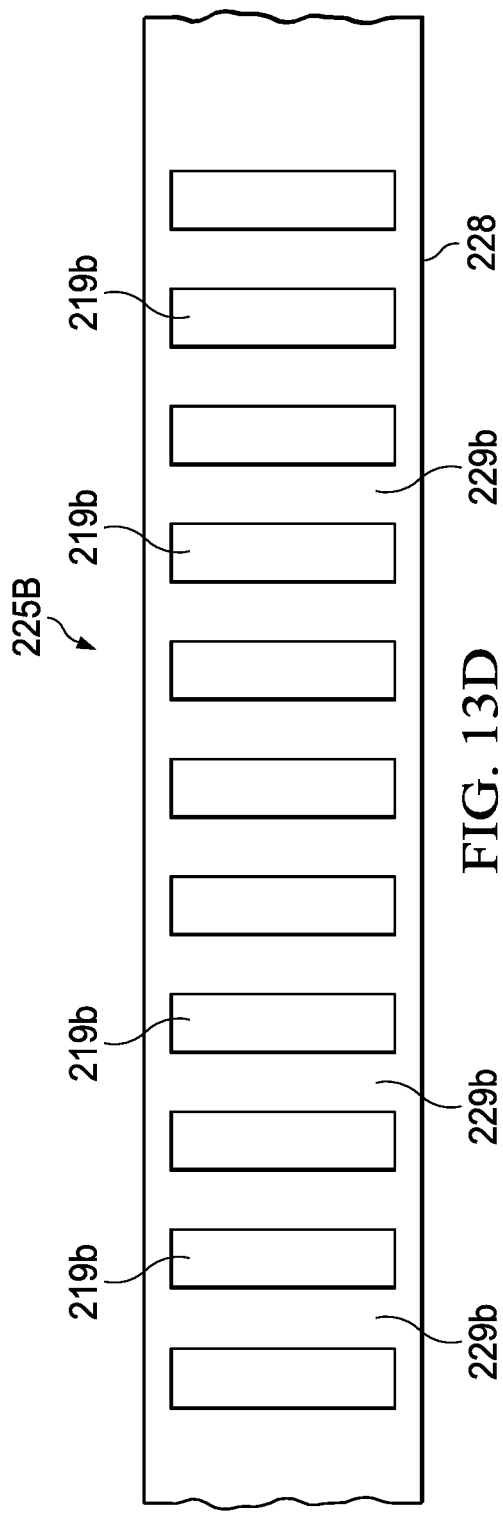

With reference now to FIGS. 13C-D, a further variant embodiment of the cover plate inserts of cover plate system of the present invention is depicted. Instead of revising the central opening 214 of the originally described cover plate frames 202/202A this embodiment relies on two separate cover plate inserts to achieve the same effect as the embodiment shown in FIGS. 13A-B. This variant embodiment is comprised of two separate cover plate inserts 225A, 225B and is adaptable to all embodiments of the automated, dynamic cover plate systems of the present invention.

For example, as shown in FIG. 13C, a first cover plate insert 225A is designed and dimensioned to be slidably coupled between a first of the one or more tracks or channels 208/308 configured on opposing sides of a central opening. A first cover plate insert 225A comprises a webbing of segmented openings 219a interspersed by cross members 229a spanning the lateral distance of the cover plate insert 225A between a first set of the opposing tracks or channels 208/308. Preferably the dimensions of the segmented openings 219a and the cross members 229a are substantially equal.

As shown in FIG. 13D, a second cover plate insert 225B comprises a similar webbing of segmented openings 219b interspersed by cross members 229b spanning the lateral distance of the cover plate insert 225B and designed and dimensioned to be configured between a second set of opposing tracks or channels 208/308. Preferably the dimensions of the segmented openings 219b and cross members 229b are substantially equal to each other and to the segmented openings 219a and cross members 229a of the first cover plate insert 225A.

The cross-member sections 229a, 229b, which extend the width of each cover plate insert 225A, 225B, may be dimensioned so as to align with the axial bars 248, 348 positioned between two parallel arcuate rails (e.g., arcuate side rail 244 and middle support rail 251) of a threshing concave grate (e.g., 240).

Preferably, the spaced cross member 229a, 229b in the cover plate inserts 225A, 225B are substantially the same dimension as the segmented openings 219a, 219b in the cover plate inserts 225A, 225B so that the segmented openings 219a, 219b in the cover plate inserts 225A, 225B may be efficiently closed or opened by either moving one cover plate insert the width of a single spaced cross member 229 or by moving the first cover plate insert 225A half the width of a single cross member 229 in a first direction and moving the second cover plate insert 225B half the width of a single cross member 229 n a second and opposite direction. By significantly reducing the distance needed to advance the cover plate inserts 225A, 225B to fully close or open the variant embodiment of the cover plate system of the present invention, the actuators (e.g., 223, 234) may be greatly simplified having only to move their respective cover plate insert a short distance.

Figure 15A:
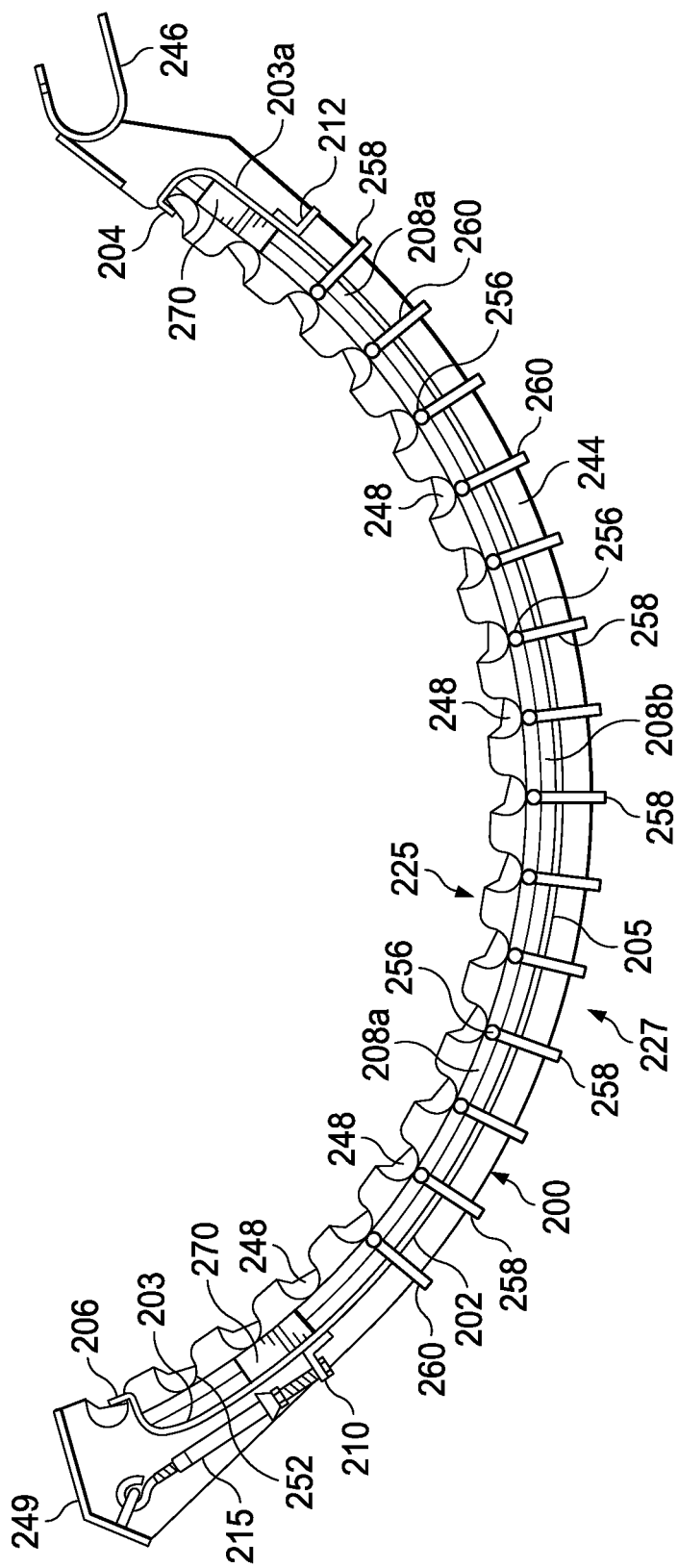
FIG. 15A illustrates a partially cutaway side view of a threshing concave grate incorporating principles of an embodiment of an automated, dynamic cover plate assembly of the present invention comprising a series of pivotal shutter mechanisms configured in the tracks or grooves of an embodiment of a concave frame assembly of the present invention in an "opened" position.
Figure 15B:
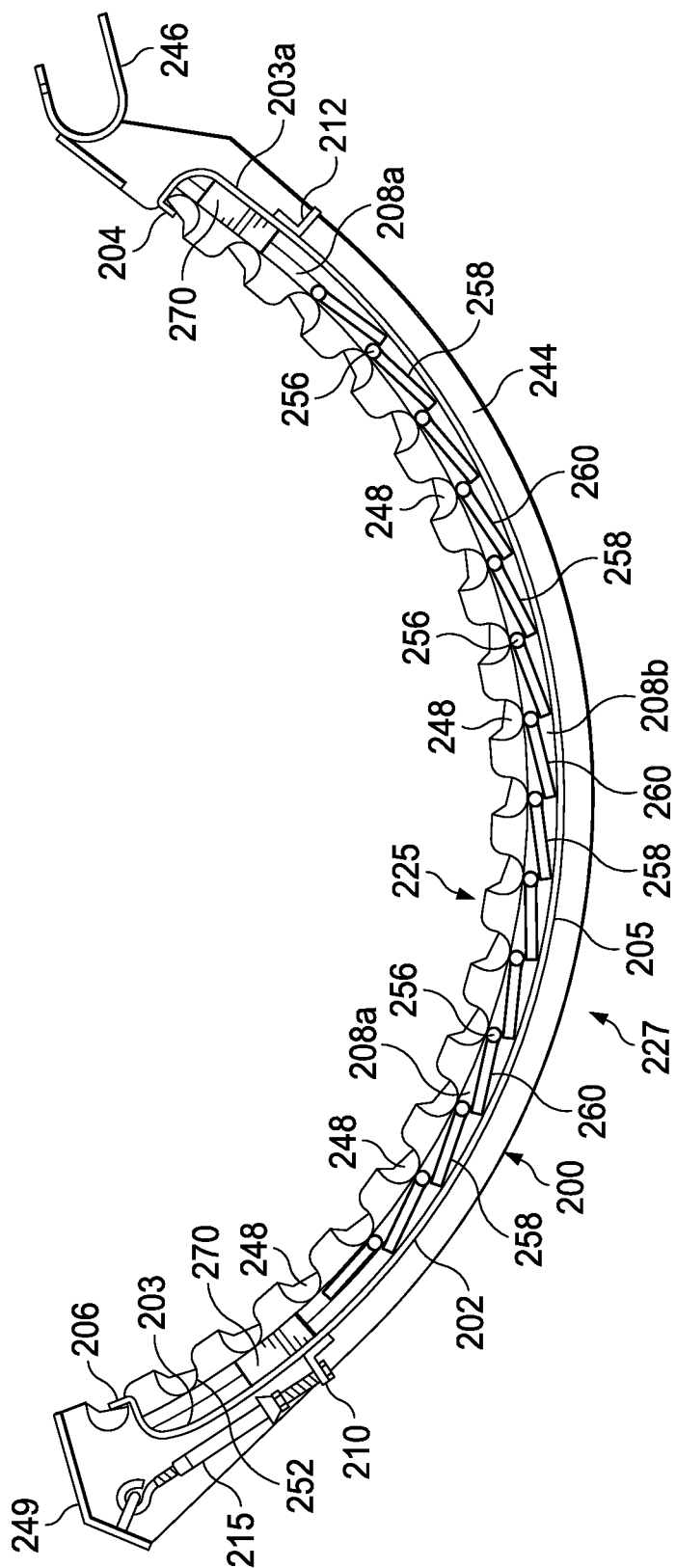
FIG. 15B illustrates the partially cutaway side view of the embodiment of the threshing concave grate incorporating principles of the automated, dynamic cover plate assembly shown in FIG. 15A comprising a series of pivotal shutter mechanisms configured in the tracks or grooves of an embodiment of a concave frame assembly of the present invention in an "closed" position.

With reference now to FIGS. 15A-D, another embodiment of the automated, dynamic cover plate system of the present invention is depicted. FIG. 15A depicts a side view of the previously disclosed automated, dynamic cover plate system 200 that comprises an elongated cover plate frame assembly 202 having a central opening 214 (FIG. 10A) formed therein and dimensioned to be positioned between two parallel arcuate rails (e.g., arcuate side rail 244 and middle support rail 251) of a threshing concave grate 240. While FIGS. 15A-B depict the present embodiment of the automated, dynamic cover plate system of the present invention incorporated into cover plate frame assembly 202 it is understood that the same system of pivotal cover plate shutters may be easily adapted to and incorporated within the previously disclosed cover plate frame assembly 202A.

The cover plate frame assembly 202 comprises two end panels 203, 203a connected by two side straps or bands 205. The cover plate frame assembly 202 further includes one or more tracks or channels 208 arranged in a parallel configuration on opposing sides of a central opening 214 in the cover plate frame assembly 202. As depicted in FIGS. 15A and B, the tracks or channels 208 are configured under the straps or bands 205 as shown in cover plate frame assembly 202. The two side straps 205, each housing one or more tracks or channels 208, are positioned on each side of the cover plate frame assembly 202 and configured to substantially abut against its respective arcuate rails (e.g., arcuate side rail 244 or middle support rail 251) of the threshing concave grate 240.

The cover plate frame assembly 202 is configured in a curved, supinated position adjacent to and against the plurality of axial bars 248 on the exterior of the threshing concave grate 240. In the embodiment of the automated, dynamic cover plate system 200 shown in FIGS. 15A and B, the cover plate frame assembly 202 is secured to the axial bars 248 by means of the previously disclosed clasp elements 204, 206 formed in the opposing end panel 203, 203a of the cover plate frame assembly 202.

As shown in the FIGS. 15A and B, the cover plate system 200 further includes a plurality of pivotal cover plate shutters 258 each configured within one of the one or more tracks or channels 208 of the cover plate system 200. For example, as shown in the Figures, each pivotal shutter 258 includes two pivot points 256 configured in the first track or channel 208a on opposing sides of the cover plate frame assembly 202. Each of the individual pivotal shutters 258 extend between the set of tracks or channels 208 of the cover plate frame assembly 202 and are positioned in a substantially parallel configuration to each other. When positioned within the set of tracks or channels 208 of the cover plate frame assembly 202 the pivot points 256 are locked into position either by spacers within the track or channel 208 or by means of a locking mechanism attached to each pivot points 256. As shown in the Figures, in a preferred embodiment, the pivot points 256 may be aligned with the underside of the axial bars 248.

FIG. 15A shows the plurality of plurality of pivotal shutters 258 in a "fully opened" configuration allowing the free flow of air between the individual axial bars 248. Upon activation of an actuator device 270, each pivotal shutter 258 rotates about its two pivot points 256. The actuator device 270 may include connections that rotate the entire plurality of pivotal shutters 258 in unison or by section. Alternatively, one or more of the pivot points 256 may further include a rotary torsional actuator that, upon activation, causes the pivotal shutter 258 to rotate about its respective pivot points 256.

FIG. 15B shows the plurality of pivotal shutters 258 in a "fully closed" configuration which greatly reduces the free flow of air between the individual axial bars 248. In the "fully closed" position, each pivotal shutter 258 may be configured so that its distal end 260 is nested against the proximal end of the next adjacent shutter 258 and juxtaposed with the pivot point 256 of the next adjacent shutter 258. By adjusting the position of the plurality of pivotal cover plate shutters 258 between the "fully opened" and "fully closed" positions, the automated, dynamic cover plate system 200 depicted in FIGS. 15A-B enables a wide variety of modification and adjustment of the concave grate's flow characteristics.

While the Figures depict each pivotal shutter 258 closing off the space between two adjacent axial bars 248, it is understood that each pivotal shutter 258 may be dimensioned to close off more or less than the space between two adjacent axial bars 248. Moreover, while the Figures depict the pivotal shutters 258 as having a consistent rectangular cross section across its length, it is understood that the cross section of the pivotal shutters 258 may be variable, curved, tapered or cambered along its width, length and thickness. Furthermore, the shape of each pivotal shutter 258 may vary depending upon its position within the automated, dynamic cover plate system 200.

The actuator devices 270, 256 may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator devices 270, 256 may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the pivotal cover plate shutters 258 within the cover plate frame assembly 202/202A. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence may include global positioning system (GPS) information and historical data from previous harvests that could be used to predict variances in yield rates at a particular GPS location, which can be used advantageously to rotate one or more or all of the pivotal shutters 258 within the cover plate frame assembly 202/202A to modify or adjust the flow characteristics of the automated cover plate assembly 200/200A.

Figure 15C:
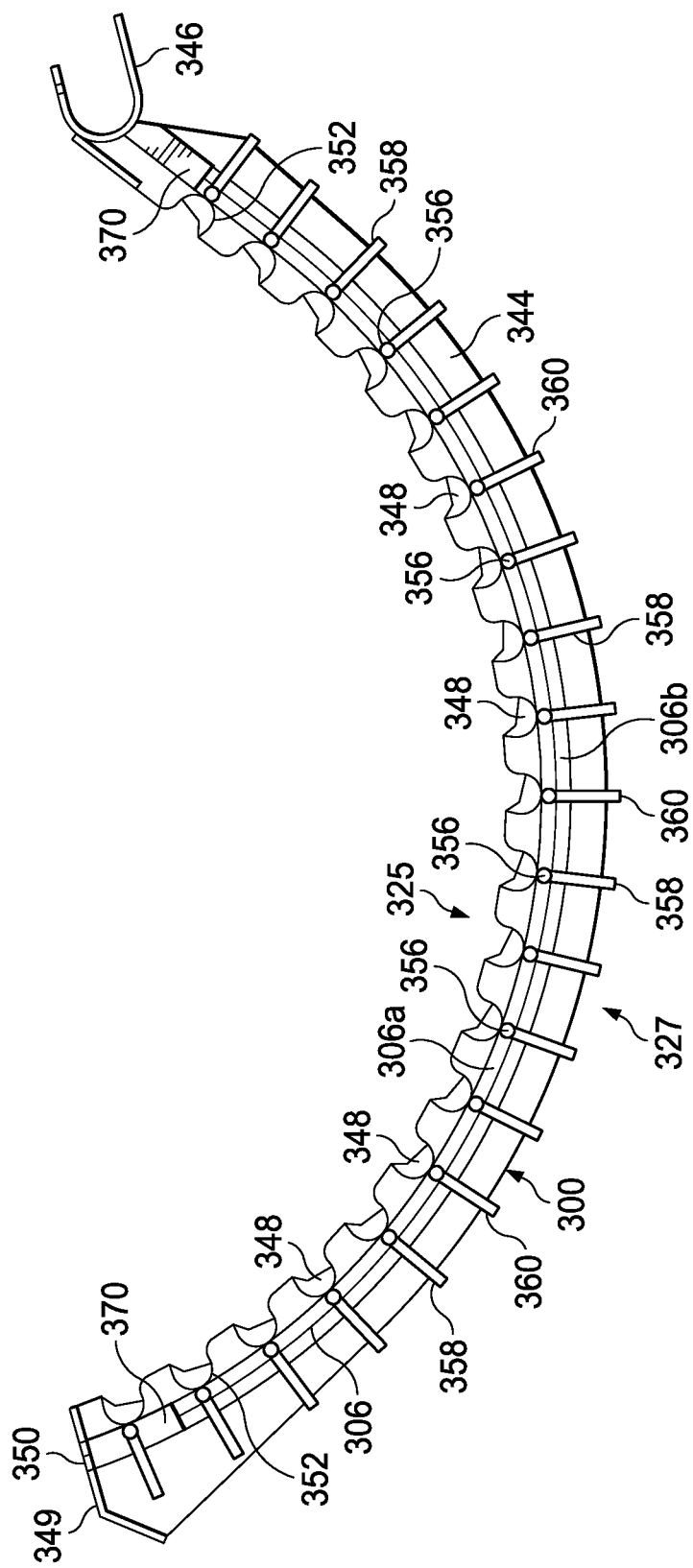
FIG. 15C illustrates a partially cutaway side view of an embodiment of a threshing concave grate incorporating principles of another embodiment of an automated, dynamic cover plate assembly of the present invention comprising a series of pivotal shutter mechanisms configured in the tracks or grooves formed or attached to the sides of a threshing concave grate, and positioned in an "opened" position.
Figure 15D:
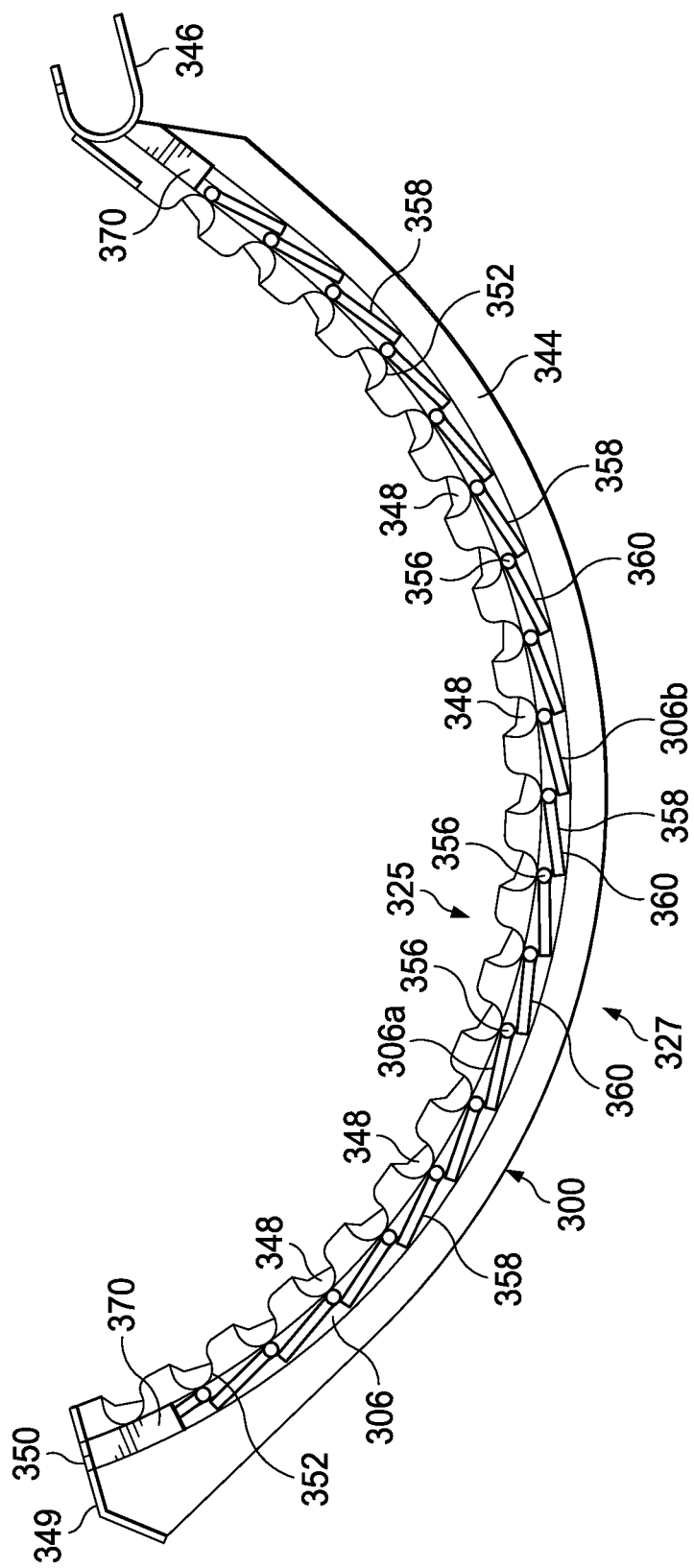
FIG. 15D illustrates the partially cutaway side view of the embodiment of the threshing concave grate incorporating principles of the embodiment of the automated, dynamic cover plate assembly shown in FIG. 15C comprising a series of pivotal shutter mechanisms configured in the tracks or grooves formed or attached to the sides of a threshing concave grate, and positioned in an "closed" position.

With reference now to FIGS. 15C-D, another embodiment of the automated, dynamic cover plate system of the present invention is depicted. FIG. 15C depicts a side view of the previously disclosed automated, dynamic cover plate system 300, which comprises a threshing concave grate 340 having two parallel arcuate rails (e.g., arcuate side rail 344 and middle support rail 351) that each have one or more curved tracks/channels/grooves 306 formed into the parallel arcuate rails (e.g., 344, 351) along the outer periphery of the axial bars 348 on the exterior or convex side 327 of the concave grate 340 (FIG. 10A) The one or more curved tracks/channels/grooves 306 are arranged in a parallel configuration on opposing sides of a central opening 307 in the concave grate 340. The one or more tracks/channels/grooves 306, positioned on each side of the concave grate 340, are configured to receive a plurality of pivotal cover plate shutters 358, each configured within one of the one or more tracks or channels 306/308 of the cover plate system 300/300A.

While FIGS. 15C-D depict the present embodiment of the automated, dynamic cover plate system of the present invention incorporated into the cover plate system 300 having its tracks/channels/grooves 306 formed into the parallel arcuate rails (e.g., 344, 351), it is understood that the same system of pivotal cover plate shutters may be easily adapted to and incorporated within the previously disclosed cover plate system 300A (FIG. 10A), wherein its tracks/channels/grooves 308 abut and extend away from the parallel arcuate rails (e.g., 344, 351). It is further understood that in an alternate embodiment the tracks/channels/grooves 308 may partially extend or be partially formed into the parallel arcuate rails (e.g., 344, 351).

The one or more tracks/channels/grooves 306/308 are designed to be configured in a curved, supinated position adjacent to and against the plurality of axial bars 348 on the exterior or convex side 327 of the threshing concave grate 340.

As shown in the FIGS. 15C and D, the cover plate system 300/300A further includes a plurality of pivotal cover plate shutters 358 each configured within one of the one or more tracks or channels 306/308 of the cover plate system 300/300A. For example, as shown in the Figures, each pivotal shutter 358 includes two pivot points 356 configured in the first track or channel 306a on opposing sides of the concave grate 340. Each of the individual pivotal shutters 358 extend between the set of tracks or channels 306/308 of the cover plate system 300/300A and are positioned in a substantially parallel configuration to each other. When positioned within the set of tracks or channels 306/308 of the cover plate system 300/300A the pivot points 356 are locked into position either by spacers within the track or channel 306/308 or by means of a locking mechanism attached to each pivot points 356. As shown in the Figures, in a preferred embodiment, the pivot points 356 may be aligned with the underside of the axial bars 348.

FIG. 15C shows the plurality of plurality of pivotal cover plate shutters 358 in a "fully opened" configuration allowing the free flow of air between the individual axial bars 348. Upon activation of an actuator device 370, each pivotal shutter 358 rotates about its two pivot points 356. The actuator device 370 may include connections that rotate the entire plurality of pivotal shutters 358 in unison or by section. Alternatively, one or more of the pivot points 356 may further include a rotary torsional actuator that, upon activation, causes the pivotal shutter 358 to rotate about its respective pivot points 356.

FIG. 15D shows the plurality of pivotal cover plate shutters 358 in a "fully closed" configuration which greatly reduces the free flow of air between the individual axial bars 348. In the "fully closed" position, each pivotal shutter 358 may be configured so that its distal end 360 is nested against the proximal end of the next adjacent shutter 358 and juxtaposed with the pivot point 356 of the next adjacent shutter 258. By adjusting the position of the plurality of pivotal cover plate shutters 358 between the "fully opened" and "fully closed" positions, the automated, dynamic cover plate system 300/300A depicted in FIGS. 15C-D enables a wide variety or spectrum of modification and adjustment of the concave grate's flow characteristics.

While the Figures depict each pivotal cover plate shutter 258 closing off the space between two adjacent axial bars 348, it is understood that each pivotal shutter 358 may be dimensioned to close off more or less than the space between two adjacent axial bars 348. Moreover, while the Figures depict the pivotal shutters 358 as having a consistent rectangular cross section across its length, it is understood that the cross section of the pivotal shutters 358 may be variable, curved, tapered or cambered along its width, length and thickness. Furthermore, the shape of each pivotal shutter 358 may vary depending upon its position within the automated, dynamic cover plate system 300/300A.

The actuator devices 370, 356 may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator devices 370, 356 may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the pivotal cover plate shutters 358 within the cover plate frame assembly 202/202A. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence may include global positioning system (GPS) information and historical data from previous harvests that could be used to predict variances in yield rates at a particular GPS location, which can be used advantageously to rotate one or more or all of the pivotal shutters 258 within the concave grate 340 to modify or adjust the flow characteristics of the automated, dynamic cover plate system 300/300A.

With reference now to FIGS. 10A and 16A-18B, multiple embodiments of individual, dynamic, cover plate mechanisms of the present invention are depicted. The concave grate 440 (configured in the middle of FIG. 10A, between the first 240 and second 340 concave grates) includes a pair of arcuate, elongated and laterally spaced apart side rails 444 oriented generally transverse to the axis of the rotor 20 (FIG. 2). As shown in the Figures, one end of each side rail 444 has a hook element 446 used to mount the threshing concave grate 440 on an axial bar (not shown) used to move the threshing concave grate 440 closer or further away from the rotor 20 (FIG. 2). A plurality of axial bars 448 span the side rails 444. End plates 449 are preferably affixed between ends of the side rails 444. A middle support rail 451 is typically positioned between and parallel to the side rails 444 and supports the axial bars 448. While the concave grates shown in the drawings depict concave grates typically found on John Deere® combine harvesters, it should be understood that the present invention is not limited to concave grates found on John Deere® combine harvesters, but applies to and may be readily adapted to all makes of combine harvester concave grates.

The axial bars 448 typically have outwardly projecting overhangs at their opposite ends that overlay upper edges of the side rails 444 and are operable to bear against the same when grate 440 is installed. Preferably, the overhangs are received in notches 452 in the upper edges of side rails 444 and welded to the side rails 444. The overhangs also provide a substantially continuous surface when multiple grate assemblies 24, 26 (FIG. 1) are installed side-by-side in the combine harvester 10 (FIG. 1). While the axial bars 448 shown in the Figures are depicted as having a round or partially round cross section, it is understood that the axial bars 448 can also have a completely round, notched, oval, rectangular or polygonal cross-section.

With reference to the Figures and particularly FIGS. 16A-B, a concave grate 440 depicting principles of multiple embodiments of individual, dynamic, pivotally hinged cover plate mechanisms of the present invention is depicted. While the multiple embodiments of individual, dynamic, pivotally hinged cover plate mechanisms are depicted in the Figures as being integral and directly incorporated into the concave grate 440 it is understood that the principles of the individual, dynamic, pivotally hinged cover plate mechanisms can also be readily adapted to and incorporated into the previously disclosed automated, dynamic cover plate systems 200/200A/300/300A.

As shown in FIGS. 16A-B, the concave grate 440 may include one or more embodiments of a pivotally hinged cover plate mechanism. Each pivotally hinged cover plate mechanism includes at least one and preferably two pivot points 456 either attached to formed within the parallel arcuate rails (e.g., 444, 451) of the concave grate 440. Alternatively, the pivot point of the cover plate mechanism may comprise a hinge mechanism attached to and extending along the length of an axial bar 448.

In one embodiment the pivotally hinged cover plate mechanism comprises a pivotal cover plate shutter 450 configured in a parallel alignment with its respective axial bar 448 and having two pivot points 456*a* either attached to formed within the parallel arcuate rails (e.g., 444, 451) of the concave grate 440. The pivot points 456*a* are affixed or connected to the proximal end of the pivotal cover plate shutter 450, which extends across the opening between the two parallel arcuate rails (e.g., 444, 451). As shown in the Figures, in a preferred embodiment, the pivot points 456*a* may be aligned with the underside (i.e., the exterior facing side) of the axial bars 448.

Each pivotally hinged cover plate mechanism further includes one or more actuator device that causes the pivotal cover plate shutter 450 to rotate about its pivot point 456 when activated. For example, in one embodiment the cover plate mechanism may comprise one or more actuator 458*a* attached to one or more of the parallel arcuate rails (e.g., 444, 451) and connected to its respective cover plate mechanism 450 so that, when activated, the actuator 458*a* causes the pivotal cover plate shutter 450 to rotate about its pivot point 456*a*. Alternatively, or in addition, the one or more of the pivot points 456*a* may further comprise a rotary torsional actuator that, upon activation, causes the pivotal cover plate shutter 450 to rotate about its respective pivot point 456*a*. Alternatively, or in addition, the cover plate mechanism may also comprise an actuator 459 attached to an axial bar 448 and connected to its respective cover plate mechanism 450*a* such that, when activated, the actuator 459 causes the pivotal cover plate shutter 450*a* to rotate about its pivot point 456*a*. Preferably, the actuator 459 is substantially centered on the axial bar 448 between the parallel arcuate rails (e.g., 444, 451).

In FIG. 16A, the pivotal cover plate shutters 450/450*a* on the left hand side of the concave grate 440 are shown in a "fully closed" position, which greatly reduces the free flow of air between the individual axial bars 448. In the "fully closed" position, each pivotal cover plate shutter 450/450*a* may be configured so that its distal end 460 is nested against either against the next adjacent axial bar or the proximal end of the next adjacent cover plate shutter and juxtaposed with the pivot point 456 of the next adjacent cover plate. In contrast, the pivotal cover plate shutters 450/450*a* on the right hand side of the concave grate 440 in FIG. 16A are shown in a "fully opened" position, which allows the free flow of air between the individual axial bars 448 of the concave grate 440.

By adjusting the angular position of the pivotal cover plate shutter 450, 450*a* between the "fully opened" and "fully closed" positions, the pivotal cover plate shutters 450, 450*a* depicted in FIGS. 16A-B enables a wide variety or spectrum of modification and adjustment of the concave grate's flow characteristics.

While the FIGS. 16A-B depict the pivotal cover plate shutters 450/450*a* closing off the space between two adjacent axial bars 448, it is understood that a pivotal cover plate shutter 450/450*a* may be dimensioned to close off more or less than the space between two adjacent axial bars 448. Moreover, while the Figures depict the pivotal cover plate shutters 450/450*a* as having a consistent rectangular cross section across its length, it is understood that the cross section of the pivotal cover plate shutter 450/450*a* may be variable, curved, tapered or cambered along its width, length and thickness. Furthermore, the shape of each pivotal cover plate shutter 450/450*a* may vary depending upon its position within the concave grate 440.

Other embodiments in accordance with the principles of the pivotally hinged cover plate mechanism of the present invention may comprise a set of two pivotally hinged cover plate mechanisms arranged in an opposing configuration between two or more axial bars. For example, as shown in FIG. 16A-B, in one embodiment a pivotally hinged cover plate mechanism 453 comprises two pivotally hinged cover plate mechanisms 453*a*, 453*b* arranged in an opposing configuration between two axial bars 448. Each of the pivotal cover plate shutters 453*a*, 453*b* includes one or more pivot points 456 that are either attached to or formed within the parallel arcuate rails (e.g., 444, 451) of the concave grate 440. Alternatively, the pivot point of the pivotal cover plate shutters 453*a*, 453*b* may comprise a hinge mechanism attached to and extending along the length of its respective axial bars 448.

For example, in one embodiment, the pivotally hinged cover plate mechanism 453 comprises two opposing pivotal cover plate shutters 453a, 453b configured in a parallel alignment with its respective axial bar 448 and having a pivot point 456a either attached to formed within the parallel arcuate rails (e.g., 444, 451) of the concave grate 440. The pivot point 456a is affixed or connected to the proximal end of the pivotal cover plate shutter 450, which extends across the opening between the two parallel arcuate rails (e.g., 444, 451). As shown in the Figures, in a preferred embodiment, the pivot points 456a may be aligned with the underside (i.e., the exterior facing side) of the axial bar 448.

Each pivotal cover plate shutters 453a, 453b further includes one or more actuator devices that cause the pivotal cover plate shutter 453a, 453b to rotate about its respective pivot point 456 when activated. For example, in one embodiment pivotally hinged cover plate mechanism 453 may comprise one or more actuators 458b attached to one or more of the parallel arcuate rails (e.g., 444, 451) and connected to its respective cover plate shutter 453a, 453b so that, when activated, the actuator 458b causes the pivotal cover plate shutter 453a, 453b to rotate about its respective pivot point 456b. Alternatively, or in addition, one or more of the pivot points 456b may further comprise a rotary torsional actuator that, upon activation, causes the pivotal cover plate shutter 453a, 453b to rotate about its respective pivot point 456b. Alternatively, or in addition, the cover plate mechanism may comprise an actuator 459 attached to an axial bar 448 and connected to its respective cover plate mechanism 450a such that, when activated, the actuator 459 causes the pivotal cover plate shutter 450a to rotate about its pivot point 456a. Preferably the actuator 459 is substantially centered on the axial bar 448 between the parallel arcuate rails (e.g., 444, 451).

In FIG. 16A, the pivotally hinged cover plate mechanism 453 on the left hand side of the concave grate 440 are shown in a "fully closed" position, which greatly reduces the free flow of air between the individual axial bars 448. In the "fully closed" position, each pivotal cover plate shutters 453a, 453b is be configured so that its distal end aligns with the distal end of the opposing cover plate shutter. In contrast, the pivotal cover plate shutters 450/450a on the right hand side of the concave grate 440 in FIG. 16A are shown in a "fully opened" position, which allows the free flow of air between the individual axial bars 448 of the concave grate 440.

While the FIGS. 16A-B depict the pivotal cover plate shutters 450/450a closing off the space between two adjacent axial bars 448, it is understood that a pivotal cover plate shutter 450/450a may be dimensioned to close off more or less than the space between two adjacent axial bars 448. For example, in another embodiment, a hinged cover plate mechanism 454 comprises two pivotal cover plate shutters 454a, 454b arranged in an opposing configuration between three axial bars 448. Each of the pivotal cover plate shutters 454a, 454b includes one or more pivot points 456c that are either attached to or formed within the parallel arcuate rails (e.g., 444, 451) of the concave grate 440. Alternatively, the pivot point of the pivotal cover plate shutters 454a, 454b may comprise a hinge mechanism attached to and extending along the length of its respective axial bars 448. In the "fully closed" position, each pivotal cover plate shutters 454a, 454b may be configured so that its distal end 460 aligns with the distal end 460 of the opposing cover plate shutter and is nested on or covers the middle axial bar 448.

While the Figures depict the pivotal cover plate shutters 453/453a/454/454a as having a consistent rectangular cross section across its length, it is understood that the cross section of the pivotal cover plate shutter 453/453a/454/454a may be variable, curved, tapered or cambered along its width, length and thickness. Furthermore, the shape of each pivotal cover plate shutter 453/453a/454/454a may vary depending upon its position within the concave grate 440.

By adjusting the angular position of the pivotal cover plate shutter 453/453a/454/454a between the "fully opened" and "fully closed" positions, the pivotal cover plate shutters 453/453a/454/454a depicted in FIGS. 16A-B enables a wide variety or spectrum of modification and adjustment of the concave grate's flow characteristics.

The actuator devices 458/459/456 may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator devices 458/459/456 may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the pivotal cover plate shutters 450/453/454 within the concave grate 440. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence may include global positioning system (GPS) information and historical data from previous harvests that could be used to predict variances in yield rates at a particular GPS location, which can be used advantageously to rotate one or more or all of the pivotal cover plate shutters 450/453/454 within the concave grate 440 to modify or adjust the flow characteristics of the concave grate 440.

Figure 17A:
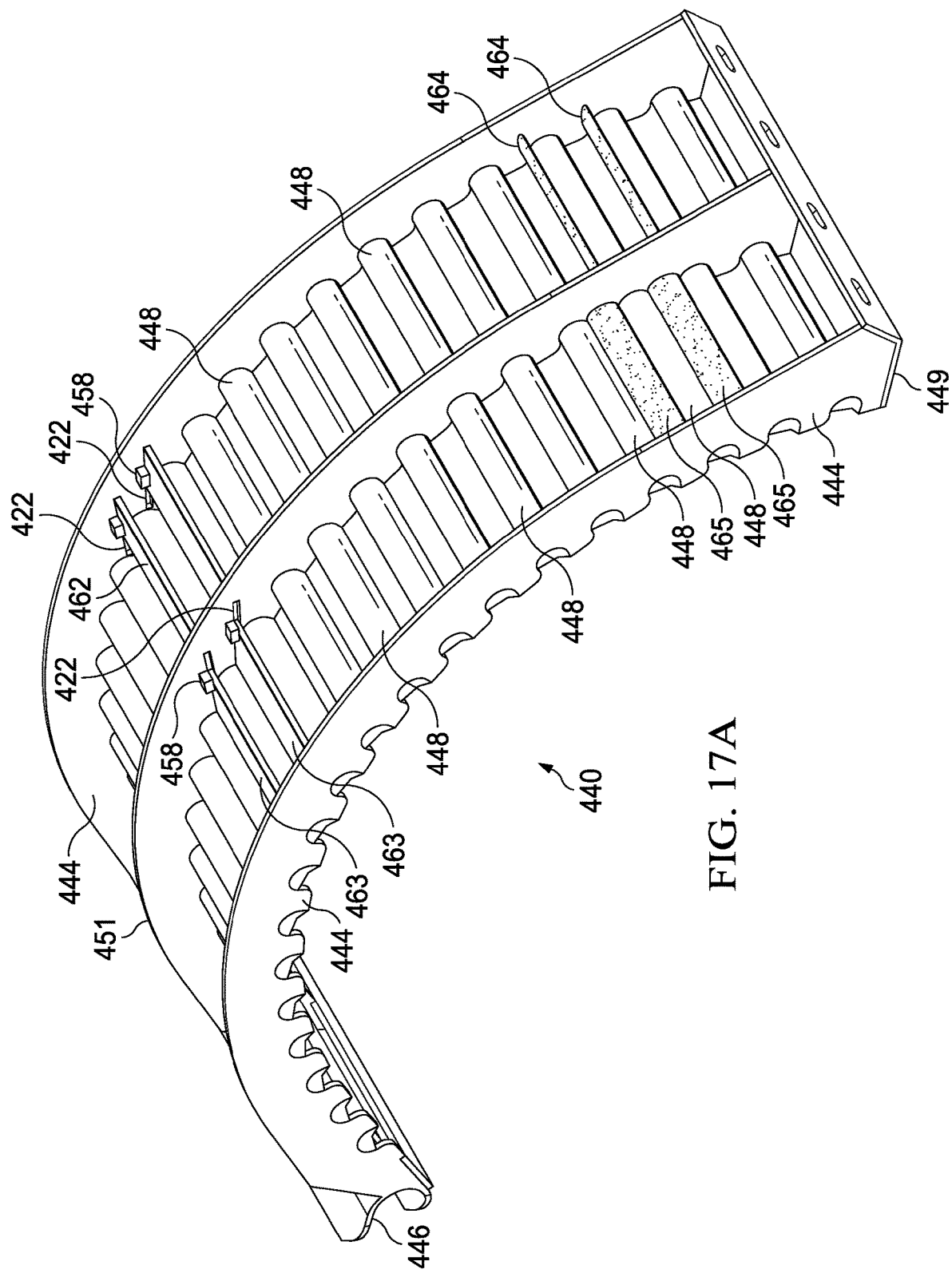
FIG. 17A illustrates a perspective view of a concave grate incorporating principles of multiple embodiments of individual, dynamic, pneumatic and linear track cover plate mechanisms of the present invention.
Figure 17B:
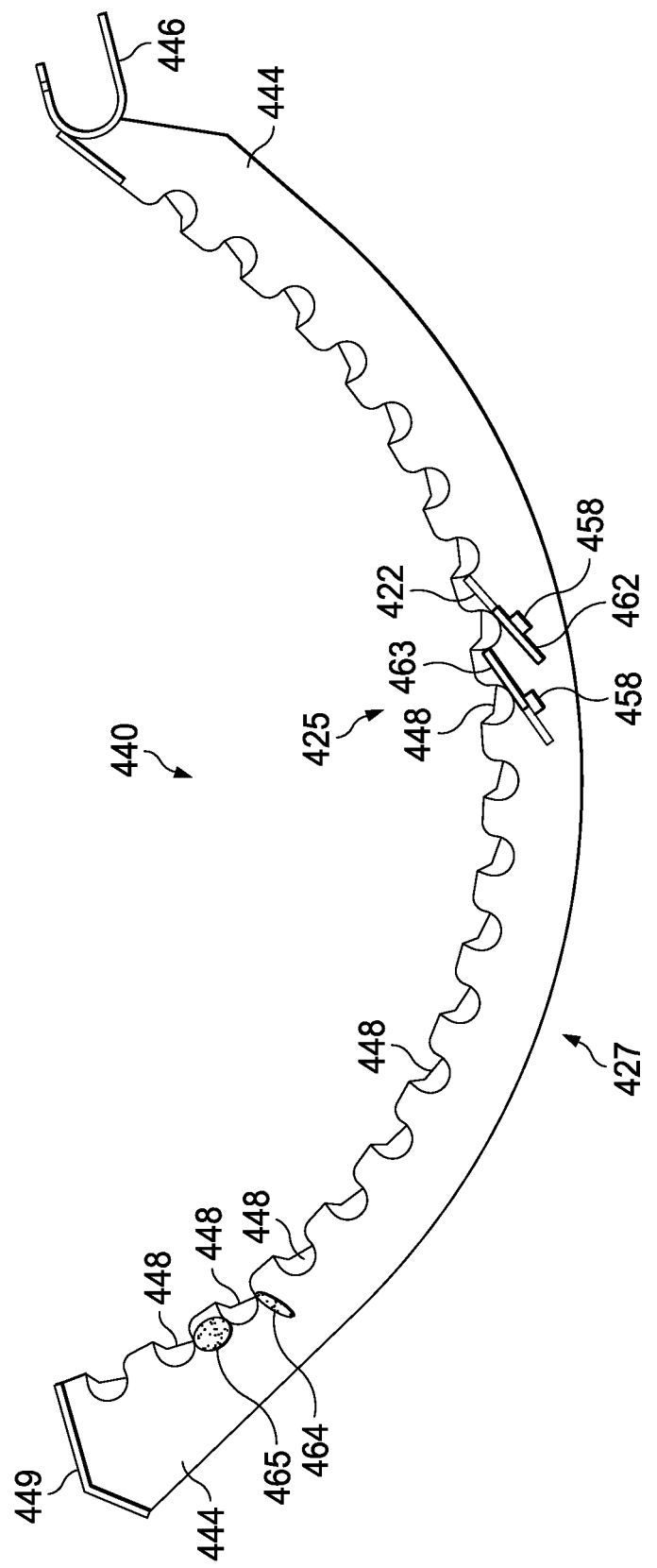
FIG. 17B illustrates a partially cutaway side view of the concave grate and cover plate mechanisms shown in FIG. 17A.

With reference now to FIGS. 17A-B, a concave grate 440 depicting principles of an individual, dynamic, sliding vent shutter cover plate mechanism and an individual, dynamic, inflatable shutter mechanism of the present invention are depicted. While the embodiments of the sliding vent shutter cover plate mechanism and inflatable shutter mechanism are depicted in the Figures as being integral and directly incorporated into the concave grate 440 it is understood that the principles of the sliding vent shutter cover plate mechanism and inflatable shutter mechanism can also be readily adapted to and incorporated into the previously disclosed automated, dynamic cover plate systems 200/200A/300/300A.

As shown in FIGS. 17A-B, the concave grate 440 may include one or more embodiments of a sliding vent shutter cover plate mechanism. Each sliding vent shutter cover plate mechanism includes a track mechanism 422 either attached to formed within the parallel arcuate rails (e.g., 444, 451) of the concave grate 440.

In one embodiment the sliding vent shutter cover plate mechanism comprises a sliding vent shutter cover plate 462/463 configured in a parallel alignment with its respective axial bar 448 and having two track mechanism 422 either attached to formed within the parallel arcuate rails (e.g., 444, 451) of the concave grate 440. The opposing ends of each sliding vent shutter cover plate 462/463 are positioned in a slidable configuration with track mechanisms 422. For example, the track mechanism 422 may simply comprise a track or groove that receives the sliding vent shutter cover plate 462/463 and allows it to move within the track or groove in a slidable configuration. As shown in the Figures, in a preferred embodiment, the track mechanisms 422 may be aligned with the underside (i.e., the exterior facing side) of the axial bars 448.

Each sliding vent shutter cover plate mechanism further includes at least one actuator device 458 that causes the sliding vent shutter cover plate 462/463 to move within its track mechanism 422 when activated. For example, in one embodiment the sliding vent shutter cover plate mechanism may comprise one or more actuator 458 attached to one or more of the parallel arcuate rails (e.g., 444, 451) and connected to its respective vent shutter cover plate 462/463 so that, when activated, the actuator 458 causes the vent shutter cover plate 462/463 to move in its respective track mechanism 422.

In FIG. 17A, the sliding vent shutter cover plate 463 on the left hand side of the concave grate 440 are shown in a "fully closed" position, which greatly reduces the free flow of air between the two axial bars 448. In the "fully closed" position, each sliding vent shutter cover plate 463 may be configured so that it effectively blocks off the space between two adjacent axial bars. In contrast, sliding vent shutter cover plate 462 on the right hand side of the concave grate 440 in FIG. 17A are shown in a "fully opened" position, which allows the free flow of air between the two adjacent axial bars 448 of the concave grate 440.

By adjusting the position of the sliding vent shutter cover plate 462/463 within its respective track mechanism 422, between the "fully opened" and "fully closed" positions, the sliding vent shutter cover plate 462/463 depicted in FIGS. 17A-B enables a wide variety or spectrum of modification and adjustment of the concave grate's flow characteristics.

While the FIGS. 17A-B depict the sliding vent shutter cover plate 462/463 as having a consistent rectangular cross section across its length, it is understood that the cross section of the sliding vent shutter cover plate 462/463 may be variable, curved, tapered or cambered along its width, length and thickness. Furthermore, the shape of each sliding vent shutter cover plate 462/463 may vary depending upon its position within the concave grate 440.

The actuator device 458 may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator device 458 may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the vent shutter cover plate 462/463 within its respective track mechanism 422. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence may include global positioning system (GPS) information and historical data from previous harvests that could be used to predict variances in yield rates at a particular GPS location, which can be used advantageously adjust the position of the vent shutter cover plate 462/463 within its respective rack mechanism 422 in order to modify or adjust the flow characteristics of the concave grate 440.

As shown in FIGS. 17A-B, the concave grate 440 may also include one or more embodiments of an individual, dynamic, inflatable shutter mechanism. Each individual, dynamic, inflatable shutter mechanism includes an inflatable shutter 465 attached to the leading edge of an axial bar 448 of the concave grate 440.

In one embodiment the inflatable shutter 465 comprises a flexible plenum chamber or balloon capable of inflation with air or other gas or liquid. In the embodiment depicted in the Figures, the inflatable shutter 465 has a parabolic cross-section when fully inflated, capable of blocking the space between two adjacent axial bars 448. Upon deflation, the deflated shutter mechanism 464 shrinks to a minimum cross-section allowing the free flow of air through the two adjacent axial bars 448. While flexible, the inflatable shutter 465 is constructed of durable, high strength material to be rigid when inflated. For example, while the inflatable shutter mechanism 465 may comprise a flexible, high strength rubber or plastic plenum or balloon, it may further comprise an outer covering of a high strength, durable material such as Kevlar® fabric or a flexible stainless steel cloth.

The inflatable shutter mechanism further includes at least one actuator device (not shown) that causes the inflatable shutter 465 to inflate or deflate when activated. When activated, the actuator device allows the pressurized flow of a gas or liquid from a reservoir to the inflatable shutter 465. When deactivated, the actuator device allows the pressurized flow of a gas or liquid to be directed out and away from inflatable shutter 465. In one embodiment, the inflatable shutter mechanism includes pressurized air and/or water lines from a compressor to each inflatable shutter 465.

In FIG. 17A, the inflated shutter mechanisms 465 on the left hand side of the concave grate 440 are shown in a fully inflated (i.e., "fully closed") position, which greatly reduces the free flow of air between the two adjacent axial bars 448. In the fully inflated (i.e., "fully closed") position, each inflated shutter mechanism 465 may be configured so that it effectively blocks off the space between two adjacent axial bars. In contrast, the deflated shutter mechanism 464 shown on the right hand side of the concave grate 440 in FIG. 17A are shown in a fully deflated (i.e., "fully open") position, which allows the free flow of air between the two adjacent axial bars 448 of the concave grate 440.

By adjusting the amount of inflation of the inflatable shutter mechanism 464/465 between the fully deflated (i.e., "fully open") and fully inflated (i.e., "fully closed") positions, the inflatable shutter mechanism 464/465 depicted in FIGS. 17A-B enables a wide variety or spectrum of modification and adjustment of the concave grate's flow characteristics.

While the FIGS. 17A-B depict the inflatable shutter mechanism 464/465 as having a consistent parabolic cross section across its length, it is understood that the cross section of the inflatable shutter mechanism 464/465 may be variable, curved, tapered or cambered along its width, length and thickness. Furthermore, the shape of each inflatable shutter mechanism 464/465 may vary depending upon its position within the concave grate 440.

The actuator device may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator device may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper amount of inflation of the inflatable shutter mechanism 464/465 within its the concave grate 440. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence may include global positioning system (GPS) information and historical data from previous harvests that could be used to predict variances in yield rates at a particular GPS location, which can be used advantageously adjust the amount of inflation of the inflatable shutter mechanism 464/465 in order to modify or adjust the flow characteristics of the concave grate 440.

Figure 18A:
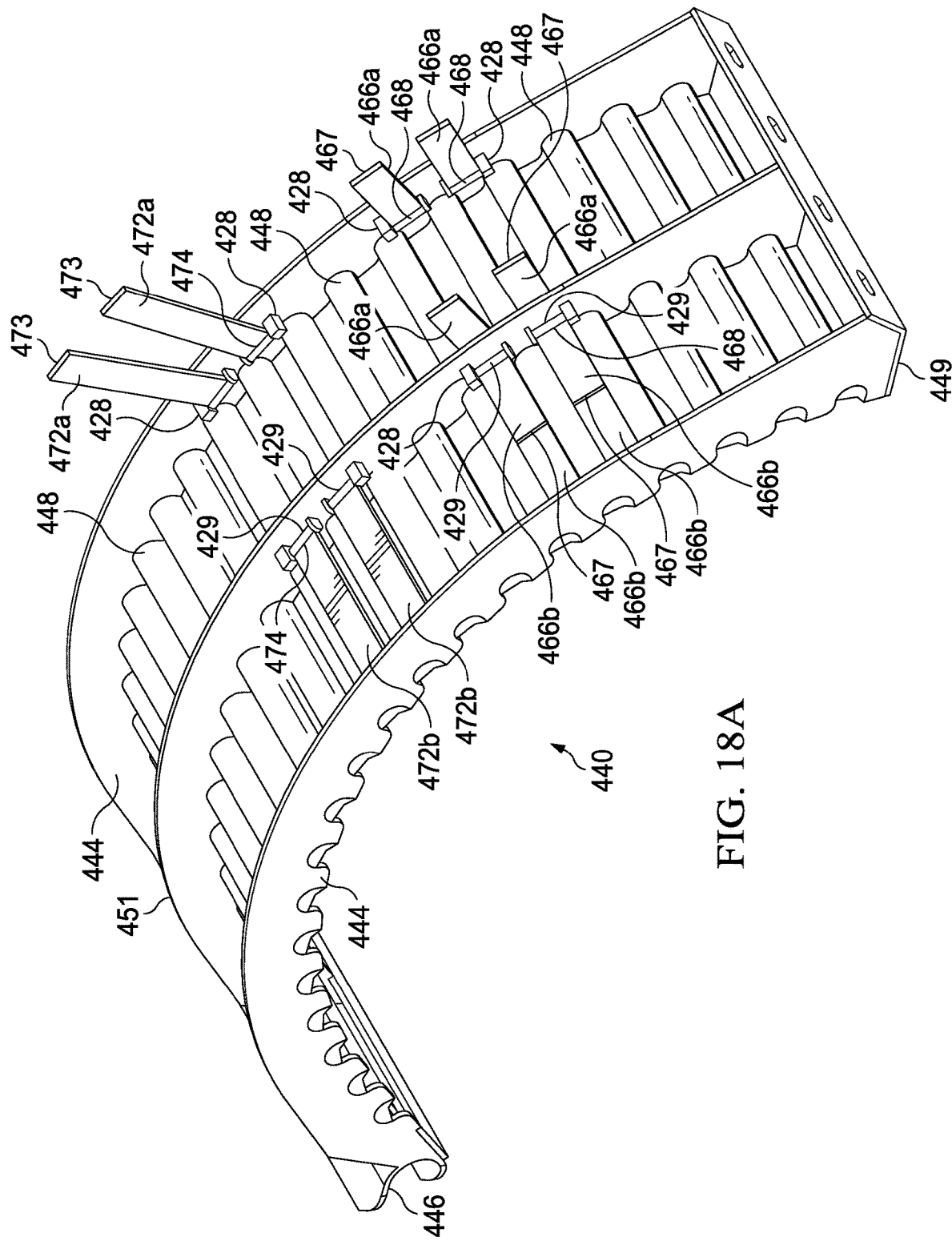
FIG. 18A illustrates a perspective view of a concave grate incorporating principles of multiple embodiments of individual, dynamic, lateral-hinged flapper plate mechanisms of the present invention.
Figure 18B:
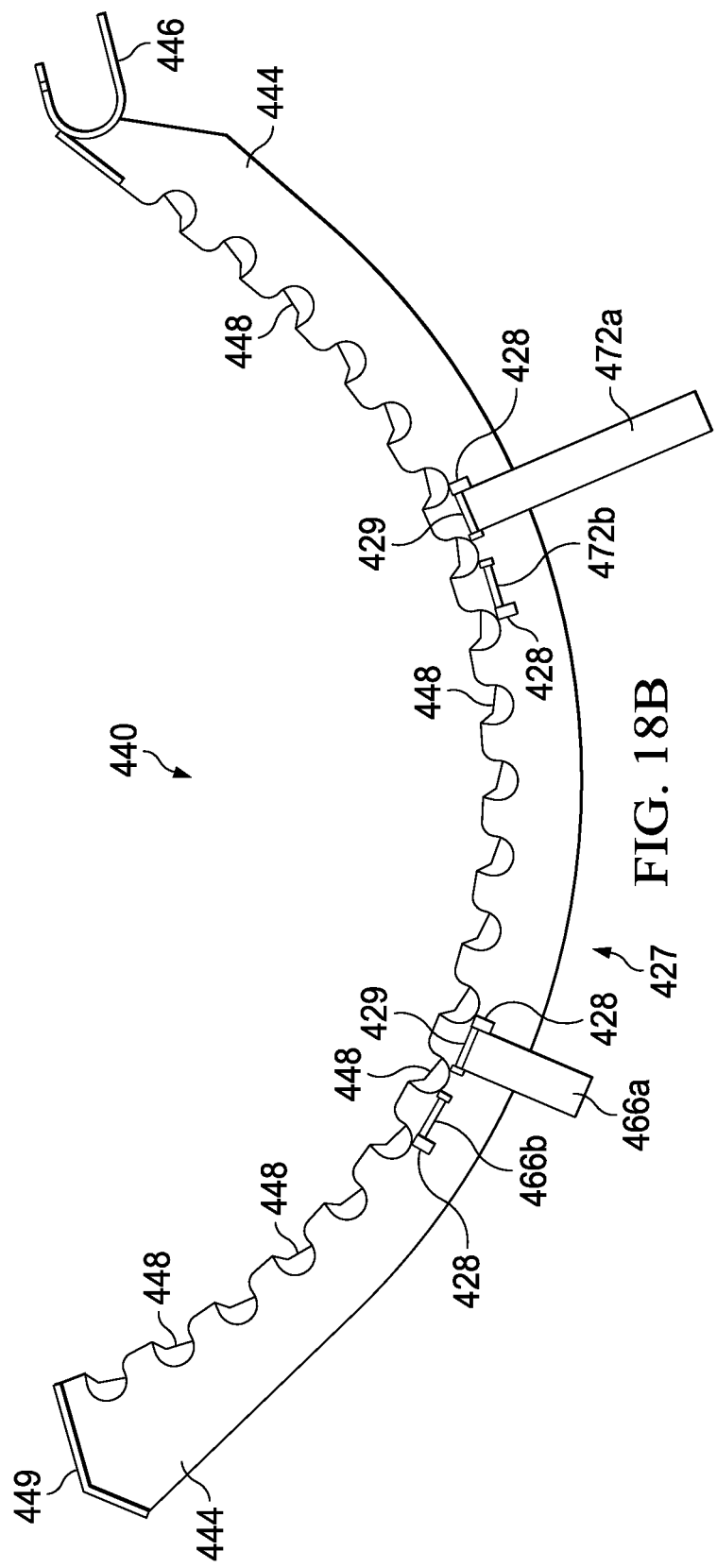
FIG. 18B illustrates a partially cutaway side view of the concave grate and flapper plate mechanisms shown in FIG. 18A.

With reference to the Figures and particularly FIGS. 18A-B, a concave grate 440 depicting principles of multiple embodiments of individual, dynamic, lateral-hinged flapper plate mechanisms of the present invention is depicted. While the multiple embodiments of individual, dynamic, lateral-hinged flapper plate mechanisms are depicted in the Figures as being integral and directly incorporated into the concave grate 440 it is understood that the principles of the individual, dynamic, lateral-hinged flapper plate mechanisms can also be readily adapted to and incorporated into the previously disclosed automated, dynamic cover plate systems 200/200A/300/300A.

As shown in FIGS. 18A-B, the concave grate 440 may include one or more embodiments of a lateral-hinged flapper plate mechanism. Each lateral-hinged flapper plate mechanism 472 includes at least one and preferably two pivot points 428 attached to one of the parallel arcuate rails (e.g., 444, 451) of the concave grate 440. Alternatively, the pivot point of the flapper plate mechanism may comprise a hinge mechanism 429 attached to one of the parallel arcuate rails (e.g., 444, 451) and spanning the lateral distance between one or more axial bars 448 of the concave grate 440.

In one embodiment the lateral-hinged flapper plate mechanism comprises a full pivotal flapper plate 472 that is configured in a perpendicular alignment with its respective arcuate rails (e.g., 444, 451) when in the "fully closed" position and having a pivot point 428 attached to one of the parallel arcuate rails (e.g., 444, 451) of the concave grate 440. The pivot points 428 are affixed or connected to the proximal end 474 of the pivotal flapper plate 472, which spans the lateral distance between one or more axial bars 448 of the concave grate 440. As shown in the Figures, in a preferred embodiment, the pivot points 428 may be aligned with the underside (i.e., the exterior facing side) of the axial bars 448.

In one embodiment depicted in the Figures, the flapper plates 472 span the entire distance between the parallel arcuate rails (e.g., 444, 451) of the concave grate 440. A locking mechanism (not shown) may be included on distal end 473 of the flapper plate 472 to selectively attach it to its respective parallel arcuate rails (e.g., 444, 451). In another embodiment depicted in the Figures, the flapper plates 466 are configured in opposing pairs and only span a portion of the distance between the parallel arcuate rails (e.g., 444, 451) of the concave grate 440. In this embodiment, a complementary locking mechanism (not shown) may be included on distal end 467 of the two flapper plate 466a, 466b to selectively attach it to its respective parallel arcuate rails (e.g., 444, 451).

The one or more pivot points 428 on each flapper plate 472/466 may further comprise a rotary torsional actuator that, upon activation, causes the lateral-hinged flapper plate mechanism 472/466 to rotate about its respective pivot point 428. Alternatively, or in addition, each lateral-hinged flapper plate mechanism may also comprise an actuator device (not shown) attached to one of the parallel arcuate rails (e.g., 444, 451) of the concave grate 440 such that, when activated, the actuator device causes the lateral-hinged flapper plate mechanism to rotate about its pivot point 428.

In FIG. 18A, the lateral-hinged flapper plate mechanism 472/466 on the left hand side of the concave grate 440 are shown in a "fully closed" position, which greatly reduces the free flow of air between the individual axial bars 448. In the "fully closed" position, each of the flapper plates 472b/466b may be configured so that its distal end 473/467 is nested against an opposing parallel arcuate rails (e.g., 444, 451) of the concave grate 440 or the distal end 467 of an opposing flapper plate 466. In contrast, the lateral-hinged flapper plate mechanisms 472/466 on the right hand side of the concave grate 440 in FIG. 18A are shown in a "fully opened" position, which allows the free flow of air between the individual axial bars 448 of the concave grate 440.

By adjusting the angular position of the lateral-hinged flapper plate mechanism 472/466 between the "fully opened" and "fully closed" positions, as depicted in FIGS. 18A-B, enables a wide variety or spectrum of modification and adjustment of the concave grate's flow characteristics.

While the FIGS. 18A-B depict the lateral-hinged flapper plate mechanism 472/466 closing off the space between two adjacent axial bars 448, it is understood that a lateral-hinged flapper plate mechanism 472/466 may be dimensioned to close off more or less than the space between two adjacent axial bars 448. Moreover, while the Figures depict the flapper plates 472a/466a as having a consistent rectangular cross section across its length, it is understood that the cross section of the flapper plates 472a/466a may be variable, curved, tapered or cambered along its width, length and thickness. Furthermore, the shape of each flapper plates 472a/466a may vary depending upon its position within the concave grate 440.

Other embodiments in accordance with the principles of the lateral-hinged flapper plate mechanism of the present invention may comprise a set of two lateral-hinged flapper plate mechanisms 466 arranged in an opposing configuration between the opposing parallel arcuate rails (e.g., 444, 451).

For example, as shown in FIG. 18A-B, in one embodiment a lateral-hinged flapper plate mechanism comprises two lateral-hinged flapper plate mechanisms 466 arranged in an opposing configuration between the opposing parallel arcuate rails (e.g., 444, 451). Each of the flapper plates 466a includes one or more pivot points 428 that are attached to the parallel arcuate rails (e.g., 444, 451) of the concave grate 440. Alternatively, the pivot point of the flapper plate mechanism may comprise a hinge mechanism 429 attached to one of the parallel arcuate rails (e.g., 444, 451) and spanning the lateral distance between one or more axial bars 448 of the concave grate 440.

The pivot point 428 is affixed or connected to a proximal end of the flapper plates 466a. As shown in the Figures, in a preferred embodiment, the pivot points 428 may be aligned with the underside (i.e., the exterior facing side) of the axial bar 448.

The one or more pivot points 428 on each flapper plate 466a may further comprise a rotary torsional actuator device that, upon activation, causes the lateral-hinged flapper plate mechanism 466a to rotate about its respective pivot point 428. Alternatively, or in addition, each lateral-hinged flapper plate mechanism may also comprise an actuator (not shown) attached to one of the parallel arcuate rails (e.g., 444, 451) of the concave grate 440 such that, when activated, the actuator device causes the lateral-hinged flapper plate mechanism to rotate about its pivot point 428.

The actuator device may comprise any of a number of known systems such hydraulic actuators, pneumatic actuators, electric actuators such as electric motors and solenoids, twisted and coiled polymer (TCP) actuators, thermal actuators, magnetic actuators, and mechanical actuators such as rack and pinion systems or screw jacks.

The actuator devices may be controlled, either manually or automatically, by the operator in the cab 2 (FIG. 1) of the combine harvester 10 (FIG. 1) by means of conventional electrical, radio, pneumatic or mechanical connection. Moreover, the controlling mechanism may be connected to a computerized or automated intelligence system that evaluates real-time environmental, operational and/or historical data to determine the proper position of the lateral-hinged flapper plate mechanism 472/466 within the concave grate 440. For example, the computerized or automated intelligence system may include sensors that monitor crop conditions, harvest conditions, soil conditions, environmental conditions, crop type, crop yield, crop moisture, crop test-weight, ground speed, engine load, header speed, header size, header cut height, header tilt, feeder house position, feeder house speed, drum position, drum speed, rotor speed, concave clearance, auger speed, bin capacity, threshing loss, separation loss, rotor loss, sieve loss, grain damage, grain return, threshing efficiency, separation efficiency, sieve position, fan speed and chopper position, etc. In addition, the computerized or automated intelligence may include global positioning system (GPS) information and historical data from previous harvests that could be used to predict variances in yield rates at a particular GPS location, which can be used advantageously to rotate one or more or all of the lateral-hinged flapper plate mechanism 472/466 within the concave grate 440 to modify or adjust the flow characteristics of the concave grate 440.

It will now be evident to those skilled in the art that there has been described herein an improved method and apparatus for readily adjusting the flow characteristics of the threshing concave grates on rasp bar threshing cylinder system. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A dynamic cover plate system, comprising:
    a pivotally hinged cover plate mechanism having a cover plate shutter configured in a parallel alignment with a first axial bar extending between two parallel rails of a concave grate, said cover plate shutter having at least one pivot point connected to one of said two parallel rails;
    an actuator device connected to the cover plate shutter and the concave grate; and
    a controlling device for activating said actuator device; wherein the controlling device is connected to the actuator device by electrical connection, radio connection, pneumatic connection or mechanical connection; wherein the controlling device is controlled by a computerized or automated intelligence system; wherein the computerized or automated intelligence system further includes global positioning system (GPS) information;
    wherein, said actuator device causes the cover plate shutter to rotate about its pivot point, when activated by said controlling device, and modify the flow characteristics of said concave grate.

2. The dynamic cover plate system of claim 1, wherein said at least one pivot point comprises two pivot points configured on opposing ends of said cover plate shutter.

3. The dynamic cover plate system of claim 1, wherein said at least one pivot point is formed into one of said parallel rails.

4. The dynamic cover plate system of claim 1, wherein said actuator device comprises a linear actuator device.

5. The dynamic cover plate system of claim 4, wherein said linear actuator device comprises a hydraulic actuator, a pneumatic actuator, an electric actuator, a twisted and coiled polymer (TCP) actuator, a thermal actuator, a magnetic actuator, or a mechanical actuator.

6. The dynamic cover plate system of claim 5, wherein said electric actuator comprises an electric motor or electric solenoid.

7. The dynamic cover plate system of claim 5, wherein said mechanical actuator comprises a rack and pinion system or a screw jack.

8. The dynamic cover plate system of claim 1, wherein said actuator device comprises a rotary torsional actuator device incorporated into said pivot point.

9. The dynamic cover plate system of claim 8, wherein said rotary torsional actuator device comprises a hydraulic actuator, a pneumatic actuator, an electric actuator, a twisted and coiled polymer (TCP) actuator, a thermal actuator, a magnetic actuator, or a mechanical actuator.

10. The dynamic cover plate system of claim 9, wherein said electric actuator comprises an electric motor or electric solenoid.

11. The dynamic cover plate system of claim 9, wherein said mechanical actuator comprises a rack and pinion system or a screw jack.

12. The dynamic cover plate system of claim 1, wherein the controlling device is remote from the actuator device.

13. The dynamic cover plate system of claim 1, wherein the controlling device is manually controlled by an operator.

14. The dynamic cover plate system of claim 1, wherein the computerized or automated intelligence system evaluates environmental, operational or historical data to determine how and when to activate the actuator device to modify the flow characteristics of said concave grate.

15. The dynamic cover plate system of claim 1, wherein the cover plate shutter has a consistent rectangular cross section across its length.

16. The dynamic cover plate system of claim 1, wherein the cover plate shutter is dimensioned to close off the space between the first axial bar and an adjacent second axial bar when rotated to a "fully closed" position.

17. The dynamic cover plate system of claim 1, wherein said at least one pivot point is aligned with the first axial bar and configured on an exterior or convex side of said concave grate.

18. The dynamic cover plate system of claim 1, wherein said at least one pivot point comprises a hinge mechanism attached to and extending along the length of said first axial bar.

19. The dynamic cover plate system of claim 1, wherein said actuator device is connected to one of said two parallel rails.

20. The dynamic cover plate system of claim 1, wherein said actuator device is connected to said first axial bar.

21. A method for modifying the flow characteristics of a concave grate, comprising:
attaching at least one pivotally hinged cover plate mechanism to a concave grate, said cover plate mechanism having a cover plate shutter configured in a parallel alignment with a first axial bar extending between two parallel rails of said concave grate, said cover plate shutter having at least one pivot point connected to one of said two parallel rails; an actuator device connected to the cover plate shutter and the concave grate; and a controlling device for activating said actuator device, wherein the controlling device activates the actuator device remotely;
engaging the controlling device to activate said actuator causing the cover plate shutter to rotate about its pivot point and modify the flow characteristics of said concave grate;
evaluating global positioning system (GPS) information with a computerized or automated intelligence system to determine and control how and when to activate the actuator device to modify the flow characteristics of said concave grate.

22. A method for modifying the flow characteristics of the concave claim 21, wherein the controlling device activates said actuator electrically, by radio, pneumatically, or mechanically.

23. A method for modifying the flow characteristics of the concave claim 21, wherein the controlling device is manually engaged and controlled by an operator.

24. The method for modifying the flow characteristics of the concave claim 21, further comprising using the computerized or automated intelligence system to evaluate environmental, operational or historical data to determine and control how and when to activate the actuator device to modify the flow characteristics of said concave grate.

* * * * *